(12) United States Patent
Howard et al.

(10) Patent No.: US 7,804,982 B2
(45) Date of Patent: Sep. 28, 2010

(54) SYSTEMS AND METHODS FOR MANAGING AND DETECTING FRAUD IN IMAGE DATABASES USED WITH IDENTIFICATION DOCUMENTS

(75) Inventors: James V. Howard, Saugus, MA (US); Francis Frazier, Belmont, MA (US); Parviz Siamak, Worcester, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 1494 days.

(21) Appl. No.: 10/723,240

(22) Filed: Nov. 26, 2003

(65) Prior Publication Data
US 2004/0213437 A1 Oct. 28, 2004

Related U.S. Application Data

(60) Provisional application No. 60/429,501, filed on Nov. 26, 2002.

(51) Int. Cl.
*G06K 9/00* (2006.01)
(52) U.S. Cl. .................... 382/115; 382/117; 382/118
(58) Field of Classification Search ................. 382/115, 382/117, 118; 340/5.53, 5.83
See application file for complete search history.

(56) References Cited

U.S. PATENT DOCUMENTS

| | | |
|---|---|---|
| 2,815,310 A | 12/1957 | Anderson |
| 2,957,830 A | 10/1960 | Goldberg |
| 3,153,166 A | 10/1964 | Thorton, Jr., et aL |

(Continued)

FOREIGN PATENT DOCUMENTS

CA 2235005 A1 5/1997

(Continued)

OTHER PUBLICATIONS

"Authentication and Security Technologies," I/O Software, Inc., 4 pages.

(Continued)

*Primary Examiner*—John B Strege
(74) *Attorney, Agent, or Firm*—Mintz Levin Cohn Ferris Glovsky and Popeo, P.C.

(57) ABSTRACT

We provide a system for issuing identification documents to a plurality of individuals, comprising a first database, a first server, and a workstation. The first database stores a plurality of digitized images, each digitized image comprising a biometric image of an individual seeking an identification document. The first server is in operable communication with the first database and is programmed to send, at a predetermined time, one or more digitized images from the first database to a biometric recognition system, the biometric recognition system in operable communication with a second database, the second database containing biometric templates associated with individuals whose images have been previously captured, and to receive from the biometric recognition system, for each digitized image sent, an indicator, based on the biometric searching of the second database, as to whether the second database contains any images of individuals who may at least partially resemble the digitized image that was sent. The a workstation is in operable communication with the first server and is configured to permit a user to review the indicator and to make a determination as to whether the individual is authorized to be issued an identification document or to keep an identification document in the individual's possession.

10 Claims, 17 Drawing Sheets

U.S. PATENT DOCUMENTS

| | | |
|---|---|---|
| 3,225,457 A | 12/1965 | Schure |
| 3,238,595 A | 3/1966 | Schwartz |
| 3,413,171 A | 11/1968 | Hannon |
| 3,496,262 A | 2/1970 | Long et al. |
| 3,569,619 A | 3/1971 | Simjian |
| 3,571,957 A | 3/1971 | Cumming et al. |
| 3,582,439 A | 6/1971 | Thomas |
| 3,601,913 A | 8/1971 | Pollock |
| 3,614,430 A | 10/1971 | Berler |
| 3,614,839 A | 10/1971 | Thomas |
| 3,640,009 A | 2/1972 | Komiyama |
| 3,647,275 A | 3/1972 | Ward |
| 3,665,162 A | 5/1972 | Yamamoto et al. |
| 3,703,628 A | 11/1972 | Philipson, Jr. |
| 3,737,226 A | 6/1973 | Shank |
| 3,758,970 A | 9/1973 | Annenberg |
| 3,802,101 A | 4/1974 | Scantlin |
| 3,805,238 A | 4/1974 | Rothfjell |
| 3,838,444 A | 9/1974 | Loughlin et al. |
| 3,845,391 A | 10/1974 | Crosby |
| 3,860,558 A | 1/1975 | Klemchuk |
| 3,914,484 A | 10/1975 | Creegan et al. |
| 3,914,877 A | 10/1975 | Hines |
| 3,922,074 A | 11/1975 | Ikegami et al. |
| 3,929,701 A | 12/1975 | Hall et al. |
| 3,932,036 A | 1/1976 | Ueda et al. |
| 3,949,501 A | 4/1976 | Andrews et al. |
| 3,953,869 A | 4/1976 | Wah Lo et al. |
| 3,961,956 A | 6/1976 | Fukuda et al. |
| 3,975,291 A | 8/1976 | Claussen et al. |
| 3,984,624 A | 10/1976 | Waggener |
| 3,987,711 A | 10/1976 | Silver |
| 4,035,740 A | 7/1977 | Schafer et al. |
| 4,051,374 A | 9/1977 | Drexhage et al. |
| 4,072,911 A | 2/1978 | Walther et al. |
| 4,082,873 A | 4/1978 | Williams |
| 4,096,015 A | 6/1978 | Kawamata et al. |
| 4,100,509 A | 7/1978 | Walther et al. |
| 4,104,555 A | 8/1978 | Fleming |
| 4,119,361 A | 10/1978 | Greenaway |
| 4,121,003 A | 10/1978 | Williams |
| 4,131,337 A | 12/1978 | Moraw et al. |
| 4,155,618 A | 5/1979 | Regnault et al. |
| 4,171,766 A | 10/1979 | Ruell |
| 4,183,989 A | 1/1980 | Tooth |
| 4,184,701 A | 1/1980 | Franklin et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,256,900 A | 3/1981 | Raue |
| 4,270,130 A | 5/1981 | Houle et al. |
| 4,271,395 A | 6/1981 | Brinkmann et al. |
| 4,274,062 A | 6/1981 | Brinkmann et al. |
| 4,289,957 A | 9/1981 | Neyroud et al. |
| 4,301,091 A | 11/1981 | Schieder et al. |
| 4,304,809 A | 12/1981 | Moraw et al. |
| 4,313,197 A | 1/1982 | Maxemchuk |
| 4,313,984 A | 2/1982 | Moraw et al. |
| 4,317,782 A | 3/1982 | Eckstein et al. |
| 4,324,421 A | 4/1982 | Moraw et al. |
| 4,326,066 A | 4/1982 | Eckstein et al. |
| 4,330,350 A | 5/1982 | Andrews |
| 4,338,258 A | 7/1982 | Brinkwerth et al. |
| 4,356,052 A | 10/1982 | Moraw et al. |
| 4,359,633 A | 11/1982 | Bianco |
| 4,360,548 A | 11/1982 | Skees et al. |
| 4,367,488 A | 1/1983 | Leventer et al. |
| 4,379,947 A | 4/1983 | Warner |
| 4,380,027 A | 4/1983 | Leventer et al. |
| 4,384,973 A | 5/1983 | Harnisch |
| 4,395,600 A | 7/1983 | Lundy et al. |
| 4,415,225 A | 11/1983 | Benton et al. |
| 4,417,784 A | 11/1983 | Knop et al. |
| 4,423,415 A | 12/1983 | Goldman |
| 4,425,642 A | 1/1984 | Moses et al. |
| 4,428,997 A | 1/1984 | Shulman |
| 4,443,438 A | 4/1984 | Kasamatsu et al. |
| 4,450,024 A | 5/1984 | Haghiri-Tehrani et al. |
| 4,467,209 A | 8/1984 | Maurer et al. |
| 4,468,468 A | 8/1984 | Benninghoven et al. |
| 4,474,439 A | 10/1984 | Brown |
| 4,476,468 A | 10/1984 | Goldman |
| 4,506,148 A | 3/1985 | Berthold et al. |
| 4,507,346 A | 3/1985 | Maurer et al. |
| 4,510,311 A | 4/1985 | Eckstein |
| 4,516,845 A | 5/1985 | Blakely et al. |
| 4,522,881 A | 6/1985 | Kobayashi et al. |
| 4,523,777 A | 6/1985 | Holbein et al. |
| 4,527,059 A | 7/1985 | Benninghoven et al. |
| 4,528,588 A | 7/1985 | Lofberg |
| 4,529,992 A | 7/1985 | Ishida et al. |
| 4,532,508 A | 7/1985 | Ruell |
| 4,544,181 A | 10/1985 | Maurer et al. |
| 4,547,804 A | 10/1985 | Greenberg |
| 4,551,265 A | 11/1985 | Brinkwerth et al. |
| 4,553,261 A | 11/1985 | Froessl |
| 4,568,824 A | 2/1986 | Gareis et al. |
| 4,572,634 A | 2/1986 | Livingston et al. |
| 4,579,754 A | 4/1986 | Maurer et al. |
| 4,590,366 A | 5/1986 | Rothfjell |
| 4,595,950 A | 6/1986 | Lofberg |
| 4,596,409 A | 6/1986 | Holbein et al. |
| 4,597,592 A | 7/1986 | Maurer et al. |
| 4,597,593 A | 7/1986 | Maurer |
| 4,597,655 A | 7/1986 | Mann |
| 4,599,259 A | 7/1986 | Kobayashi et al. |
| 4,617,216 A | 10/1986 | Haghiri-Tehrani et al. |
| 4,621,271 A | 11/1986 | Brownstein |
| 4,627,997 A | 12/1986 | Ide |
| 4,629,215 A | 12/1986 | Maurer et al. |
| 4,637,051 A | 1/1987 | Clark |
| 4,638,289 A | 1/1987 | Zottnik |
| 4,652,722 A | 3/1987 | Stone et al. |
| 4,653,775 A | 3/1987 | Raphael et al. |
| 4,653,862 A | 3/1987 | Morozumi |
| 4,654,290 A | 3/1987 | Spanjer |
| 4,656,585 A | 4/1987 | Stephenson |
| 4,660,221 A | 4/1987 | Dlugos |
| 4,663,518 A | 5/1987 | Borror et al. |
| 4,665,431 A | 5/1987 | Cooper |
| 4,670,882 A | 6/1987 | Telle et al. |
| 4,672,605 A | 6/1987 | Hustig et al. |
| 4,672,891 A | 6/1987 | Maurer et al. |
| 4,675,746 A | 6/1987 | Tetrick et al. |
| 4,677,435 A | 6/1987 | Causse D'Agraives et al. |
| 4,682,794 A | 7/1987 | Margolin |
| 4,687,526 A | 8/1987 | Wilfert |
| 4,689,477 A | 8/1987 | Goldman |
| 4,701,040 A | 10/1987 | Miller |
| 4,703,476 A | 10/1987 | Howard |
| 4,709,384 A | 11/1987 | Schiller |
| 4,711,690 A | 12/1987 | Haghiri-Tehrani |
| 4,712,103 A | 12/1987 | Gotanda |
| 4,718,106 A | 1/1988 | Weinblatt |
| 4,732,410 A | 3/1988 | Holbein et al. |
| 4,735,670 A | 4/1988 | Maurer et al. |
| 4,738,949 A | 4/1988 | Sethi et al. |
| 4,739,377 A | 4/1988 | Allen |
| 4,741,042 A | 4/1988 | Throop et al. |
| 4,748,452 A | 5/1988 | Maurer |
| 4,750,173 A | 6/1988 | Bluthgen |
| 4,751,525 A | 6/1988 | Robinson |

| | | | | | |
|---|---|---|---|---|---|
| 4,754,128 A | 6/1988 | Takeda et al. | 5,011,816 A | 4/1991 | Byers et al. |
| 4,765,636 A | 8/1988 | Speer | 5,013,900 A | 5/1991 | Hoppe |
| 4,765,656 A | 8/1988 | Becker et al. | 5,023,907 A | 6/1991 | Johnson et al. |
| 4,766,026 A | 8/1988 | Lass et al. | 5,024,989 A | 6/1991 | Chiang et al. |
| 4,773,677 A | 9/1988 | Plasse | 5,027,401 A | 6/1991 | Soltesz |
| 4,775,901 A | 10/1988 | Nakano | 5,036,513 A | 7/1991 | Greenblatt |
| 4,776,013 A | 10/1988 | Kafri et al. | 5,051,147 A | 9/1991 | Anger |
| 4,790,566 A | 12/1988 | Boissier et al. | 5,053,956 A | 10/1991 | Donald et al. |
| 4,803,114 A | 2/1989 | Schledorn | 5,058,926 A | 10/1991 | Drower |
| 4,805,020 A | 2/1989 | Greenberg | 5,060,981 A | 10/1991 | Fossum et al. |
| 4,807,031 A | 2/1989 | Broughton et al. | 5,061,341 A | 10/1991 | Kildal et al. |
| 4,811,357 A | 3/1989 | Betts et al. | 5,062,341 A | 11/1991 | Reiling et al. |
| 4,811,408 A | 3/1989 | Goldman | 5,063,446 A | 11/1991 | Gibson |
| 4,816,372 A | 3/1989 | Schenk et al. | 5,066,947 A | 11/1991 | Du Castel |
| 4,816,374 A | 3/1989 | Lecomte | 5,073,899 A | 12/1991 | Collier et al. |
| 4,820,912 A | 4/1989 | Samyn | 5,075,195 A | 12/1991 | Babler et al. |
| 4,822,973 A | 4/1989 | Fahner et al. | 5,075,769 A | 12/1991 | Allen et al. |
| 4,835,517 A | 5/1989 | van der Gracht et al. | 5,079,411 A | 1/1992 | Lee |
| 4,841,134 A | 6/1989 | Hida et al. | 5,079,648 A | 1/1992 | Maufe |
| 4,855,827 A | 8/1989 | Best | 5,086,469 A | 2/1992 | Gupta et al. |
| 4,859,361 A | 8/1989 | Reilly et al. | 5,087,507 A | 2/1992 | Heinzer |
| 4,861,620 A | 8/1989 | Azuma et al. | 5,089,350 A | 2/1992 | Talvalkar et al. |
| 4,864,618 A | 9/1989 | Wright et al. | 5,095,196 A | 3/1992 | Miyata |
| 4,866,025 A | 9/1989 | Byers et al. | 5,099,422 A | 3/1992 | Foresman et al. |
| 4,866,027 A | 9/1989 | Henzel | 5,100,711 A | 3/1992 | Satake et al. |
| 4,866,771 A | 9/1989 | Bain | 5,103,459 A | 4/1992 | Gilhousen et al. |
| 4,869,946 A | 9/1989 | Clay | 5,113,445 A | 5/1992 | Wang |
| 4,871,714 A | 10/1989 | Byers et al. | 5,113,518 A | 5/1992 | Durst, Jr. et al. |
| 4,876,234 A | 10/1989 | Henzel | 5,122,813 A | 6/1992 | Lass et al. |
| 4,876,237 A | 10/1989 | Byers et al. | 5,128,779 A | 7/1992 | Mallik |
| 4,876,617 A | 10/1989 | Best et al. | 5,128,859 A | 7/1992 | Carbone et al. |
| 4,878,167 A | 10/1989 | Kapulka et al. | 5,138,070 A | 8/1992 | Berneth |
| 4,879,747 A | 11/1989 | Leighton et al. | 5,138,604 A | 8/1992 | Umeda et al. |
| 4,884,139 A | 11/1989 | Pommier | 5,138,712 A | 8/1992 | Corbin |
| 4,888,798 A | 12/1989 | Earnest | 5,146,457 A | 9/1992 | Veldhuis et al. |
| 4,889,749 A | 12/1989 | Ohashi et al. | 5,148,498 A | 9/1992 | Resnikoff et al. |
| 4,891,351 A | 1/1990 | Byers et al. | 5,150,409 A | 9/1992 | Elsner |
| 4,894,110 A | 1/1990 | Lass et al. | 5,156,938 A | 10/1992 | Foley et al. |
| 4,903,301 A | 2/1990 | Kondo et al. | 5,157,424 A | 10/1992 | Craven et al. |
| 4,908,836 A | 3/1990 | Rushforth et al. | 5,161,210 A | 11/1992 | Druyvesteyn et al. |
| 4,908,873 A | 3/1990 | Philibert et al. | 5,166,676 A | 11/1992 | Milheiser |
| 4,911,370 A | 3/1990 | Schippers et al. | 5,169,707 A | 12/1992 | Faykish et al. |
| 4,915,237 A | 4/1990 | Chang et al. | 5,171,625 A | 12/1992 | Newton |
| 4,921,278 A | 5/1990 | Shiang et al. | 5,172,281 A | 12/1992 | Ardis et al. |
| 4,931,793 A | 6/1990 | Fuhrmann et al. | 5,173,840 A | 12/1992 | Kodai et al. |
| 4,935,335 A | 6/1990 | Fotland | 5,179,392 A | 1/1993 | Kawaguchi |
| 4,939,515 A | 7/1990 | Adelson | 5,180,309 A | 1/1993 | Egnor |
| 4,941,150 A | 7/1990 | Iwasaki | 5,181,786 A | 1/1993 | Hujink |
| 4,943,973 A | 7/1990 | Werner | 5,185,736 A | 2/1993 | Tyrrell et al. |
| 4,943,976 A | 7/1990 | Ishigaki | 5,191,522 A | 3/1993 | Bosco et al. |
| 4,944,036 A | 7/1990 | Hyatt | 5,199,081 A | 3/1993 | Saito et al. |
| 4,947,028 A | 8/1990 | Gorog | 5,200,822 A | 4/1993 | Bronfin et al. |
| 4,959,406 A | 9/1990 | Foltin et al. | 5,201,044 A | 4/1993 | Frey, Jr. et al. |
| 4,963,998 A | 10/1990 | Maufe | 5,208,450 A | 5/1993 | Uenishi et al. |
| 4,965,827 A | 10/1990 | McDonald | 5,212,551 A | 5/1993 | Conanan |
| 4,967,273 A | 10/1990 | Greenberg | 5,213,337 A | 5/1993 | Sherman |
| 4,968,063 A | 11/1990 | McConville et al. | 5,215,864 A | 6/1993 | Laakmann |
| 4,969,041 A | 11/1990 | O'Grady et al. | 5,216,543 A | 6/1993 | Calhoun |
| 4,972,471 A | 11/1990 | Gross et al. | 5,224,173 A | 6/1993 | Kuhns et al. |
| 4,972,476 A | 11/1990 | Nathans | 5,228,056 A | 7/1993 | Schilling |
| 4,977,594 A | 12/1990 | Shear | 5,233,513 A | 8/1993 | Doyle |
| 4,979,210 A | 12/1990 | Nagata et al. | 5,237,164 A | 8/1993 | Takada |
| 4,990,759 A | 2/1991 | Gloton et al. | 5,243,423 A | 9/1993 | DeJean et al. |
| 4,992,353 A | 2/1991 | Rodakis et al. | 5,243,524 A | 9/1993 | Ishida et al. |
| 4,993,068 A | 2/1991 | Piosenka et al. | 5,245,329 A | 9/1993 | Gokcebay |
| 4,994,831 A | 2/1991 | Marandi | 5,249,546 A | 10/1993 | Pennelle |
| 4,995,081 A | 2/1991 | Leighton et al. | 5,253,078 A | 10/1993 | Balkanski et al. |
| 4,996,530 A | 2/1991 | Hilton | 5,258,998 A | 11/1993 | Koide |
| 4,999,065 A | 3/1991 | Wilfert | 5,259,025 A | 11/1993 | Monroe et al. |
| 5,005,872 A | 4/1991 | Lass et al. | 5,261,987 A | 11/1993 | Luening et al. |
| 5,005,873 A | 4/1991 | West | 5,262,860 A | 11/1993 | Fitzpatrick et al. |
| 5,006,503 A | 4/1991 | Byers et al. | 5,267,334 A | 11/1993 | Normille et al. |
| 5,010,405 A | 4/1991 | Schreiber et al. | 5,267,755 A | 12/1993 | Yamauchi et al. |

| | | | | | |
|---|---|---|---|---|---|
| 5,270,526 A | 12/1993 | Yoshihara | 5,474,875 A | 12/1995 | Loerzer et al. |
| 5,272,039 A | 12/1993 | Yoerger | 5,479,168 A | 12/1995 | Johnson et al. |
| 5,276,478 A | 1/1994 | Morton | 5,483,442 A | 1/1996 | Black et al. |
| 5,280,537 A | 1/1994 | Sugiyama et al. | 5,483,632 A | 1/1996 | Kuwamoto et al. |
| 5,284,364 A | 2/1994 | Jain | 5,489,639 A | 2/1996 | Faber et al. |
| 5,288,976 A | 2/1994 | Citron et al. | 5,490,217 A | 2/1996 | Wang et al. |
| 5,293,399 A | 3/1994 | Hefti | 5,493,677 A | 2/1996 | Balogh et al. |
| 5,294,774 A | 3/1994 | Stone | 5,495,411 A | 2/1996 | Ananda |
| 5,294,944 A | 3/1994 | Takeyama et al. | 5,495,581 A | 2/1996 | Tsai |
| 5,295,203 A | 3/1994 | Krause et al. | 5,496,071 A | 3/1996 | Walsh |
| 5,298,922 A | 3/1994 | Merkle et al. | 5,499,294 A | 3/1996 | Friedman |
| 5,299,019 A | 3/1994 | Pack et al. | 5,499,330 A | 3/1996 | Lucas et al. |
| 5,301,981 A | 4/1994 | Nesis | 5,504,674 A | 4/1996 | Chen et al. |
| 5,304,513 A | 4/1994 | Haghiri-Tehrani et al. | 5,505,494 A | 4/1996 | Belluci et al. |
| 5,304,789 A | 4/1994 | Lob et al. | 5,509,693 A | 4/1996 | Kohls |
| 5,305,400 A | 4/1994 | Butera | 5,514,860 A | 5/1996 | Berson |
| 5,308,736 A | 5/1994 | Defieuw et al. | 5,515,081 A | 5/1996 | Vasilik |
| 5,315,098 A | 5/1994 | Tow | 5,516,362 A | 5/1996 | Gundjian et al. |
| 5,317,503 A | 5/1994 | Inoue | 5,522,623 A | 6/1996 | Soules et al. |
| 5,319,453 A | 6/1994 | Copriviza et al. | 5,523,125 A | 6/1996 | Kennedy et al. |
| 5,319,724 A | 6/1994 | Blonstein et al. | 5,523,942 A | 6/1996 | Tyler et al. |
| 5,319,735 A | 6/1994 | Preuss et al. | 5,524,489 A | 6/1996 | Twigg |
| 5,321,751 A | 6/1994 | Ray et al. | 5,524,933 A | 6/1996 | Kunt et al. |
| 5,325,167 A | 6/1994 | Melen | 5,525,403 A | 6/1996 | Kawabata et al. |
| 5,334,573 A | 8/1994 | Schild | 5,529,345 A | 6/1996 | Kohls |
| 5,336,657 A | 8/1994 | Egashira et al. | 5,530,852 A | 6/1996 | Meske, Jr. et al. |
| 5,337,361 A | 8/1994 | Wang et al. | 5,532,104 A | 7/1996 | Goto |
| 5,351,302 A | 9/1994 | Leighton et al. | 5,534,372 A | 7/1996 | Koshizuka et al. |
| 5,374,675 A | 12/1994 | Plachetta et al. | 5,548,645 A | 8/1996 | Ananda |
| 5,379,345 A | 1/1995 | Greenberg | 5,550,346 A | 8/1996 | Andriash et al. |
| 5,380,044 A | 1/1995 | Aitkens et al. | 5,550,976 A | 8/1996 | Henderson et al. |
| 5,380,695 A | 1/1995 | Chiang et al. | 5,553,143 A | 9/1996 | Ross et al. |
| 5,384,846 A | 1/1995 | Berson et al. | 5,560,799 A | 10/1996 | Jacobsen |
| 5,385,371 A | 1/1995 | Izawa | 5,573,584 A | 11/1996 | Ostertag et al. |
| 5,386,566 A | 1/1995 | Hamanaka et al. | 5,576,377 A | 11/1996 | El Sayed et al. |
| 5,387,013 A | 2/1995 | Yamauchi et al. | 5,579,479 A | 11/1996 | Plum |
| 5,393,099 A | 2/1995 | D'Amato | 5,579,694 A | 12/1996 | Mailloux |
| 5,394,274 A | 2/1995 | Kahn | 5,586,310 A | 12/1996 | Sharman |
| 5,394,555 A | 2/1995 | Hunter et al. | 5,594,226 A | 1/1997 | Steger |
| 5,396,559 A | 3/1995 | McGrew | 5,594,809 A | 1/1997 | Kopec et al. |
| 5,404,377 A | 4/1995 | Moses | 5,612,943 A | 3/1997 | Moses et al. |
| 5,408,542 A | 4/1995 | Callahan | 5,613,004 A | 3/1997 | Cooperman et al. |
| 5,409,797 A | 4/1995 | Hosoi et al. | 5,629,093 A | 5/1997 | Bischof et al. |
| 5,410,142 A | 4/1995 | Tsuboi et al. | 5,629,512 A | 5/1997 | Haga |
| 5,421,619 A | 6/1995 | Dyball | 5,629,980 A | 5/1997 | Stefik et al. |
| 5,421,869 A | 6/1995 | Gundjian et al. | 5,633,119 A | 5/1997 | Burberry et al. |
| 5,422,213 A | 6/1995 | Yu et al. | 5,634,012 A | 5/1997 | Stefik et al. |
| 5,422,230 A | 6/1995 | Boggs et al. | 5,635,012 A | 6/1997 | Belluci et al. |
| 5,422,963 A | 6/1995 | Chen et al. | 5,636,276 A | 6/1997 | Brugger |
| 5,422,995 A | 6/1995 | Aoki et al. | 5,636,292 A | 6/1997 | Rhoads |
| 5,424,119 A | 6/1995 | Phillips et al. | 5,638,443 A | 6/1997 | Stefik et al. |
| 5,428,607 A | 6/1995 | Hiller et al. | 5,638,508 A | 6/1997 | Kanai et al. |
| 5,428,731 A | 6/1995 | Powers, III | 5,639,819 A | 6/1997 | Farkas et al. |
| 5,432,870 A | 7/1995 | Schwartz | 5,640,193 A | 6/1997 | Wellner |
| 5,434,994 A | 7/1995 | Shaheen et al. | 5,640,647 A | 6/1997 | Hube |
| 5,435,599 A | 7/1995 | Bernecker | 5,645,281 A | 7/1997 | Hesse et al. |
| 5,436,970 A | 7/1995 | Ray et al. | 5,646,997 A | 7/1997 | Barton |
| 5,446,273 A | 8/1995 | Leslie | 5,646,999 A | 7/1997 | Saito |
| 5,446,659 A | 8/1995 | Yamawaki | 5,652,626 A | 7/1997 | Kawakami et al. |
| 5,448,053 A | 9/1995 | Rhoads | 5,652,714 A | 7/1997 | Peterson et al. |
| 5,449,200 A | 9/1995 | Andric et al. | 5,654,105 A | 8/1997 | Obringer et al. |
| 5,450,490 A | 9/1995 | Jensen et al. | 5,654,867 A | 8/1997 | Murray |
| 5,450,504 A | 9/1995 | Calia | 5,657,462 A | 8/1997 | Brouwer et al. |
| 5,451,478 A | 9/1995 | Boggs et al. | 5,658,411 A | 8/1997 | Faykish |
| 5,454,598 A | 10/1995 | Wicker | 5,659,164 A | 8/1997 | Schmid et al. |
| 5,455,947 A | 10/1995 | Suzuki et al. | 5,659,726 A | 8/1997 | Sandford, II et al. |
| 5,458,713 A | 10/1995 | Ojster | 5,663,766 A | 9/1997 | Sizer, II |
| 5,463,209 A | 10/1995 | Figh et al. | 5,665,951 A | 9/1997 | Newman et al. |
| 5,463,212 A | 10/1995 | Oshima et al. | 5,668,636 A | 9/1997 | Beach et al. |
| 5,466,012 A | 11/1995 | Puckett et al. | 5,669,995 A | 9/1997 | Hong |
| 5,469,506 A | 11/1995 | Berson et al. | 5,671,005 A | 9/1997 | McNay et al. |
| 5,471,533 A | 11/1995 | Wang et al. | 5,671,282 A | 9/1997 | Wolff et al. |
| 5,473,631 A | 12/1995 | Moses | 5,673,316 A | 9/1997 | Auerbach et al. |

| Patent No. | Date | Inventor(s) | Patent No. | Date | Inventor(s) |
|---|---|---|---|---|---|
| 5,680,223 A | 10/1997 | Cooper et al. | 5,834,118 A | 11/1998 | R.ang.nby et al. |
| 5,681,356 A | 10/1997 | Barak et al. | 5,840,142 A | 11/1998 | Stevenson et al. |
| 5,683,774 A | 11/1997 | Faykish et al. | 5,840,791 A | 11/1998 | Magerstedt et al. |
| 5,684,885 A | 11/1997 | Cass et al. | 5,841,886 A | 11/1998 | Rhoads |
| 5,687,236 A | 11/1997 | Moskowitz et al. | 5,841,978 A | 11/1998 | Rhoads |
| 5,688,738 A | 11/1997 | Lu | 5,844,685 A | 12/1998 | Gontin |
| 5,689,620 A | 11/1997 | Kopec et al. | 5,848,413 A | 12/1998 | Wolff |
| 5,689,706 A | 11/1997 | Rao et al. | 5,848,424 A | 12/1998 | Scheinkman et al. |
| 5,691,757 A | 11/1997 | Hayashihara et al. | 5,852,673 A | 12/1998 | Young |
| 5,694,471 A | 12/1997 | Chen et al. | 5,853,955 A | 12/1998 | Towfiq |
| 5,696,705 A | 12/1997 | Zykan | 5,855,969 A | 1/1999 | Robertson |
| 5,697,006 A | 12/1997 | Taguchi et al. | 5,856,661 A | 1/1999 | Finkelstein et al. |
| 5,698,296 A | 12/1997 | Dotson et al. | 5,857,038 A | 1/1999 | Owada et al. |
| 5,700,037 A | 12/1997 | Keller | 5,861,662 A | 1/1999 | Candelore |
| 5,706,364 A | 1/1998 | Kopec et al. | 5,862,260 A | 1/1999 | Rhoads |
| 5,710,834 A | 1/1998 | Rhoads | 5,862,500 A | 1/1999 | Goodwin |
| 5,712,731 A | 1/1998 | Drinkwater et al. | 5,864,622 A | 1/1999 | Marcus |
| 5,714,291 A | 2/1998 | Marinello et al. | 5,864,623 A | 1/1999 | Messina et al. |
| 5,715,403 A | 2/1998 | Stefik | 5,866,644 A | 2/1999 | Mercx et al. |
| 5,717,018 A | 2/1998 | Magerstedt et al. | 5,867,199 A | 2/1999 | Knox et al. |
| 5,717,391 A | 2/1998 | Rodriguez | 5,867,586 A | 2/1999 | Liang |
| 5,719,667 A | 2/1998 | Miers | 5,869,819 A | 2/1999 | Knowles et al. |
| 5,719,948 A | 2/1998 | Liang | 5,870,711 A | 2/1999 | Huffman |
| 5,721,781 A | 2/1998 | Deo et al. | 5,871,615 A | 2/1999 | Harris |
| 5,721,788 A | 2/1998 | Powell et al. | 5,872,589 A | 2/1999 | Morales |
| 5,734,119 A | 3/1998 | France et al. | 5,872,627 A | 2/1999 | Miers |
| 5,734,752 A | 3/1998 | Knox | 5,873,066 A | 2/1999 | Underwood et al. |
| 5,742,411 A | 4/1998 | Walters | 5,875,249 A | 2/1999 | Mintzer et al. |
| 5,742,845 A | 4/1998 | Wagner | 5,877,707 A | 3/1999 | Kowalick |
| 5,745,308 A | 4/1998 | Spangenberg | 5,879,502 A | 3/1999 | Gustafson |
| 5,745,901 A | 4/1998 | Entner et al. | 5,879,784 A | 3/1999 | Breen et al. |
| 5,748,783 A | 5/1998 | Rhoads | 5,888,624 A | 3/1999 | Haghiri et al. |
| 5,760,386 A | 6/1998 | Ward | 5,892,661 A | 4/1999 | Stafford et al. |
| 5,761,686 A | 6/1998 | Bloomberg | 5,892,900 A | 4/1999 | Ginter et al. |
| 5,763,868 A | 6/1998 | Kubota et al. | 5,893,910 A | 4/1999 | Martineau et al. |
| 5,764,263 A | 6/1998 | Lin | 5,895,074 A | 4/1999 | Chess et al. |
| 5,765,152 A | 6/1998 | Erickson | 5,897,938 A | 4/1999 | Shinmoto et al. |
| 5,767,496 A | 6/1998 | Swartz et al. | 5,900,608 A | 5/1999 | Iida |
| 5,768,001 A | 6/1998 | Kelley et al. | 5,902,353 A | 5/1999 | Reber et al. |
| 5,768,426 A | 6/1998 | Rhoads | 5,903,729 A | 5/1999 | Reber et al. |
| 5,768,505 A | 6/1998 | Gilchrist et al. | 5,905,248 A | 5/1999 | Russell et al. |
| 5,768,506 A | 6/1998 | Randell | 5,905,251 A | 5/1999 | Knowles |
| 5,769,301 A | 6/1998 | Hebert et al. | 5,907,149 A | 5/1999 | Marckini |
| 5,773,677 A | 6/1998 | Lansink-Rotgerink et al. | 5,907,848 A | 5/1999 | Zaiken et al. |
| 5,774,168 A | 6/1998 | Blome | 5,909,683 A | 6/1999 | Miginiac et al. |
| 5,774,452 A | 6/1998 | Wolosewicz | 5,912,767 A | 6/1999 | Lee |
| 5,776,278 A | 7/1998 | Tuttle et al. | 5,912,974 A | 6/1999 | Holloway et al. |
| 5,778,102 A | 7/1998 | Sandford, II et al. | 5,913,210 A | 6/1999 | Call |
| 5,783,024 A | 7/1998 | Forkert | 5,915,027 A | 6/1999 | Cox et al. |
| 5,786,587 A | 7/1998 | Colgate, Jr. | 5,918,213 A | 6/1999 | Bernard et al. |
| 5,787,186 A | 7/1998 | Schroeder | 5,918,214 A | 6/1999 | Perkowski |
| 5,787,269 A | 7/1998 | Hyodo | 5,919,853 A | 7/1999 | Condit et al. |
| 5,790,703 A | 8/1998 | Wang | 5,920,861 A | 7/1999 | Hall et al. |
| 5,795,643 A | 8/1998 | Steininger et al. | 5,920,878 A | 7/1999 | DeMont |
| 5,797,134 A | 8/1998 | McMillan et al. | 5,923,380 A | 7/1999 | Yang et al. |
| 5,798,949 A | 8/1998 | Kaub | 5,925,500 A | 7/1999 | Yang et al. |
| 5,799,092 A | 8/1998 | Kristol et al. | 5,926,822 A | 7/1999 | Garman |
| 5,801,687 A | 9/1998 | Peterson et al. | 5,928,989 A | 7/1999 | Ohnishi et al. |
| 5,801,857 A | 9/1998 | Heckenkamp et al. | 5,930,377 A | 7/1999 | Powell et al. |
| 5,804,803 A | 9/1998 | Cragun et al. | 5,930,759 A | 7/1999 | Moore et al. |
| 5,808,758 A | 9/1998 | Solmsdorf | 5,930,767 A | 7/1999 | Reber et al. |
| 5,809,139 A | 9/1998 | Girod et al. | 5,932,863 A | 8/1999 | Rathus et al. |
| 5,809,317 A | 9/1998 | Kogan et al. | 5,933,816 A | 8/1999 | Zeanah et al. |
| 5,809,633 A | 9/1998 | Mundigl et al. | 5,933,829 A | 8/1999 | Durst et al. |
| 5,815,093 A | 9/1998 | Kikinis | 5,935,694 A | 8/1999 | Olmstead et al. |
| 5,815,292 A | 9/1998 | Walters | 5,936,986 A | 8/1999 | Cantatore et al. |
| 5,816,619 A | 10/1998 | Schaede | 5,937,189 A | 8/1999 | Branson et al. |
| 5,818,441 A | 10/1998 | Throckmorton et al. | 5,938,726 A | 8/1999 | Reber et al. |
| 5,824,447 A | 10/1998 | Tavernier et al. | 5,938,727 A | 8/1999 | Ikeda |
| 5,824,715 A | 10/1998 | Hayashihara et al. | 5,939,695 A | 8/1999 | Nelson |
| 5,825,892 A | 10/1998 | Braudaway et al. | 5,939,699 A | 8/1999 | Perttunen et al. |
| 5,828,325 A | 10/1998 | Wolosewicz et al. | 5,940,595 A | 8/1999 | Reber et al. |
| 5,832,481 A | 11/1998 | Sheffield | 5,944,356 A | 8/1999 | Bergmann et al. |

| | | | | | | |
|---|---|---|---|---|---|---|
| 5,944,881 | A | 8/1999 | Mehta et al. | 6,082,778 A | 7/2000 | Solmsdorf |
| 5,947,369 | A | 9/1999 | Frommer et al. | 6,086,971 A | 7/2000 | Haas et al. |
| 5,948,035 | A | 9/1999 | Tomita | 6,089,614 A | 7/2000 | Howland et al. |
| 5,949,055 | A | 9/1999 | Fleet et al. | 6,092,049 A | 7/2000 | Chislenko et al. |
| 5,950,169 | A | 9/1999 | Borghesi et al. | 6,095,566 A | 8/2000 | Yamamoto et al. |
| 5,950,173 | A | 9/1999 | Perkowski | 6,100,804 A | 8/2000 | Brady et al. |
| 5,953,710 | A | 9/1999 | Fleming | 6,101,602 A | 8/2000 | Fridrich |
| 5,955,021 | A | 9/1999 | Tiffany, III | 6,105,007 A | 8/2000 | Norris |
| 5,955,961 | A | 9/1999 | Wallerstein | 6,106,110 A | 8/2000 | Gundjian et al. |
| 5,956,687 | A | 9/1999 | Wamsley et al. | 6,110,864 A | 8/2000 | Lu |
| 5,958,528 | A | 9/1999 | Bernecker | 6,111,506 A | 8/2000 | Yap et al. |
| 5,962,840 | A | 10/1999 | Haghiri-Tehrani et al. | 6,111,517 A | 8/2000 | Atick et al. |
| 5,963,916 | A | 10/1999 | Kaplan | 6,115,690 A | 9/2000 | Wong |
| 5,965,242 | A | 10/1999 | Patton et al. | 6,120,142 A | 9/2000 | Eltgen et al. |
| 5,969,324 | A | 10/1999 | Reber et al. | 6,120,882 A | 9/2000 | Faykish et al. |
| 5,971,277 | A | 10/1999 | Cragun et al. | 6,122,403 A | 9/2000 | Rhoads |
| 5,973,842 | A | 10/1999 | Spangenberg | 6,127,475 A | 10/2000 | Vollenberg et al. |
| 5,974,141 | A | 10/1999 | Saito | 6,131,161 A | 10/2000 | Linnartz |
| 5,974,548 | A | 10/1999 | Adams | 6,134,582 A | 10/2000 | Kennedy |
| 5,975,583 | A | 11/1999 | Cobben et al. | 6,138,913 A | 10/2000 | Cyr et al. |
| 5,977,514 | A | 11/1999 | Feng et al. | 6,141,611 A | 10/2000 | Mackey et al. |
| 5,978,773 | A | 11/1999 | Hudetz et al. | 6,143,852 A | 11/2000 | Harrison et al. |
| 5,979,757 | A | 11/1999 | Tracy et al. | 6,146,032 A | 11/2000 | Dunham |
| 5,982,912 | A | 11/1999 | Fukui et al. | 6,146,741 A | 11/2000 | Ogawa et al. |
| 5,983,218 | A | 11/1999 | Syeda-Mahmood | 6,151,403 A | 11/2000 | Luo |
| 5,984,366 | A | 11/1999 | Priddy | 6,155,168 A | 12/2000 | Sakamoto |
| 5,985,078 | A | 11/1999 | Suess et al. | 6,155,605 A | 12/2000 | Bratchley et al. |
| 5,987,434 | A | 11/1999 | Libman | 6,156,032 A | 12/2000 | Lennox |
| 5,988,820 | A | 11/1999 | Huang et al. | 6,157,330 A | 12/2000 | Bruekers et al. |
| 5,991,429 | A | 11/1999 | Coffin et al. | 6,159,327 A | 12/2000 | Forkert |
| 5,991,733 | A | 11/1999 | Aleia et al. | 6,160,526 A | 12/2000 | Hirai et al. |
| 5,991,876 | A | 11/1999 | Johnson et al. | 6,160,903 A | 12/2000 | Hamid et al. |
| 6,000,607 | A | 12/1999 | Ohki et al. | 6,161,071 A | 12/2000 | Shuman et al. |
| 6,002,383 | A | 12/1999 | Shimada | 6,162,160 A | 12/2000 | Ohshima et al. |
| 6,003,581 | A | 12/1999 | Aihara | 6,163,770 A | 12/2000 | Gamble et al. |
| 6,007,660 | A | 12/1999 | Forkert | 6,163,842 A | 12/2000 | Barton |
| 6,007,929 | A | 12/1999 | Robertson et al. | 6,164,548 A | 12/2000 | Curiel |
| 6,009,402 | A | 12/1999 | Whitworth | 6,165,696 A | 12/2000 | Fischer |
| 6,012,641 | A | 1/2000 | Watada | 6,173,284 B1 | 1/2001 | Brown |
| 6,016,225 | A | 1/2000 | Anderson | 6,173,901 B1 | 1/2001 | McCannel |
| 6,017,972 | A | 1/2000 | Harris et al. | 6,174,400 B1 | 1/2001 | Krutak, Sr. et al. |
| 6,022,905 | A | 2/2000 | Harris et al. | 6,179,338 B1 | 1/2001 | Bergmann et al. |
| 6,024,287 | A | 2/2000 | Takai et al. | 6,181,806 B1 | 1/2001 | Kado et al. |
| 6,025,462 | A | 2/2000 | Wang et al. | 6,183,018 B1 | 2/2001 | Braun et al. |
| 6,028,134 | A | 2/2000 | Zhang et al. | 6,184,782 B1 | 2/2001 | Oda et al. |
| 6,036,099 | A | 3/2000 | Leighton | 6,185,042 B1 | 2/2001 | Lomb et al. |
| 6,036,807 | A | 3/2000 | Brongers | 6,185,316 B1 | 2/2001 | Buffam |
| 6,037,102 | A | 3/2000 | Loerzer et al. | 6,185,490 B1 | 2/2001 | Ferguson |
| 6,037,860 | A | 3/2000 | Zander et al. | 6,185,540 B1 | 2/2001 | Schreitmueller et al. |
| 6,038,012 | A | 3/2000 | Bley | 6,186,404 B1 | 2/2001 | Ehrhart et al. |
| 6,038,333 | A | 3/2000 | Wang | 6,199,144 B1 | 3/2001 | Arora et al. |
| 6,038,393 | A | 3/2000 | Iyengar et al. | 6,202,932 B1 | 3/2001 | Rapeli |
| 6,042,249 | A | 3/2000 | Spangenberg | 6,205,249 B1 | 3/2001 | Moskowitz |
| 6,043,813 | A | 3/2000 | Stickney et al. | 6,206,292 B1 | 3/2001 | Robertz et al. |
| 6,047,888 | A | 4/2000 | Dethloff | 6,207,244 B1 | 3/2001 | Hesch |
| 6,049,055 | A | 4/2000 | Fannash et al. | 6,207,344 B1 | 3/2001 | Ramlow et al. |
| 6,049,463 | A | 4/2000 | O'Malley et al. | 6,209,923 B1 | 4/2001 | Thaxton et al. |
| 6,049,665 | A | 4/2000 | Branson et al. | 6,210,777 B1 | 4/2001 | Vermeulen et al. |
| 6,051,297 | A | 4/2000 | Maier et al. | 6,214,916 B1 | 4/2001 | Mercx et al. |
| 6,052,486 | A | 4/2000 | Knowlton et al. | 6,214,917 B1 | 4/2001 | Linzmeier et al. |
| 6,054,170 | A | 4/2000 | Chess et al. | 6,219,639 B1 | 4/2001 | Bakis et al. |
| 6,062,604 | A | 5/2000 | Taylor et al. | 6,221,552 B1 | 4/2001 | Street et al. |
| 6,064,414 | A | 5/2000 | Kobayashi et al. | 6,223,125 B1 | 4/2001 | Hall |
| 6,064,764 | A | 5/2000 | Bhaskaran et al. | 6,226,623 B1 | 5/2001 | Schein et al. |
| 6,064,983 | A | 5/2000 | Koehler | 6,234,537 B1 | 5/2001 | Gutmann et al. |
| 6,066,437 | A | 5/2000 | Kosslinger | 6,236,975 B1 | 5/2001 | Boe et al. |
| 6,066,594 | A | 5/2000 | Gunn et al. | 6,238,840 B1 | 5/2001 | Hirayama et al. |
| 6,071,855 | A | 6/2000 | Patton et al. | 6,238,847 B1 | 5/2001 | Axtell, III et al. |
| 6,072,894 | A | 6/2000 | Payne | 6,243,480 B1 | 6/2001 | Zhao et al. |
| 6,073,854 | A | 6/2000 | Bravenec et al. | 6,244,514 B1 | 6/2001 | Otto |
| 6,075,223 | A | 6/2000 | Harrison | 6,246,933 B1 | 6/2001 | Bague |
| 6,076,026 | A | 6/2000 | Jambhekar et al. | 6,247,644 B1 | 6/2001 | Horne et al. |
| 6,081,832 | A | 6/2000 | Gilchrist et al. | 6,250,554 B1 | 6/2001 | Leo et al. |

| | | |
|---|---|---|
| 6,254,127 B1 | 7/2001 | Breed et al. |
| 6,256,736 B1 | 7/2001 | Coppersmith et al. |
| 6,257,486 B1 | 7/2001 | Teicher et al. |
| 6,258,896 B1 | 7/2001 | Abuelyaman et al. |
| 6,259,506 B1 | 7/2001 | Lawandy |
| 6,260,029 B1 | 7/2001 | Critelli |
| 6,264,296 B1 | 7/2001 | Klinefelter et al. |
| 6,268,804 B1 | 7/2001 | Janky et al. |
| 6,277,232 B1 | 8/2001 | Wang et al. |
| 6,283,188 B1 | 9/2001 | Maynard et al. |
| 6,284,337 B1 | 9/2001 | Lorimor et al. |
| 6,286,036 B1 | 9/2001 | Rhoads |
| 6,286,761 B1 | 9/2001 | Wen |
| 6,289,108 B1 | 9/2001 | Rhoads |
| 6,291,551 B1 | 9/2001 | Kniess et al. |
| 6,292,092 B1 | 9/2001 | Chow et al. |
| 6,292,575 B1 | 9/2001 | Bortolussi et al. |
| 6,301,164 B1 | 10/2001 | Manning et al. |
| 6,301,363 B1 | 10/2001 | Mowry, Jr. |
| 6,302,444 B1 | 10/2001 | Cobben |
| 6,308,187 B1 | 10/2001 | DeStefano |
| 6,311,214 B1 | 10/2001 | Rhoads |
| 6,312,858 B1 | 11/2001 | Yacobucci et al. |
| 6,313,436 B1 | 11/2001 | Harrison |
| 6,316,538 B1 | 11/2001 | Anderson et al. |
| 6,321,981 B1 | 11/2001 | Ray et al. |
| 6,324,091 B1 | 11/2001 | Gryko et al. |
| 6,324,573 B1 | 11/2001 | Rhoads |
| 6,326,128 B1 | 12/2001 | Telser et al. |
| 6,336,096 B1 | 1/2002 | Jernberg |
| 6,340,725 B1 | 1/2002 | Wang et al. |
| 6,341,169 B1 | 1/2002 | Cadorette, Jr. et al. |
| 6,343,138 B1 | 1/2002 | Rhoads |
| 6,343,303 B1 | 1/2002 | Nevranmont |
| 6,345,105 B1 | 2/2002 | Nitta et al. |
| 6,351,537 B1 | 2/2002 | Dovgodko et al. |
| 6,351,893 B1 | 3/2002 | St. Pierre |
| 6,357,664 B1 | 3/2002 | Zercher |
| 6,363,360 B1 | 3/2002 | Madden |
| 6,368,684 B1 | 4/2002 | Onishi et al. |
| 6,372,394 B1 | 4/2002 | Zientek |
| 6,380,131 B2 | 4/2002 | Griebel et al. |
| 6,381,415 B1 | 4/2002 | Terada |
| 6,381,561 B1 | 4/2002 | Bomar, Jr. et al. |
| 6,389,151 B1 | 5/2002 | Carr et al. |
| 6,389,155 B2 | 5/2002 | Funayama et al. |
| 6,390,375 B2 | 5/2002 | Kayanakis |
| 6,397,334 B1 | 5/2002 | Chainer et al. |
| 6,400,386 B1 | 6/2002 | No |
| 6,404,643 B1 | 6/2002 | Chung |
| 6,408,082 B1 | 6/2002 | Rhoads et al. |
| 6,408,304 B1 | 6/2002 | Kumhyr |
| 6,413,687 B1 | 7/2002 | Hattori et al. |
| 6,418,154 B1 | 7/2002 | Kneip et al. |
| 6,421,013 B1 | 7/2002 | Chung |
| 6,424,029 B1 | 7/2002 | Giesler |
| 6,424,249 B1 | 7/2002 | Houvener |
| 6,427,744 B2 | 8/2002 | Seki et al. |
| 6,430,306 B2 | 8/2002 | Slocum et al. |
| 6,444,068 B1 | 9/2002 | Koops et al. |
| 6,444,377 B1 | 9/2002 | Jotcham et al. |
| 6,446,086 B1 | 9/2002 | Bartlett et al. |
| 6,446,865 B1 | 9/2002 | Holt et al. |
| 6,449,377 B1 | 9/2002 | Rhoads |
| 6,463,416 B1 | 10/2002 | Messina |
| 6,466,982 B1 | 10/2002 | Ruberg |
| 6,469,288 B1 | 10/2002 | Sasaki et al. |
| 6,473,165 B1 | 10/2002 | Coombs et al. |
| 6,474,695 B1 | 11/2002 | Schneider et al. |
| 6,475,588 B1 | 11/2002 | Schottland et al. |
| 6,478,228 B1 | 11/2002 | Ikefuji et al. |
| 6,478,229 B1 | 11/2002 | Epstein |
| 6,482,495 B1 | 11/2002 | Kohama et al. |
| 6,483,993 B1 | 11/2002 | Misumi et al. |
| 6,485,319 B2 | 11/2002 | Bricaud et al. |
| 6,487,301 B1 | 11/2002 | Zhao |
| 6,493,650 B1 | 12/2002 | Rodgers et al. |
| 6,500,386 B1 | 12/2002 | Burstein |
| 6,503,310 B1 | 1/2003 | Sullivan |
| 6,525,672 B2 | 2/2003 | Chainer et al. |
| 6,526,161 B1 | 2/2003 | Yan |
| 6,532,459 B1 | 3/2003 | Berson |
| 6,536,665 B1 | 3/2003 | Ray et al. |
| 6,536,672 B1 | 3/2003 | Outwater |
| 6,542,622 B1 | 4/2003 | Nelson et al. |
| 6,546,112 B1 | 4/2003 | Rhoads |
| 6,555,213 B1 | 4/2003 | Koneripalli et al. |
| 6,570,609 B1 | 5/2003 | Heien |
| 6,580,819 B1 | 6/2003 | Rhoads |
| 6,581,839 B1 | 6/2003 | Lasch et al. |
| 6,583,813 B1 * | 6/2003 | Enright et al. ............... 348/150 |
| 6,606,420 B1 | 8/2003 | Loce et al. |
| 6,608,911 B2 | 8/2003 | Lofgren et al. |
| 6,614,914 B1 | 9/2003 | Rhoads et al. |
| 6,616,993 B2 | 9/2003 | Usuki et al. |
| 6,638,635 B2 | 10/2003 | Hattori et al. |
| 6,641,874 B2 | 11/2003 | Kuntz et al. |
| 6,650,761 B1 | 11/2003 | Rodriguez et al. |
| 6,675,074 B2 | 1/2004 | Hathout et al. |
| 6,681,032 B2 | 1/2004 | Bortolussi et al. |
| 6,685,312 B2 | 2/2004 | Klinefelter et al. |
| 6,702,282 B2 | 3/2004 | Pribula et al. |
| 6,712,397 B1 | 3/2004 | Mayer et al. |
| 6,715,797 B2 | 4/2004 | Curiel |
| 6,719,469 B2 | 4/2004 | Yasui et al. |
| 6,723,479 B2 | 4/2004 | Van De Witte et al. |
| 6,725,383 B2 | 4/2004 | Kyle |
| 6,729,719 B2 | 5/2004 | Klinefelter et al. |
| 6,751,336 B2 | 6/2004 | Zhao |
| 6,752,432 B1 | 6/2004 | Richardson |
| 6,758,616 B2 | 7/2004 | Pribula et al. |
| 6,764,014 B2 | 7/2004 | Lasch et al. |
| 6,765,704 B2 | 7/2004 | Drinkwater |
| 6,769,061 B1 | 7/2004 | Ahern |
| 6,782,115 B2 | 8/2004 | Decker et al. |
| 6,782,116 B1 | 8/2004 | Zhao et al. |
| 6,794,115 B2 | 9/2004 | Telser et al. |
| 6,803,114 B1 | 10/2004 | Vere et al. |
| 6,817,530 B2 | 11/2004 | Labrec et al. |
| 6,818,699 B2 | 11/2004 | Kajimaru et al. |
| 6,825,265 B2 | 11/2004 | Daga et al. |
| 6,827,277 B2 | 12/2004 | Bloomberg et al. |
| 6,827,283 B2 | 12/2004 | Kappe et al. |
| 6,832,205 B2 | 12/2004 | Aragones et al. |
| 6,843,422 B2 | 1/2005 | Jones et al. |
| 6,853,739 B2 | 2/2005 | Kyle |
| 6,865,011 B2 | 3/2005 | Whitehead et al. |
| 6,882,737 B2 | 4/2005 | Lofgren et al. |
| 6,900,767 B2 | 5/2005 | Hattori |
| 6,903,850 B2 | 6/2005 | Kay et al. |
| 6,923,378 B2 | 8/2005 | Jones et al. |
| 6,925,468 B1 | 8/2005 | Bobbitt et al. |
| 6,938,029 B1 | 8/2005 | Tien |
| 6,942,331 B2 | 9/2005 | Guillen et al. |
| 6,944,773 B1 | 9/2005 | Abrahams |
| 6,952,741 B1 | 10/2005 | Bartlett et al. |
| 6,954,293 B2 | 10/2005 | Heckenkamp et al. |
| 6,959,098 B1 | 10/2005 | Alattar |
| 6,961,708 B1 | 11/2005 | Bierenbaum |
| 6,963,659 B2 | 11/2005 | Tumey et al. |
| 6,970,844 B1 | 11/2005 | Bierenbaum |
| 6,978,036 B2 | 12/2005 | Alattar et al. |
| 7,013,284 B2 | 3/2006 | Guyan et al. |
| 7,016,516 B2 | 3/2006 | Rhoads |
| 7,024,418 B1 | 4/2006 | Childress |
| 7,036,944 B2 | 5/2006 | Budd et al. |

| | | | | | |
|---|---|---|---|---|---|
| 7,043,052 B2 | 5/2006 | Rhoads | 2002/0136448 A1 | 9/2002 | Bortolussi et al. |
| 7,063,264 B2 | 6/2006 | Bi et al. | 2002/0145652 A1 | 10/2002 | Lawrence et al. |
| 7,081,282 B2 | 7/2006 | Kuntz et al. | 2002/0146549 A1 | 10/2002 | Kranenburg-Van Dijk et al. |
| 7,086,666 B2 | 8/2006 | Richardson | 2002/0166635 A1 | 11/2002 | Sasaki et al. |
| 7,095,426 B1 | 8/2006 | Childress | 2002/0170966 A1 | 11/2002 | Hannigan et al. |
| 7,143,950 B2 | 12/2006 | Jones et al. | 2002/0187215 A1 | 12/2002 | Trapani et al. |
| 7,183,361 B2 | 2/2007 | Toman | 2002/0191082 A1 | 12/2002 | Fujino et al. |
| 7,185,201 B2 | 2/2007 | Rhoads et al. | 2002/0194476 A1 | 12/2002 | Lewis et al. |
| 7,196,813 B2 | 3/2007 | Matsumoto | 2003/0002710 A1 | 1/2003 | Rhoads |
| 7,197,444 B2 | 3/2007 | Bomar, Jr. et al. | 2003/0031340 A1 | 2/2003 | Alattar et al. |
| 7,199,456 B2 | 4/2007 | Krappe et al. | 2003/0031348 A1 | 2/2003 | Kuepper et al. |
| 7,202,970 B1 | 4/2007 | Maher et al. | 2003/0034319 A1 | 2/2003 | Meherin et al. |
| 7,206,820 B1 | 4/2007 | Rhoads et al. | 2003/0038174 A1 | 2/2003 | Jones |
| 7,207,494 B2 | 4/2007 | Theodossiou et al. | 2003/0052680 A1 | 3/2003 | Konijn |
| 7,277,891 B2 | 10/2007 | Howard et al. | 2003/0055638 A1 | 3/2003 | Burns et al. |
| 7,278,580 B2 | 10/2007 | Jones et al. | 2003/0056499 A1 | 3/2003 | Binder et al. |
| 7,289,643 B2 | 10/2007 | Brunk et al. | 2003/0056500 A1 | 3/2003 | Huynh et al. |
| 7,343,307 B1 | 3/2008 | Childress | 2003/0059124 A1 | 3/2003 | Center, Jr. |
| 7,344,325 B2 | 3/2008 | Meier et al. | 2003/0062421 A1 | 4/2003 | Bloomberg et al. |
| 7,353,196 B1 | 4/2008 | Bobbitt et al. | 2003/0099379 A1 | 5/2003 | Monk et al. |
| 7,356,541 B1 | 4/2008 | Doughty | 2003/0114972 A1 | 6/2003 | Takafuji et al. |
| 7,359,863 B1 | 4/2008 | Evenshaug et al. | 2003/0115459 A1 | 6/2003 | Monk |
| 7,363,264 B1 | 4/2008 | Doughty et al. | 2003/0117262 A1 | 6/2003 | Anderegg et al. |
| 7,398,219 B1 | 7/2008 | Wolfe | 2003/0126121 A1 | 7/2003 | Khan et al. |
| 7,418,400 B1 | 8/2008 | Lorenz | 2003/0128862 A1 | 7/2003 | Decker et al. |
| 7,430,514 B1 | 9/2008 | Childress et al. | 2003/0141358 A1 | 7/2003 | Hudson et al. |
| 7,430,515 B1 | 9/2008 | Wolfe et al. | 2003/0161507 A1 | 8/2003 | Lawandy |
| 7,498,075 B2 | 3/2009 | Bloomberg et al. | 2003/0173406 A1 | 9/2003 | Bi et al. |
| 7,515,336 B2 | 4/2009 | Lippey et al. | 2003/0178487 A1 | 9/2003 | Rogers |
| 7,526,487 B1 | 4/2009 | Bobbitt et al. | 2003/0178495 A1 | 9/2003 | Jones et al. |
| 7,548,881 B2 | 6/2009 | Narayan et al. | 2003/0183695 A1 | 10/2003 | Labrec et al. |
| 2001/0002035 A1 | 5/2001 | Kayanakis | 2003/0188659 A1 | 10/2003 | Merry et al. |
| 2001/0013395 A1 | 8/2001 | Pourmand et al. | 2003/0200123 A1 | 10/2003 | Burge et al. |
| 2001/0037223 A1 | 11/2001 | Beery et al. | 2003/0211296 A1 | 11/2003 | Jones et al. |
| 2001/0037455 A1 | 11/2001 | Lawandy et al. | 2003/0226897 A1 | 12/2003 | Jones et al. |
| 2002/0007289 A1 | 1/2002 | Malin et al. | 2003/0234286 A1 | 12/2003 | Labrec et al. |
| 2002/0018430 A1 | 2/2002 | Heckenkamp et al. | 2003/0234292 A1 | 12/2003 | Jones |
| 2002/0020832 A1 | 2/2002 | Oka et al. | 2004/0011874 A1 | 1/2004 | Theodossiou et al. |
| 2002/0021001 A1 | 2/2002 | Stratford et al. | 2004/0017490 A1 | 1/2004 | Lin |
| 2002/0023218 A1 | 2/2002 | Lawandy et al. | 2004/0024694 A1 | 2/2004 | Lawrence et al. |
| 2002/0027359 A1 | 3/2002 | Cobben et al. | 2004/0030587 A1 | 2/2004 | Danico et al. |
| 2002/0030587 A1 | 3/2002 | Jackson | 2004/0036574 A1 | 2/2004 | Bostrom |
| 2002/0034319 A1 | 3/2002 | Tumey et al. | 2004/0049409 A1 | 3/2004 | Wahlbin et al. |
| 2002/0035488 A1 | 3/2002 | Aquila et al. | 2004/0054556 A1 | 3/2004 | Wahlbin et al. |
| 2002/0041372 A1 | 4/2002 | Gardner et al. | 2004/0054557 A1 | 3/2004 | Wahlbin et al. |
| 2002/0048399 A1 | 4/2002 | Lee et al. | 2004/0054558 A1 | 3/2004 | Wahlbin et al. |
| 2002/0049619 A1 | 4/2002 | Wahlbin et al. | 2004/0054559 A1 | 3/2004 | Wahlbin et al. |
| 2002/0051569 A1 | 5/2002 | Kita | 2004/0066441 A1 | 4/2004 | Jones et al. |
| 2002/0055860 A1 | 5/2002 | Wahlbin et al. | 2004/0074973 A1 | 4/2004 | Schneck et al. |
| 2002/0055861 A1 | 5/2002 | King et al. | 2004/0076310 A1 | 4/2004 | Hersch et al. |
| 2002/0059083 A1 | 5/2002 | Wahlbin et al. | 2004/0093349 A1 | 5/2004 | Buinevicius et al. |
| 2002/0059084 A1 | 5/2002 | Wahlbin et al. | 2004/0099731 A1 | 5/2004 | Olenick et al. |
| 2002/0059085 A1 | 5/2002 | Wahlbin et al. | 2004/0102984 A1 | 5/2004 | Wahlbin et al. |
| 2002/0059086 A1 | 5/2002 | Wahlbin et al. | 2004/0102985 A1 | 5/2004 | Wahlbin et al. |
| 2002/0059087 A1 | 5/2002 | Wahlbin et al. | 2004/0103004 A1 | 5/2004 | Wahlbin et al. |
| 2002/0059097 A1 | 5/2002 | Wahlbin et al. | 2004/0103005 A1 | 5/2004 | Wahlbin et al. |
| 2002/0062232 A1 | 5/2002 | Wahlbin et al. | 2004/0103006 A1 | 5/2004 | Wahlbin et al. |
| 2002/0062233 A1 | 5/2002 | Wahlbin et al. | 2004/0103007 A1 | 5/2004 | Wahlbin et al. |
| 2002/0062234 A1 | 5/2002 | Wahlbin et al. | 2004/0103008 A1 | 5/2004 | Wahlbin et al. |
| 2002/0062235 A1 | 5/2002 | Wahlbin et al. | 2004/0103009 A1 | 5/2004 | Wahlbin et al. |
| 2002/0069091 A1 | 6/2002 | Wahlbin et al. | 2004/0103010 A1 | 5/2004 | Wahlbin et al. |
| 2002/0069092 A1 | 6/2002 | Wahlbin et al. | 2004/0111301 A1 | 6/2004 | Wahlbin et al. |
| 2002/0070280 A1 | 6/2002 | Ikefuji et al. | 2004/0133582 A1 | 7/2004 | Howard et al. |
| 2002/0077380 A1 | 6/2002 | Wessels et al. | 2004/0198858 A1 | 10/2004 | Labrec |
| 2002/0080992 A1 | 6/2002 | Decker et al. | 2004/0213437 A1 | 10/2004 | Howard et al. |
| 2002/0080994 A1 | 6/2002 | Lofgren et al. | 2004/0243567 A1 | 12/2004 | Levy |
| 2002/0082873 A1 | 6/2002 | Wahlbin et al. | 2004/0245346 A1 | 12/2004 | Haddock |
| 2002/0087363 A1 | 7/2002 | Wahlbin et al. | 2005/0001419 A1 | 1/2005 | Levy et al. |
| 2002/0091937 A1 | 7/2002 | Ortiz | 2005/0003297 A1 | 1/2005 | Labrec |
| 2002/0106494 A1 | 8/2002 | Roth et al. | 2005/0010776 A1 | 1/2005 | Kenen et al. |
| 2002/0116330 A1 | 8/2002 | Hed et al. | 2005/0031173 A1 | 2/2005 | Hwang |
| 2002/0128881 A1 | 9/2002 | Wahlbin et al. | 2005/0035589 A1 | 2/2005 | Richardson |
| 2002/0136435 A1 | 9/2002 | Prokoski | 2005/0060205 A1 | 3/2005 | Woods et al. |

| | | | | | | |
|---|---|---|---|---|---|---|
| 2005/0072849 | A1 | 4/2005 | Jones | EP | 1110750 A2 | 6/2001 |
| 2005/0095408 | A1 | 5/2005 | LaBrec et al. | EP | 1410315 | 4/2004 |
| 2005/0160294 | A1 | 7/2005 | LaBrec et al. | EP | 1456810 A1 | 9/2004 |
| 2005/0192850 | A1 | 9/2005 | Lorenz | EP | 1459239 A1 | 9/2004 |
| 2006/0027667 | A1 | 2/2006 | Jones et al. | EP | 1546798 A1 | 6/2005 |
| 2006/0039581 | A1 | 2/2006 | Decker et al. | EP | 1550077 A2 | 7/2005 |
| 2007/0152067 | A1 | 7/2007 | Bi et al. | EP | 1564673 A2 | 8/2005 |
| 2007/0158939 | A1 | 7/2007 | Jones et al. | EP | 1565857 A2 | 8/2005 |
| 2007/0187515 | A1 | 8/2007 | Theodossiou et al. | EP | 1603301 A1 | 12/2005 |
| | | | | EP | 1618521 A2 | 1/2006 |
| | FOREIGN PATENT DOCUMENTS | | | EP | 1909971 A2 | 4/2008 |
| CA | 2470094 | | 6/2003 | GB | 1088318 A | 10/1967 |
| CA | 2469956 | | 7/2003 | GB | 1213193 A | 11/1970 |
| CN | 1628294 | A | 6/2005 | GB | 1472581 A | 5/1977 |
| CN | 1628318 | A | 6/2005 | GB | 2063018 A | 5/1981 |
| CN | 1647428 | A | 7/2005 | GB | 2067871 A | 7/1981 |
| CN | 1664695 | A | 9/2005 | GB | 2132136 | 7/1984 |
| DE | 2943436 | | 5/1981 | GB | 2204984 A | 11/1988 |
| DE | 3738636 | | 6/1988 | GB | 2227570 | 8/1990 |
| DE | 3806411 | A1 | 9/1989 | GB | 2240948 A | 8/1991 |
| DE | 9315294 | | 2/1994 | GB | 2325765 A | 12/1998 |
| DE | 4403513 | A1 | 8/1995 | JP | 63146909 | 6/1988 |
| DE | 69406213 | | 3/1998 | JP | 3115066 A | 5/1991 |
| EP | 058482 | A1 | 8/1982 | JP | 03126589 | 5/1991 |
| EP | 111075 | A2 | 6/1984 | JP | 3-185585 A | 8/1991 |
| EP | 0157568 | | 10/1985 | JP | 03-239595 A | 10/1991 |
| EP | 190997 | A2 | 8/1986 | JP | 4-248771 A | 9/1992 |
| EP | 0233296 | | 8/1987 | JP | 5-242217 A | 9/1993 |
| EP | 0279104 | | 8/1988 | JP | 6234289 | 8/1994 |
| EP | 0280773 | | 9/1988 | JP | 7088974 | 4/1995 |
| EP | 0336075 | A1 | 10/1989 | JP | 7115474 A | 5/1995 |
| EP | 0356980 | | 3/1990 | JP | 09064545 A | 3/1997 |
| EP | 0356981 | | 3/1990 | JP | 10171758 A | 6/1998 |
| EP | 0356982 | | 3/1990 | JP | 10177613 A | 6/1998 |
| EP | 0362640 | | 4/1990 | JP | 10197285 | 7/1998 |
| EP | 0366075 | A2 | 5/1990 | JP | 10214283 | 8/1998 |
| EP | 0366923 | | 5/1990 | JP | 11161711 | 6/1999 |
| EP | 372601 | A1 | 6/1990 | JP | 11259620 A | 9/1999 |
| EP | 0373572 | | 6/1990 | JP | 11301121 | 11/1999 |
| EP | 0374835 | | 6/1990 | JP | 11321166 | 11/1999 |
| EP | 411232 | A2 | 2/1991 | JP | 2000-292834 A | 10/2000 |
| EP | 0420613 | | 4/1991 | JP | 2001-058485 A | 3/2001 |
| EP | 441702 | A1 | 8/1991 | JP | 2004355659 | 12/2004 |
| EP | 0446834 | | 9/1991 | JP | 2005525254 | 8/2005 |
| EP | 0446846 | | 9/1991 | JP | 2005525949 | 9/2005 |
| EP | 0464268 | A1 | 1/1992 | JP | 2005276238 | 10/2005 |
| EP | 0465018 | | 1/1992 | JP | 2006190331 | 7/2006 |
| EP | 0479265 | | 4/1992 | WO | WO-82/04149 A1 | 11/1982 |
| EP | 493091 | A1 | 7/1992 | WO | WO-89/00319 A1 | 1/1989 |
| EP | 0523304 | | 1/1993 | WO | WO-89/08915 A1 | 9/1989 |
| EP | 0524140 | A1 | 1/1993 | WO | WO-91/16722 A1 | 10/1991 |
| EP | 0539001 | | 4/1993 | WO | WO-94/27228 A1 | 11/1994 |
| EP | 581317 | A2 | 2/1994 | WO | WO-95/10835 A1 | 4/1995 |
| EP | 629972 | A2 | 12/1994 | WO | WO-95/13597 A2 | 5/1995 |
| EP | 0636495 | | 2/1995 | WO | WO-95/14289 A2 | 5/1995 |
| EP | 0637514 | | 2/1995 | WO | WO-95/20291 A1 | 7/1995 |
| EP | 642060 | A2 | 3/1995 | WO | WO-96/03286 A1 | 2/1996 |
| EP | 0649754 | | 4/1995 | WO | WO-96/27259 A1 | 9/1996 |
| EP | 650146 | A1 | 4/1995 | WO | WO-96/36163 A2 | 11/1996 |
| EP | 0696518 | | 2/1996 | WO | WO-97/01446 A1 | 1/1997 |
| EP | 0697433 | A1 | 2/1996 | WO | WO-97/18092 A1 | 5/1997 |
| EP | 705025 | A2 | 4/1996 | WO | WO-97/32733 A1 | 9/1997 |
| EP | 0734870 | | 10/1996 | WO | WO-97/43736 A1 | 11/1997 |
| EP | 0736860 | | 10/1996 | WO | WO-98/14887 A1 | 4/1998 |
| EP | 0739748 | | 10/1996 | WO | WO-98/20642 A1 | 5/1998 |
| EP | 0926608 | | 6/1999 | WO | WO-19980019869 | 5/1998 |
| EP | 0982149 | | 3/2000 | WO | WO-98/24050 A1 | 6/1998 |
| EP | 0991014 | | 4/2000 | WO | WO-19980030224 | 7/1998 |
| EP | 1013463 | A2 | 6/2000 | WO | WO-98/40823 A1 | 9/1998 |
| EP | 1017016 | | 7/2000 | WO | WO-98/49813 A1 | 11/1998 |
| EP | 1035503 | | 9/2000 | WO | WO-99/24934 A1 | 5/1999 |
| EP | 1046515 | A1 | 10/2000 | WO | WO-99/34277 A2 | 7/1999 |
| | | | | WO | WO00/10116 | 2/2000 |

| | | |
|---|---|---|
| WO | WO-00/10116 A1 | 2/2000 |
| WO | WO-00/16984 A1 | 3/2000 |
| WO | WO-00/036593 A2 | 6/2000 |
| WO | WO-00/43214 A1 | 7/2000 |
| WO | WO-20000043215 | 7/2000 |
| WO | WO-20000043216 | 7/2000 |
| WO | WO-00/45344 A1 | 8/2000 |
| WO | WO-00/78554 A1 | 12/2000 |
| WO | WO-01/00719 A1 | 1/2001 |
| WO | WO-01/29764 A1 | 4/2001 |
| WO | WO-01/43080 A1 | 6/2001 |
| WO | WO-01/45559 A1 | 6/2001 |
| WO | WO-01/56805 A1 | 8/2001 |
| WO | WO-01/95249 A2 | 12/2001 |
| WO | WO-01/96112 A1 | 12/2001 |
| WO | WO-02/26507 A1 | 4/2002 |
| WO | WO-02/27647 A1 | 4/2002 |
| WO | WO-02/42371 A2 | 5/2002 |
| WO | WO-0245969 | 6/2002 |
| WO | WO-02/52499 A2 | 7/2002 |
| WO | WO-02/53499 A1 | 7/2002 |
| WO | WO-02/78965 A1 | 10/2002 |
| WO | WO-02/96666 A1 | 12/2002 |
| WO | WO-03/05291 A1 | 1/2003 |
| WO | WO-03/30079 A2 | 4/2003 |
| WO | WO-03/55684 A2 | 7/2003 |
| WO | WO-03/56500 A1 | 7/2003 |
| WO | WO-03/56507 A1 | 7/2003 |
| WO | WO-03/95210 A2 | 11/2003 |
| WO | WO-03/96258 A2 | 11/2003 |
| WO | WO-2004/025365 A1 | 3/2004 |
| WO | WO-2004/028943 A2 | 4/2004 |
| WO | WO-2004/34236 A2 | 4/2004 |
| WO | WO-04/042512 A2 | 5/2004 |
| WO | WO-2004/49242 A2 | 6/2004 |
| WO | WO-04/097595 A2 | 11/2004 |

OTHER PUBLICATIONS

"Biometric Access Control System, Face and Fingerprint Recognition," BioAxs 9800, 4 pages.
"FaceIt Identification SDK," Identix, Inc., 2002, 2 pages.
"FaceIt An Award-Winning Facial Recognition Software Engine," Visionics, not dated, 1 page.
FaceIt-Hands off, continuous and in real-time, Visionics, not dated, 1 page.
FaceIt, "Real Time Facial Surveillance and Identification System," not dated, 5 pages.
"Facial Scan Technology: How It Works," Facial-Scan, 1999, 4 pages.
"Facial Scan Vendors and Links," Facial-Scan, 1999, 3 pages.
"Frequently Asked Questions," FaceIt software, not dated, 13 pages.
"ID-2000-Image Detection & Biometric Facial Recognition," 2000, 3 pages.
"Identification Solutions—Driver's Licenses and Passports," Imagis Technologies, 2001, 1 page.
Identix, Inc., ImageWare Brings Facial Recognition to the Web, press release, 2002, 2 pages.
ImageWare Takes Enterprise ID Management to the World Wide Web, new release, 2001, 2 pages.
"Introducing Smart CCTV," FaceIt, Visionics, 2000, 8 pages.
Hong et al., Integrating Faces and Fingerprints for Personal Identification, IEEE Trans. on Pattern Analysis and Machine Intelligence, vol. 20, No. 12, Dec. 1998, pp. 1295-1307.
Indovina, "Multimodal Biometric Authentication Methods," A COTS Approach, 8 pages.
Jain et al., A Multimodal Biometric System Using fingerprint, Face and Speech, Proc. 2d Int. Conf. on AVBPA, Mar. 1999, pp. 182-187.
Jarvis, "Are Privacy Rights of Citizens Being Eroded Wholesale?" not dated, 5 pages.
Liu, "A Practical Guide to Biometric Security Technology," 2001 IEEE, Jan./Feb. 2001 IT Pro, pp. 27-32.
Madan, "The Face is Familiar," 2001, 2 pages.

Mhatre, "Efficient Search and Retrieval in Biometric Databases," 4 pages.
"Multi-Modal Biometrics Authentication System," findbiometrics.com—Multimodal Biometrics Guides and Articles, Oct. 9, 2003, 4 pages.
Multimodal Biometric Systems: Applications and Usage Scenarios, International Biometric Group, 2003, 27 pages.
Nandakumar, "Score Normalizatin in Multimodal Biomentric Systems," 2 pages.
Palla, "Classificatin and Indexing in Large Biometric Databases," 2 pages.
Ross, "Information Fusion in Biometrics," Proc. of $3^{rd}$ Intl Conf. on Audio- and Video-Based Person Authentication, pp. 354-359, Jun. 6-8, 2001.
Ross, "Multimodal Biometrics: An Overview," 12 European Signal Processing Conf., pp. 1221-1224, Sep. 2004.
Unisys Selects Identix for Department of Defense Research on Three Dimensional Facial Recognition, Press Release, Jul. 29, 2003, 3 pages.
Wayne Electronics, Inc., What is FaceIt? 2001, 5 pages.
"We're Watching Out for You," Business Solutions, 1999, 3 pages.
Willems, "Biometrics: Detecting the 'Goats'," Speech Technology Magazine, Oct. 9, 2003, 6 pages.
"@ Fault A Commitment to Consistency," Computer Sciences Corporation, Copyright 2000, pp. 1-2.
"About Card Printing How it Works", <http://www.racoindustries.com/aboutcardp5.htm>., pp. 1-3 (Dec. 22, 2002).
"Access Control and Copyright Protection for Images WorkPackage 8: Watermarking " Jun. 30 1995, 46 pages.
"Access Control and Copyright Protection for images, Conditional Access and Copyright Protection Based on the Use of Trusted Third Parties", 43 pages (1995).
"Access Control and Copyright Protection for Images, WorkPackage 1: Access Control and Copyright Protection for Images Need Evaluation," Jun., 1995, 21 pages.
"Access Control and Copyright Protection for Images, WorkPackage 3: Evaluation of Existing Systems," Apr. 19, 1995, 68 pages.
"Accident Reconstruction Software Maine Computer Group," Maine Computer Group, Copyright 2001, updated Oct. 1, 2001, Accessed Oct. 29, 2001, pp. 1-2.
"ADP CSG: Integrated Medical Solutions," ADP Claims Solutions Group, Copyright 2001, Accessed Oct. 30, 2001, p. 1.
"Authentication and Security Technologies," I/O Software, Inc., Accessed Oct. 10, 2002, 4 pages.
"CSC Expands Cost Containment Solutions for Claims and Legal Expenses," Computer Sciences Corporation, Jun. 27, 2001, El Segundo, CA, pp. 1-2.
"CSC Files Suit to protect Intellectual Property", PR Newswire, New York: Jan. 12, 2000, p. 1.
"CSC Introduces Liability Assessment Tool to Improve Claims Consistency," Computer Science Corporation, Oct. 31, 2001, pp. 1-2.
"CSC: Solutions Search," Computer Sciences Corporation, Copyright 2001, Accessed Oct. 30, 2001 p. 1.
"Cyphertech Systems: Introduces Digital Encoding Device to Prevent TV Piracy," Hollywood Reporter, Oct. 20, 1993, p. 23.
"FaceIt Identification SDK," Identix, Inc., Accessed Oct. 7, 2002, 2 pages.
"Facial Scan Technology: How it works," Facial-Scan, 1999, 4 pages.
"Facial Scan Vendors and Links," Facial-Scan, 1999, 3 pages.
"Foiling Card Forges With Magnetic Noise," Wall Street Journal, Feb. 8, 1994.
"Frequently Asked Questions," FaceIt software, Accessed Oct. 10, 2002, 13 pages.
"High Water FBI Limited Presentation Image Copyright Protection Software," FBI Ltd. brochure, Jul., 1995, 17 pages.
"ID-2000-Image Detection & Biometric Facial Recognition," 2000, 3 pages.
"Identification Solutions-Driver's Licenses and passports," Image Technologies, Copyright 2001-2002, Accessed Oct. 10, 2002, 1 page.
"IMS ICE," ADP Integrated Medical Solutions, Copyright 2001, Rockville, MD, pp. 1-6.

"Insurance Services Office Strengthens Claims Handling Team," ISO Properties, Inc., Copyright 1996, Accessed Jul. 13, 2009, Jersey City, NJ, pp. 1-3.
"Introducing Smart CCTV," Facelt, Visionics, 2000, 8 pages.
"ISO Claims Outcome Advisor," ISO Properties, Inc., Copyright 1996, Accessed Oct. 30, 2001, Jersey City, NJ, pp. 1-2.
"ISO to Acquire Claims Outcome Advisor from Computer Sciences and MYND," Dec. 21, 2000, accessed at www.swampfox.ws <http://www.swampfox.ws>.
"Lenticular - How it Works", The Vision—Sales Articles from 1998.
"Lenticular Prints", <http://www.shortcourses.com/how/lenticular/lentcular.htm>, pp. 1-6 Dec. 16, 2002.
"NAB—Cyphertech Starts Anti-Piracy Broadcast Tests," Newsbytes, NEW03230023, Mar. 23, 1994.
"Polaroid's Polaprime UV Invisible Ink System Winks at Hollywood As Godzilla's Eye in Promo Display", <http://www.polaroid.com/polinfo/press_releases/august98/080598a.html>., pp. 1-2 (Nov. 26, 2002).
"Policy Management Systems Corporation Announces Pilot Licensing of Claims Outcome Advisor™ to Blue Ridge Insurance Co.," PR Newswire. New York; Aug. 24, 1999, p. 1.
REC-TEC Accident Reconstruction and Analysis Computer Software, George M. Bonnett, Nov. 2001, Rockledge, FL, pp. 1-5.
"REC-TEC Accident Reconstruction Software," George M. Bonnett, Sep. 2001, Rockledge FL, pp. 1-10.
"Secure ID Center: Design a Secure ID card Key technologies for a secure ID", <http://www.datacard.com/secureid/secureid_card_technologies_features.shtm>., pp. 1-5 (Dec. 12, 2002).
"Technologies Overview", <http://www.nfive.com/Articles/2.htm>, pp. 1-2 (Dec. 22, 2002).
"The Copyright Can of Worms Opened Up By The New Electronic Media," Computergram Internations, pCGN07170006, Jul. 17, 1995 and The Copyright Can of Worms Opened Up by the New Electronic Media-2, Computergram Internations, pCGN07210008, Jul. 21, 1995, 3 pages.
"U.S. Unveils New $20 Note With Background Colors", U.S. Bureau of Engraving and Printing New Money Media Center, 2 pages. (Jul. 28, 2003).
"We're Watching Out for You," Business Solution, Accessed Oct. 10, 2002, 3 pages.
"Welcome to Orasee Corporation", <http://www.orasee.com/one/main.php3>, pp. 1-2, Dec. 13, 2002.
"What are 'Dye Sublimation Thermal Printers'? (Technology)", <http://www.nfive.com/Articles/2.htm>., pp. 1-2 (Dec. 22, 2002).
@Fault: Improve Claims Practices Through Greater consistency in Fault Assessment, Computer Sciences corporation, pp. 2, 2004. (g53).
Amended claims from WO/056507, corresponding to those in EP 02 805 980.6, Apr. 24, 2008.
Appeal Brief filed Apr. 11, 2008 and Examiner's Answer dated May 7, 2008 from U.S. Appl. No. 10/893,149.
Arachelian, "White Noise Storm," Apr. 11, 1994, Internet reference, 13 pages.
Arthur, "Digital Fingerprints Protect Artwork," New Scientist, Nov. 12, 1994, p. 24.
Aug. 16, 2007 communication from the Canadian Intellectual Property Office in Application No. 2,470,600, and a Feb. 15, 2008 Amendment in response thereto.
Baker, "Don't Throw Your Adjusters to the Lions", *Best's Review*, 95(12):66-69 (1995).
Banking Connections, Computer Sciences Corporation, Apr./May 1999, 44 pages.
Banking Connections, Computer Sciences Corporation, Apr./May 2000, 48 pages.
Banking Connections, Computer Sciences Corporation, Aug./Sep. 1999, 52 pages.
Banking Connections, Computer Sciences Corporation, Dec./Jan. 2000 48 pages.
Banking Connections, Computer Sciences Corporation, Nov./Dec. 2000, 48 pages.
Bender et al., "Techniques for Data Hiding, " Massachusetts Institute of Technology, Media Laboratory, Jan, 1995, 10 pages.

Boland et al, "Watermarking Digital Images for Copyright Protection, "Fifth International Conference on Image Processing and its Applications, Conference Date Jul. 4-6, 1995, Conf. Publ. No. 410, pp. 326-330.
Borland, "Running Microsoft Outlook 97", Microsoft Press, (1997).
Bovik, "Handbook of Image and Video Processing," Academic Press, 2000, pp. 133-136, 154, 155.
Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.
Brown, "S-Tools for Windows, Version 1.00, COPYRGT. 1994 Andy Brown, What is Steganography," Internet reference, Mar. 6, 1994, 6 pages.
Canadian Patent application 2,469,938, claims as filed, with effective filing date of Dec. 20, 2002, 10 pages.
Canadian Patent application 2,469,938, Office Action dated Jul. 24, 2006, 2 pages.
Caronni, "Assuring Ownership Rights for Digital Images," Published in the Proceedings of 'Reliable It Systems,' vis '95 HH. Bruggemann and W. Gerhardt-Hackl (Ed.), Vieweg Publishing Company, Germany, 1995, Jun. 14, 1994, 10 pages.
Castro et al., "Registration of Translated and rotated Images Using Finite Fourier Transforms," IEEE Transactions on pattern Analysis and Machine Intelligence, vol. PAMI-9, No. 5, Sep. 1987, 700-703.
Choudhury , et al., "Copyright Protection for Electronic Publishing over Computer Networks," IEEE Network Magazine, Jun. 1994, 18 pages.
Chow et al., "Forgery and Temper-Proof Identification Document," *IEEE Proc.* 1993 *Int. Camahan Conf. on Security Technology*, 11-14 (1993).
CIGNA P&C Opens National Premises Liability Center, Mar. 1999, PR Newswire, p. 1.
Clariant Masterbatches Division Price Quotation #474938, Nov. 30, 2000, 2 pages.
Clariant Masterbatches, pricing, #762998, Jan. 9, 2004, 2 pages.
Clarke, "Invisible Code Tags Electronic Images," Electronic Engineering Times, Jun. 12, 1995, n. 852, p. 42.
Collins et al., "Using Bar code - Why It's Taking Over", Second Edition, Data Capture Institute, (Contents & Index) (1990).
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Connections, Computer Sciences Corporation, Winter 2001, 39 pages.
Connections, Computer Sciences Corporation, Summer 2001, 44 pages.
Connections, Computer Sciences Corporation, Fall 2001, 39 pages.
Continuum Connections to the Americas, vol. 1, No. 1, The Continuum Company, Inc., Sep. 1995, 49 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.

Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections, vol. III, No. 4, The Continuum Company, Inc., Oct./Nov. 1995, 24 pages.
Cost Containment: Products and Solutions for the Property and Casualty Insurance Industry, Computer Science Corporation, Oct. 1999, 40 pages.
Datacard DCL30, "The Most Secure Card Personalization System for ID Programs, " 2002, 3 pages.
Dautzenberg, "Watermarking Images," Department of Microelectronics and Electrical Engineering, Trinity College Dublin, 47 pages, Oct. 1994.
Davis, "Knowledge on the Beat," Jul. 1999, Knowledge Management Magazine, www.destinationkm.com <http://www.destinationkm.com>.
Ditek@http://www.archive.org/web/20000301124742/www.ditec.com <mailto:Ditek@http://www.archive.org/web/20000301124742/www.ditec.com>, last viewed on Nov. 28, 2005.
effekte, "Plastics on the Rise", Mar. 2001, 12 pages.
EM Industries Inc., Lazer Flair LS Series Pigments, Dec. 11, 2002, 3 pages.
EP 01992398.6 first examination report, dated Jan. 7, 2005.
EP 01992398.6 notice of grant, dated Nov. 28, 2005.
EP 01992398.6 response to first examination report , dated Jul. 18,2005.
EP02797041.7 Search Report, Mar. 19, 2007, 3 pages.
EP02797041.7, communication pursuant to Article 94(3) EPC, dated Dec. 28, 2007, of related EP counterpart application, 6 pages.
Esters, "Computers Can Help Settle Auto Claims" Apr. 28, 1997, National Underwriter. vol. 101, Iss. 17, p. 10.
Examiner's Report dated May 2, 2006, from CA Application No. 2,470,600 (corresponding to PCT/US02/41681; Published as WO03/056507).
Facelt, "Real Time Facial Surveillance and Identification System," Accessed Oct. 10, 2002, 5 pages.
Final Rejection, U.S. Appl. No. 10/836,639, Bi et al., filed Apr. 29, 2004, mailed Apr. 1, 2008.
Final Rejection, U.S. Appl. No. 10/836,639, Bi et al., filed Apr. 29, 2004, mailed Sep. 21, 2006.
Fitzgerald, "Invisible Digital Copyright ID," Editor & Publisher, Jun. 25, 1994, p. 62.
Frey, Joe, "Putting a price on auto injuries: How software called Colossus evaluates your pain," Insure.com, Oct. 26, 2000, pp. 1-5.
Friedman, "The Trustworthy Digital Camera: Restoring Credibility to the Photographic Image," IEEE Transaction on Consumer Electronics, vol. 39, No. 4, Nov., 1993, pp. 905-910.
Graff, "Laser Marking Makes Bigger Imprint in Plastics", Aug. 11, 2004, 7 pages.
Grieco et al., "Behind Bars - Bar Coding Principles and Applications", PT Publication, Inc., (Table of Contents and Index) (1989).
Harts, "Reel to Real: Should You believe What You See?" Defense Counsel Journal, Oct. 1999, vol. 66. p. 514 from the Dialog File ABI/Inform Global.
Hecht, "Embedded Data Glyph Technology for Hardcopy Digital Documents," SPIE vol. 2171, Feb. 1994, pp. 341-352.
Hill, "Cure of Thermoset Industrial Coatings", Proc. 2d Pacific Coatings forum, Nov. 1-3, 1997, 6 pages.
Hirabayashi et al., "AC Power Electroluminescence Maintenance Improvement", pp. 2449, 2452 (1983).
Holding State in Objects with Microsoft Transaction Server, Microsoft Corp., pp. 2, Jun. 1997. (f37).
Hong et al., Integrating Faces and Fingerprints for Personal Identification, IEEE Trans. On Pattern Analysis and Machine Intelligence, vol. 20, No. 12, Dec., 1998, pp. 1295-1307.
Howarth, B., "Outsourcing: Technology on tap", *Information Economy, BRW*, 21(47):1-5 (1998).
Hu et al., "Locating head and face boundaries for head-shoulder images", Patern Recognition, 32(8):1317-1333 (1999) 5230001US.
Humphrey, "Stamping Out Crime," Hollywood Reporter, Jan. 26, 1994, p. S48.
ldentix, Inc., ImageWare Brings Facial Recognition to the Web, press release, Accessed Oct. 10, 2002, 2 pages.
ImageWare Takes Enterprise ID Management to the World Wide Web, new release, Accessed Oct. 10, 2002, 2 pages.
Insurance Connections, Computer Sciences Corporation, Feb./Mar. 1999, 52 pages.
Insurance Connections, Computer Sciences Corporation, Feb./Mar. 2000, 60 pages.
Insurance Connections, Computer Sciences Corporation, Jun./Jul. 1999, 56 pages.
Insurance Connections, Computer Sciences Corporation, Jun./Jul. 2000, 43 pages.
Insurance Connections, Computer Sciences Corporation, Sep./Oct. 2000, 43 pages.
Insurance Connections, Computer Sciences Corporations, Oct./Nov. 1999, 56 pages.
Jain et al., A Multimodal Biometric System Using fingerprint, Face and Speech, Proc. 2d Int. Conf. on A VBPA, Mar. 1999, pp. 182-187.
Jain, "Image Coding Via a Nearest Neighbors Image Model," IEEE Transactions on Communications, vol. COM-23, No. 3, Mar. 1975, pp. 318-331.
Jarvis, "Are Privacy Rights of Citizens Being Eroded Wholesale?" Accessed Oct. 4, 2002, 5 pages.
JPEG Group's JPEG Software (release 4), FTP.CSUA.Berekeley.Edu/Pub/Cypherpunks/Applications/Jsteg/Jpeg.Announcement.GZ, Jun. 7, 1993, 2 pages.
Juhl, Randy P., "The OTC Revolution"; Drugtopics.com; Mar. 3, 1997, pp. 1-9.
Kahn, "The Premise Behind Premises Liability" Feb. 1994, Security Management, vol. 38, Iss.2 pp. 61-63.
Kanopoulos et al., "Design of an image edge detection filter using the sobel operator", *IEEE J. Solid-State Circuits*, 23(2):358-367 (1988).
Kassam, Signal Detection in Non-Gaussian Noise, Dowden & Culver, 1988, pp. 1-96.
Kawaguchi et al., "Principle and Applications of BPCS-Streganography," *Proc. SPIE*, 3258:464-473 (1998).
Koch, et al., "Copyright Protection for Multimedia Data," Fraunhofer Institute for Computer Graphics, Dec. 16, 1994, 15 pages.
Koch, et al., "Towards Robust and Hidden Image Copyright Labeling," Proc. of 1995 IEEE Workshop on Nonlinear Signal and Image Processing, Jun. 20-22, 1995 4 pages.
Komatsu et al., "A Proposal on Digital Watermarking in Document Image Communication and Its Application to Realizing a Signature," *Electronics and Communications in Japan*, 73(5):2223 (1990).

Komatsu et al., "Authentication System Using Concealed Image in Telematics," Memoirs of the School of Science & Engineering, Waseda Univ., No. 52,'1988, pp. 45-60.

Kurak et al., "A Cautionary Note on Image Downgrading," 1992 IEEE, pp. 153-159.

Laser Technology, Inc. "Crash/Crime Scene Mapping" @ http://www.lasertech.com/accidentcsinv.html. Copyright 1999.

Laser Technology, inc. "QuickMap 3D" http:web.archive.org/web/200003011511/222.lasertech.com/laserproducts/qm3d.html, last viewed on Nov 28, 2005.

Lhotka et al., "Lenticular Inkjet Printmaking", http://www.dvpratt.com/evesmind/lentOver.htm, pp. 1-2 (Dec. 16, 2002).

Li et al., "Facial Expression Transformation Based on Sketch Image and Multiscale Edges", *Electronics Comm. Japan*, 84(9):67-75 (2001).

Lindberg, Gunnar, "Calculating Transport Accident Costs: Final report of the Expert Advisors to the high Level group on Infrastructure charging (Working Group 3)." Borlaenge, Sweden. Apr. 27, 1999, 53 pages.

Liu, "A Practical Guide to Biometric Security Technology," 2001 IEEE, Jan./Feb. 2001 IT PRO, pp. 27-32.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Madan, "The Face is Familier," 2001, 2 pages.

Malloy, "Big Time' Match Frame May Be Small, but it has No Problems Working with the Big Boys", San Antonio Business Journal, vol. 5 No. 11, s1, p. aa, Mar. 15, 1999. Dialog ID No. 0205483 from Dialog File 635 (Business Dateline. RTM.).

Matsui et al., "Video-Steganography: How to Secretly Embed a Signature in a Picture," IMA Intellectual Property Project Proceedings, Jan. 1995, vol. 1, Issue 1, pp. 187-205.

Matthews, "When Seeing is Not Believing," New Scientist, Oct. 16, 1993, pp. 13-15.

McHenry, Brian G., "The Algorithms of Crash," Southeast Coast Collision Conference, Aug. 2001, pp. 1-34.

Mead, "Measuring the value added by technical documentation: A review of research and practice", *Technical Comunication*, 45(3):353-380 (1998).

Meckbach, "U.S. Universities pick up Ditek's CAD application" Feb. 26, 1999. Computing Canada. vol. 25, Iss. 8 p. 14.

Merlin, Jr., William F., "Collision Course With The Colossus Program: How to Deal With It," The Merlin Law Group, May 2000, Tampa, FL, pp. 1-17.

Merlin, Jr., William F., "Colossus: What We Know Today," The Merlin Law Group, Aug. 2000, Tampa, FL, pp. 1-8.

Merlin, Jr., William F., "Overcoming Allstate's TradeSecrets and Work-Product Objections," The Merlin Law Group, Mar. 2000, Tampa, FL, pp. 1-31.

Microsoft Component Services: Server Operating System A Technology Overview, Microsoft Corp., pp. 1-7, Aug. 15, 1998. (f38).

Mintzer et al., "Safeguarding Digital library Contents and Users" Digital watermarking, D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318-326.

Moran, R., "3-D Imagery", <http://www.flexography.org/flexo/article.cfm?ID=45>, pp. 1-3 (Dec. 16, 2002).

Multimodal Biometric Systems: Applications and Usage Scenarios, International Biometric Group, 2003, 27 pages, cited by other.

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Narin, Geoff, IT and Crime Resolution, It's elementary, Holmes helps UK police solve crimes, Financial Times, Dec. 3, 1997, Financial Times (London, UK), p. 17.

Nicolle, "Elementary, dear Holmes," Jan. 22, 1997, The Times (London, UK, p. Interfa).

Non-Final Rejection, U.S. Appl. No. 10/836,639, Bi et al., filed Apr. 29, 2004, mailed Apr. 14, 2009.

Non-Final Rejection, U.S. Appl. No. 10/836,639, Bi et al., filed Apr. 29, 2004, mailed Aug. 10, 2005.

Non-Final Rejection, U.S. Appl. No. 10/836,639, Bi et al., filed Apr. 29, 2004, mailed Aug. 8, 2007.

Non-Final Rejection, U.S. Appl. No. 10/836,639, Bi et al., filed Apr. 29, 2004, mailed Mar. 10, 2006.

Oct. 18, 2007 Communication from the European Patent Office in Application No. EP 02 805 980.6.

Office Action dated Feb. 1, 2007, from U.S. Appl. No. 10/942,321, 10 pages.

Office Action dated May 13, 2008, from U.S. Appl. No. 10/677,092, 5 pages.

Office Action dated Jun. 20, 2007, from U.S. Appl. No. 10/677,092, 6 pages.

Palmer, "The Bar Code Book", Third Edition, Helmers Publishing, Inc., (contents & Index) (1995).

Patent abstracts of Japan 2001-058485.

Paulson, B.A., "High Definition Printing Process for Identification Card Production", ICMA, www.icma.com/info/hdprinting91099.htm <http://www.icma.com/info/hdprinting91099.htm>, (Apr. 9, 2002).

PCT - International Search Report for International Application No. PCT/US02/40843, mailed on May 15, 2003.

PCT - International Search Report for International Application No. PCT/US03/15095, mailed on Mar. 25, 2004.

PCT - International Search Report for International Application No. PCT/USO2/41644, mailed on May 30, 2003.

PCT - International Search Report for International Application No. PCT/USO2/41680, mailed on Jun. 5, 2003.

PCT - International Search Report for International Application No. PCT/USO2/41681, mailed on Jun 5, 2003.

PCT - International Search Report for the International Application No. PCT/US02/41320, mailed on Jul. 28, 2003.

PCT - Notification of Transmittal of the International Search Report or The Declaration, for International Application No. PCT/USO2/40843, mailed on May 15, 2003.

PCT - Notification of Transmittal of the International Search Report or The Declaration, for International Application No. PCT/USO2/41644, mailed on May 30, 2003.

PCT - Notification of Transmittal of the International Search Report or The Declaration, for International Application No. PCT/US02/41680, mailed on Jun 5, 2003.

PCT - Notification of Transmittal of the International Search Report or The Declaration, for International Application No. PCT/USO2/41681, mailed on Jun 5, 2003.

PCT - Notification of Transmittal of the International Search Report or The Declaration, for the International Application No. PCT/US02/41320, mailed on Jul. 28, 2003.

Pennebaker et al., JPEG Still Image Data Compression Standard, Chapter 3, "Aspects of the Human Visual System," pp. 23-27, 1993 Van Nostrand Reinhold, New York.

Perry et al., "Digital Watermarks as a Security Feature for Identity Documents", *Proc. Of SPIE*, 3973:80-87 (Apr., 2000).

Pitas et al., "Applying Signatures on Digital Images," IEEE Workshop on Nonlinear and Signal.

Processing, Neos Marmaras, Greece, pp. 460-463, Jun., 1995.

Plastics Technology, "Laser Marking Has a Bright Future in Plastics", <http://www.plasticstechnolow.com/articles/200108fa1.html>, Aug. 1, 5 pages.

Port, "halting Highway Robbery on the Internet," Business Week, Oct. 17, 1994, p. 212.

Printed copy of a PolyOne company web page for Fast Mark colorants, 2 printed pages, printed on Dec. 15, 2003 and accessed from: <http://www.polyone.com/bizunit/bizunit info.asp?ID1={4D07B4ED-C098-43E4-B802-21413A1FA74C}&ID2={8C29FDCA-7C9E-433E-897A-DB6354A01CAA}

&ID3={00000000-0000-0000-0000-000000000000}
&ID4={FE3434DA-7FA0-4FFF-99AF-CDD99EC16AE1}
&bizUnit=NA-P-CM&line=&sub=none>.

Property and Casualty Solutions: CSC's Property & Casualty Claims, Solutions, Computer Sciences Corporation, pp. 2, 2003. (g51).

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise," IRE Trans. On Information Theory, vol. 8, No. 2, Feb. 1962, pp. 145-154.

Ross, "Information Fusion in Biometrics, "Proc. Of $3^{rd}$ Intl Conf. on Audio-and Video-Based Person Authentication, pp. 354-359, Jun. 6-8, 2001.

Ross, "Information Fusion in Biometrics," Proc. of $3^{rd}$ Intl Conf. on Audio-and Video-Based Person Authentication, pp. 354-359, Jun. 6-8, 2001. cited by other.

Sandford II, et al., "The Data Embedding Method," SPIE vol. 2615, Oct. 23, 1995, pp. 226-259.

Sapwater et al., "Electronic Copyright Protection," Photo>Electronic Imaging, vol. 37, No. 6, 1994, pp. 16-21.

Schneier, "Digital Signatures, Cryptographic Algorithms Can Create Nonforeable Signatures for Electronic Documents, Making Them Valid Legal Instruments" BYTE, No. 1993, pp. 309-312.

Schreiber et al., "A Compatible High-Definition Television System Using the Noise-Margin Method of Hiding Enhancement Information, "SMPTE Journal, Dec. 1989, pp. 873-879.

Scopus and Entrust: Call Center Sales Helper is Unveiled, Nov. 10, 1997; vol. 162, Issue 217, p. 19.

Scopus Introduces World's Most Complete Call Center Solution for Financial Services; PR Newswire dated Nov. 5, 1997.

Seybold Report on desktop Publishing, "Holographic Signatures for Digital Images", Aug. 1995, 1 page.

shaggy@phantom.com, "Hide and Seek v. 4.0," Internet reference, Apr. 10, 1994, 3 pages.

Sheng et al., "Experiments on Pattern Recognition Using Invariant Fourier-Mellin Descriptors," Journal of Optical Society of America, vol. 3, No. 6, Jun., 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Spice, "Police use lasers, computers to map scenes Town of Pewaukee's new system boost accuracy of reconstructions, users say" Sep. 29, 1998. Milwaukee Journal Sentinel. p. 2.

Straight Through Processing: Migration Assessment for Series II Clients Computer Sciences Corporation, pp. 6, 2003. (g50).

Supplemental European Search Report dated Jul. 20, 2006, from EP Application No. 02805980 (Corresponding to PCT/US02/41681; Published as WO03/056507).

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979, pp. 101-109.

Szepanski, "Additive Binary Data Transmission for Video Signals," Papers Presented at Conf. Of Comm. Engineering Soc. Sep. 30 - Oct. 3, 1980, Technical Reports vol. 74, 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic Water Mark," DICTA-93, Macquarie University, Sydney, Australia, Dec., 1993, pp. 666-673.

Toga et al., "Registration Revisited," Journal of Neuroscience Methods, 48 (1993), pp. 1-13.

Trademark for @Fault, accessed from uspto.gov on Feb. 8, 2006.

Traynor, "The Effects of Varying Safety Conditions on the External Costs of Driving," Winter, 1994 Eastern Economic Journal, vol. 20 No. 1 pp. 45-60.

U.S. Patent and Trademark Office, "Communication" for U.S. Appl. No. 09/969,027 mailed Jan. 11, 2008, available in PAIR.

U.S. Patent and Trademark Office, "Communication" for U.S. Appl. No. 09/969,534 mailed Apr. 15, 2008.

U.S. Patent and Trademark Office, "Communication" for U.S. Appl. No. 09/969,015 mailed Jun. 1, 2006, available in PAIR.

U.S. Patent and Trademark Office, "Communication" for U.S. Appl. No. 09/969,016 mailed Mar. 21, 2006, available in PAIR.

U.S. Patent and Trademark Office, "Communication" for U.S. Appl. No. 09/969,016 mailed May 3, 2007, available in PAIR.

U.S. Patent and Trademark Office, "Communication" for U.S. Appl. No. 09/969,016 Mar. 17, 2008.

U.S. Patent and Trademark Office, "Communication" for U.S. Appl. No. 09/969,017 mailed Apr. 16, 2008.

U.S. Patent and Trademark Office, "Communication" for U.S. Appl. No. 09/969,017 mailed Mar. 1, 2006, available in PAIR.

U.S. Patent and Trademark Office, "Communication" for U.S. Appl. No. 09/969,017 mailed May 9, 2007, available in PAIR.

U.S. Patent and Trademark Office, "Communication" for U.S. Appl. No. 09/969,017 mailed Oct. 11, 2006, available in PAIR.

U.S. Patent and Trademark Office, "Communication" for U.S. Appl. No. 09/969,018 mailed Dec. 4, 2006, available in PAIR.

U.S. Patent and Trademark Office, "Communication" for U.S. Appl. No. 09/969,018 mailed Jan. 26, 2006, available in PAIR.

U.S. Patent and Trademark Office, "Communication" for U.S. Appl. No. 09/969,018 mailed Jun. 2, 2006, available in PAIR.

U.S. Patent and Trademark Office, "Communication" for U.S. Appl. No. 09/969,018 mailed Jun. 21, 2007, available in PAIR.

U.S. Patent and Trademark Office, "Communication" for U.S. Appl. No. 09/969,019 mailed Apr. 28, 2008.

U.S. Patent and Trademark Office, "Communication" for U.S. Appl. No. 09/969,019 mailed Feb. 27, 2008.

U.S. Patent and Trademark Office, "Communication" for U.S. Appl. No. 09/969,019 mailed Jun. 1, 2006, available in PAIR.

U.S. Patent and Trademark Office, "Communication" for U.S. Appl. No. 09/969,020 mailed Jul. 5, 2007, available in PAIR.

U.S. Patent and Trademark Office, "Communication" for U.S. Appl. No. 09/969,021 mailed Feb. 27, 2006, available in PAIR.

U.S. Patent and Trademark Office, "Communication" for U.S. Appl. No. 09/969,021 mailed Jan. 8, 2008.

U.S. Patent and Trademark Office, "Communication" for U.S. Appl. No. 09/969,021 mailed Mar 8, 2007, available in PAIR.

U.S. Patent and Trademark Office, "Communication" for U.S. Appl. No. 09/969,022 mailed Apr. 6, 2006, available in PAIR.

U.S. Patent and Trademark Office, "Communication" for U.S. Appl. No. 09/969,024 mailed Jan. 31, 2006, available in PAIR.

U.S. Patent and Trademark Office, "Communication" for U.S. Appl. No. 09/969,024 mailed Jun. 1, 2006, available in PAIR.

U.S. Patent and Trademark Office, "Communication" for U.S. Appl. No. 09/969,024 mailed May 23, 2007, available in PAIR.

U.S. Patent and Trademark Office, "Communication" for U.S. Appl. No. 09/969,027 mailed Jun. 20, 2007, available in PAIR.

U.S. Patent and Trademark Office, "Communication" for U.S. Appl. No. 09/969,027 mailed Mar. 3, 2006, available in PAIR.

U.S. Patent and Trademark Office, "Communication" for U.S. Appl. No. 09/969,146 mailed Feb. 28, 2006, available in PAIR.

U.S. Patent and Trademark Office, "Communication" for U.S. Appl. No. 09/969,146 mailed Oct. 5, 2007.

U.S. Patent and Trademark Office, "Communication" for U.S. Appl. No. 09/969,146 mailed Sep. 22, 2006.

U.S. Patent and Trademark Office, "Communication" for U.S. Appl. No. 09/969,516 mailed Aug. 10, 2006, available in PAIR.

U.S. Patent and Trademark Office, "Communication" for U.S. Appl. No. 09/969,516 mailed Nov. 14, 2007, available in PAIR.

U.S. Patent and Trademark Office, "Communication" for U.S. Appl. No. 09/969,534 mailed Feb. 17, 2006, available in PAIR.

U.S. Patent and Trademark Office, "Communication" for U.S. Appl. No. 09/969,534 mailed May 30, 2007, available in PAIR.
U.S. Patent and Trademark Office, "Communication" for U.S. Appl. No. 09/969,534 mailed May 30, 2007, available in PAIR.
U.S. Patent and Trademark Office, "Communication" for U.S. Appl. No. 09/969,536 mailed Mar. 24, 2006, available in PAIR.
U.S. Patent and Trademark Office, "Communication" for U.S. Appl. No. 09/969,545 mailed Mar. 23, 2006, available in PAIR.
U.S. Patent and Trademark Office, "Communication" for U.S. Appl. No. 09/969,545 mailed Oct. 18, 2006, available in PAIR.
U.S. Patent and Trademark Office, "Communication" for U.S. Appl. No. 09/969,546 mailed Mar. 21, 2006, available in PAIR.
U.S. Patent and Trademark Office, "Communication" for U.S. Appl. No. 09/969,017 mailed May 9, 2007, available in PAIR.
U.S. Patent and Trademark Office, "Communication" for U.S. Appl. No. 09/970,161 mailed Mar. 23, 2006, available in PAIR.
U.S. Patent and Trademark Office, "Communication" for U.S. Appl. No. 10/238,019 mailed Jan. 11, 2008.
U.S. Patent and Trademark Office, "Communication" for U.S. Appl. No. 10/238,029 mailed Dec. 13, 2007.
U.S. Patent and Trademark Office, "Communication" for U.S. Appl. No. 10/238,029 mailed May 12, 2008.
U.S. Patent and Trademark Office, "Communication" for U.S. Appl. No. 10/238,981 mailed Jan. 25, 2008.
U.S. Patent and Trademark Office, "Communication" for U.S. Appl. No. 10/306,623 mailed Jan. 25, 2008.
U.S. Patent and Trademark Office, "Communication" for U.S. Appl. No. 10/306,623 mailed Mar. 7, 2007, available in PAIR.
U.S. Patent and Trademark Office, "Communication" for U.S. Appl. No. 10/306,628 mailed Mar. 27, 2008.
U.S. Patent and Trademark Office, "Communication" for U.S. Appl. No. 10/306,628 mailed Oct. 10, 2007, available in PAIR.
U.S. Patent and Trademark Office, "Communication" for U.S. Appl. No. 10/306,803 mailed Oct. 5, 2007, available in PAIR.
U.S. Patent and Trademark Office, "Communication" for U.S. Appl. No. 10/306,804 mailed Oct. 3, 2007, available in PAIR.
U.S. Patent and Trademark Office, "Communication" for U.S. Appl. No. 10/306,858 mailed Dec. 13, 2007.
U.S. Patent and Trademark Office, "Communication" for U.S. Appl. No. 10/306,858 mailed Jun. 29, 2007, available in PAIR.
U.S. Patent and Trademark Office, "Communication" for U.S. Appl. No. 10/306,864 mailed Mar. 27, 2008.
U.S. Patent and Trademark Office, "Communication" for U.S. Appl. No. 10/306,864 mailed Oct. 4, 2007, available in PAIR.
U.S. Patent and Trademark Office, "Communication" for U.S. Appl. No. 10/306,866 mailed Jun. 21, 2007, available in PAIR.
U.S. Patent and Trademark Office, "Communication" for U.S. Appl. No. 10/306,886 mailed May 5, 2008.
U.S. Patent and Trademark Office, "Communication" for U.S. Appl. No. 10/306,873 mailed Sep. 20, 2007, available in PAIR.
U.S. Patent and Trademark Office, "Communication" for U.S. Appl. No. 10/306,908 mailed Mar. 21, 2008.
U.S. Patent and Trademark Office, "Communication" for U.S. Appl. No. 10/306,908 mailed Oct. 4, 2007, available in PAIR.
U.S. Patent and Trademark Office, "Communication" for U.S. Appl. No. 10/306,909 mailed Oct. 5, 2007, available in PAIR.
U.S. Appl. No. 10/836639, Bi et al., filed Apr. 29, 2004.
U.S. Appl. No. 09/741,779, filed Dec. 21, 2000.
U.S. Appl. No. 60/456,677, filed Mar. 21, 2003.
U.S. Appl. No. 60/459,284, filed Mar. 31, 2003.
U.S. Appl. No. 60/463,659, filed Apr. 16, 2003.
U.S. Appl. No. 60/463,660, filed Apr. 16, 2003.
U.S. Appl. No. 60/488,536, filed Jul. 17, 2003.
U.S. Appl. No. 60/494,660, filed Aug. 8, 2003.
Unisys Selects Identix for Department of Defense Research on Three Dimensional Facial Recognition, Press Release, Jul. 29, 2003, 3 pages.
Utzaeider, James, "Microsoft Transaction Server and Internet Information Server: Technology for the Web," Microsft Corp., p. 15, Feb. 6, 1998. (f44).
van Schyndel et al., "A Digital Watermark," IEEE International Conference on Image Processing, Nov. 13-16, 1994, pp. 86-90.
W. Rankl and W. Effing, "Smart Card Hand Book" 1997, John Wiley & Sons, pp. 35-40.
Wagner, "Fingerprinting," 1983 IEEE, pp. 18-22.
Walton, "Image Authentication for a Slippery New Age," Dr. Dobb's Journal, Apr. 1995, pp. 18-26, 82-87.
Warland et al., High-Performance Communication Networks, *Economics*, Chapter 8 through 8.2.1:361-369 (1996).
Watt & Policarpo, "The Computer Image", Addison Wesley, pp. 247-249 (1998).
Wayne Electronics, Inc., What is Facelt? Accessed Oct. 10, 2002, 5 pages.
Weber et al., "Correlative Image Registration," Seminars in Nuclear Medicine, vol. XXIV, No. 4, Oct., 1994, pp. 311-323.
Willems, "Biometrics: Detecting the 'Goats'," Speech Technology Magazine, Oct. 9, 2003, 6 pages.
Wise, "The History of Copyright, Photographers' Rights Span Three Centuries," Photo>Electronic Imaging, vol. 37, No. 6, 1994.
WO02/052499 search report, dated Aug. 30, 2002.
WO02/052499 Written Opinion, dated Mar. 18, 2004.
U.S. Appl. No. 09/342,971, Rhoads et al.
U.S. Appl. No. 09/343,104, published Jun. 29, 1999, Rodriguez et al.
U.S. Appl. No. 09/531,076, Rhoads et al.
U.S. Appl. No. 09/562517, published May 1, 2000, Davis et al.
U.S. Appl. No. 09/631,409, Brundage et al.
U.S. Appl. No. 09/679,261, published Oct. 4, 2000, Davis et al.
U.S. Appl. No. 60/000,442, filed Jun. 20, 1995, Hudetz.
U.S. Appl. No. 60/082,228, filed Apr. 16, 1998, Rhoads.
U.S. Appl. No. 60/141,763, filed Jun. 30, 1999, Davis.
U.S. Appl. No. 60/158,015, filed Oct. 6, 1999, Davis et al.
U.S. Appl. No. 60/344,675, filed Dec. 24, 2001, LaBrec.
U.S. Appl. No. 60/344,676, filed Dec. 24, 2001, LaBrec.
U.S. Appl. No. 60/344,677, filed Dec. 24, 2001, LaBrec.
U.S. Appl. No. 60/344,685, filed Dec. 24, 2001, Bi et al.
U.S. Appl. No. 60/356,881, filed Feb. 12, 2002, Hannigan et al.
U.S. Appl. No. 60/358,321, filed Feb. 19, 2002, Munday.
U.S. Appl. No. 60/371,335, Apr. 9, 2002, Schneck.
U.S. Appl. No. 60/379,646, filed May 10, 2002, Mailloux et al.
U.S. Appl. No. 60/379,704, filed May 10, 2002, Bi et al.
U.S. Appl. No. 60/410,544, filed Sep. 13, 2002, Haigh.
U.S. Appl. No. 60/418,129, filed Oct. 11, 2002, Howard.
U.S. Appl. No. 60/418,762, filed Oct. 15, 2002, Rhoads.
U.S. Appl. No. 60/421,254, filed Oct. 25, 2002, Rhoads.
U.S. Appl. No. 60/429,115, Nov. 25, 2002, Jones.
U.S. Appl. No. 60/429,501, filed Nov. 26, 2002, Howard.
U.S. Appl. No. 60/447,502, filed Feb. 13, 2003, Haigh.
U.S. Appl. No. 60/451,840, filed Mar. 3, 2003, Levy.
U.S. Appl. No. 60/459,284, filed Mar. 31, 2003, Jones.
U.S. Appl. No. 60/480,257, Jun. 20, 2003, Hwang.

* cited by examiner

US 7,804,982 B2

SYSTEMS AND METHODS FOR MANAGING AND DETECTING FRAUD IN IMAGE DATABASES USED WITH IDENTIFICATION DOCUMENTS

PRIORITY CLAIM

This application claims priority to the following U.S. Provisional patent application:

Systems and Methods for Managing and Detecting Fraud in Image Databases Used With Identification Documents (Application No. 60/429,501, filed Nov. 26, 2002.

RELATED APPLICATION DATA

This application also is related to the following U.S. provisional and nonprovisional patent applications:

Integrating and Enhancing Searching of Media Content and Biometric Databases (Application No. 60/451,840, filed Mar. 3, 2003; and Systems and Methods for Detecting Skin, Eye Region, and Pupils (Application No. 60/480,257, filed Jun. 20, 2003).

Identification Card Printed With Jet Inks and Systems and Methods of Making Same (application Ser. No. 10/289,962, Inventors Robert Jones, Dennis Mailloux, and Daoshen Bi, filed Nov. 6, 2002);

Laser Engraving Methods and Compositions, and Articles Having Laser Engraving Thereon (application Ser. No. 10/326,886, filed Dec. 20, 2002—Inventors Brian Labrec and Robert Jones);

Multiple Image Security Features for Identification Documents and Methods of Making Same (application Ser. No. 10/325,434, filed Dec. 18, 2002—Inventors Brian Labrec, Joseph Anderson, Robert Jones, and Danielle Batey);

Covert Variable Information on Identification Documents and Methods of Making Same (application Ser. No. 10/330,032, filed Dec. 24, 2002—Inventors: Robert Jones and Daoshen Bi);

Image Processing Techniques for Printing Identification Cards and Documents (application Ser. No. 11/411,354, filed Apr. 9, 2003—Inventors Chuck Duggan and Nelson Schneck);

Enhanced Shadow Reduction System and Related Technologies for Digital Image capture (Application No. 60/447,502, filed Feb. 13, 2003—Inventors Scott D. Haigh, Tuan A. Hoang, Charles R. Duggan, David Bohaker, and Leo M. Kenen);

Enhanced Shadow Reduction System and Related Technologies for Digital Image capture (application Ser. No. 10/663,439, filed Sep. 15, 2003—Inventors Scott D. Haigh, Tuan A. Hoang, Charles R. Duggan, David Bohaker, and Leo M. Kenen);

All In One Capture station for Creating Identification Documents (application Ser. No. 10/676,362, filed Sep. 30, 2003);

Systems and Methods for Recognition of Individuals Using Multiple Biometric Searches (application Ser. No. 10/686,005, Inventors James V. Howard and Francis Frazier); and Detecting Skin, Eye Region, and Pupils in the Presence of Eyeglasses (Application No. 60/514,395, Inventor Kyungtae Hwang), filed Oct. 23, 2003.

The present invention is also related to U.S. patent application Ser. No. 09/747,735, filed Dec. 22, 2000, Ser. No. 09/602,313, filed Jun. 23, 2000, and Ser. No. 10/094,593, filed Mar. 6, 2002, U.S. Provisional Patent Application No. 60/358,321, filed Feb. 19, 2002, as well as U.S. Pat. No. 6,066,594.

TECHNICAL FIELD

Embodiments of the invention generally relate to devices, systems, and methods for data processes. More particularly, embodiments of the invention relates to systems and methods for improving the searching accuracy, use, and management of databases containing biometric information relating to individuals and for improving the accuracy of facial recognition processing.

BACKGROUND AND SUMMARY OF THE INVENTION

Identity theft and other related fraudulent identification activity has the potential to become a major problem to the economy, safety and stability of the United States. Identity theft refers to one individual fraudulently assuming the identity of another and may include activities such as opening credit cards in the name of another, obtaining loans, obtaining identification documents (e.g., drivers licenses, passports), obtaining entitlement/benefits cards (e.g., Social Security Cards, welfare cards, etc.), and the like. Often, these activities are performed without the consent or knowledge of the victim. Other fraudulent identification activity can also be problematic. An individual may, for example, use either his or her "real" identity to obtain a document, such as an identification card, but may further obtain additional identification cards using one or more identification credentials that belong to another and/or one or more fictitious identification credentials.

For example, to obtain an identification document such as a drivers license, a given individual may attempt to obtain multiple drivers licenses under different identities, may attempt to obtain a drivers license using false (e.g., "made up"), identification information, or may attempt to assume the identity of another to obtain a drivers license in that individual's name. In addition, individuals may alter legitimate identification documents to contain fraudulent information and may create wholly false identification documents that purport to be genuine documents.

It is extremely time consuming and expensive to apprehend and prosecute those responsible for identity theft and identity fraud. Thus, to help reduce identity theft and identity fraud, it may be advisable for issuers of identity-bearing documents to take affirmative preventative steps at the time of issuance of the identity documents. Because of the large number of documents that are issued every day and the large history of already issued documents, however, it is difficult for individual employees of the issuers to conduct effective searches at the time such documents are issued (or re-issued). In addition, the complexity and amount of the information stored often precludes manual searching, at least as a starting point.

For example, many government and business organizations, such as motor vehicle registries, store large databases of information about individuals. A motor vehicle registry database record may include information such as an operator's name, address, birth date, height, weight, and the like. Some motor vehicle registry databases also include images of the operator, such as a facial image and/or a fingerprint image. Unless the database is fairly small, it is nearly impossible for it to be searched manually.

In some databases, part or all of the database record is digitally encoded, which helps to make it possible to perform automated searches on the database. The databases themselves, however, can still be so large that automated searching is time consuming and error prone. For example, some states do not delete "old" images taken of a given individual. Each database record might be associated with a plurality of images. Thus, a database that contains records for 10 million individuals, could, in fact, contain 50-100 million images. If a given motor vehicle registry uses both facial and fingerprint images, the total number of images may be doubled still.

One promising search technique that can be used to perform automated searching of information and which may help to reduce identity theft and identity fraud is the use of biometric authentication and/or identification systems. Biometrics is a science that refers to technologies that can be used to measure and analyze physiological characteristics, such as eye retinas and irises, facial patterns, hand geometry, and fingerprints. Some biometrics technologies involve measurement and analysis of behavioral characteristics, such as voice patterns, signatures, and typing patterns. Because biometrics, especially physiological-based technologies, measures qualities that an individual usually cannot change, it can be especially effective for authentication and identification purposes.

Commercial manufacturers, such as Identix Corp of Minnetonka, Minn. manufacture biometric recognition systems that can be adapted to be capable of comparing two images. For example, the IDENTIX FACE IT product may be used to compare two facial images to determine whether the two images belong to the same person. Other commercial products are available that can compare two fingerprint images and determine whether the two images belong to the same person. For example, U.S. Pat. Nos. 6,072,894, 6,111,517, 6,185,316, 5,224,173, 5,450,504, and 5,991,429 further describe various types of biometrics systems, including facial recognition systems and fingerprint recognition systems.

Some face recognition applications use a camera to capture one or more successive images of a subject, locate the subject's face in each image, and match the subject's face to a one or faces stored in a database of stored images. In some face recognition applications, the facial images in the database of stored images are stored as processed entities called templates. A template represents the preprocessing of an image (e.g., a facial image) to a predetermined machine readable format. Encoding the image as a template helps enable automated comparison between images. For example, in a given application, a video camera can capture the image of a given subject, perform processing necessary to convert the image to a template, then compare the template of the given subject to one or more stored templates in a database, to determine if the template of the subject can be matched to one or more stored templates.

Facial recognition has been deployed for applications such as surveillance and identity verification. In surveillance, for example, a given facial recognition system may be used to capture multiple images of a subject, create one or more templates based on these captured images, and compare the templates to a relatively limited "watch list" (e.g., set of stored templates), to determine if the subject's template matches any of the stored templates. In surveillance systems, outside human intervention may be needed at the time of enrolling the initial image for storage in the database, to evaluate each subject's image as it is captured and to assist the image capture process. Outside human intervention also may be needed during surveillance if a "match" is found between the template of a subject being screened and one or more of the stored templates.

For example, some driver license systems include a large number of single images of individuals collected by so called "capture stations." When configured for face recognition applications, these identification systems build template databases by processing each of the individual images collect at a capture station to provide a face recognition template thereby creating a template for every individual. A typical driver license system can include millions of images. The face recognition template databases are used to detect individuals attempting to obtain multiple licenses. Another application provides law enforcement agencies with an investigative tool. The recognition database can discover other identities of a known criminal or may help identify an unidentified decedent.

One difficulty in adapting commercial biometric systems to databases such as motor vehicle databases is the very large number of images that may be stored in the database. Some types of biometrics technologies can produce high numbers of false positives (falsely identifying a match between a first image and one or more other images) when the database size is very large. High numbers of false positives are sometimes seen with large databases of facial images that are used with facial recognition systems.

Another potential problem with searching large databases of biometric images can be the processing delays that can accompany so-called "one to many" searches (comparing a probe image with an "unidentified" image, such as a face or finger image presented for authentication, to a large database of previously enrolled "known" images. In addition, the "many" part of "one-to-many" can vary depending on the application and/or the biometric being used. In some types of applications (such as surveillance, terrorist watch lists, authentication for admission to a facility), the "many" can be as few as a few hundred individuals, whereas for other applications (e.g., issuance of security documents, such as passports, drivers licenses, etc.), the "many" can be many millions of images.

Because many known facial recognition systems are used for surveillance applications, these facial recognition systems are optimized to work with surveillance conditions, including working with databases having relatively small numbers of templates of images (e.g., fewer than 1 million records). In addition, some facial recognition applications are able to processes multiple images captures of the same subject and, as noted previously may have an outside operator assist in initial capture of the images.

For some applications, however, the optimization of the facial recognition system may be less than ideal. For example, systems such as drivers license databases may contain far more images in their databases a given surveillance application. The databases of drivers license images maintained by the Department of Motor Vehicles (DMV) in some states range from a few million records to more than 80 million records. In some instances, the DMV databases grow larger every day, because at least some DMVs do not delete any customer images, even those of deceased license holders. Another possible complication with some DMV databases is that, during the license renewal cycle, duplicate images may be created of the same person. In some instances, it may be rare to see more than two images of the same person in a DMV database, however.

Still another complication with applying facial recognition processing to at least some DMV databases is the lack of operator intervention during image capture. It is time consuming, expensive, and often impossible to re-enroll the "legacy" database of DMV images so that the images are optimized for automated facial recognition.

To address at least some of these and other problems, we have developed systems and methods for performing automated biometric searching of databases of captured images, where the databases can be very large in size. These systems and methods can be used during the creation and maintenance of the database as well as during the search of the database. In one embodiment, we provide a browser based system with an operator friendly interface that enables the operator to search a database of captured images for matches to a given so-called "probe" image. When matches are detected, if the operator determines that fraud or other issues may exist, the operator can add an indicator to the image and/or the image file so that future investigators are aware that issues may exist with the image. In an application such as a DMV, the DMV can use the systems and methods of the invention to prevent the issuance of a driver's license if fraud is detected and/or to track down whether a driver's license already issued was issued based on fraudulent information and/or images.

At least some systems and methods of the embodiments of the invention described herein also may help to detect patterns of fraud, geographically locate entities (including individuals, organizations, terrorist groups, etc.) committing and/or attempting to commit fraud, and help to prevent fraud.

In one embodiment, the invention employs a facial recognition technique that is based on local feature analysis (LFA), such as is provided in the Identix FACE IT product.

In one embodiment, we provide a system for issuing identification documents to a plurality of individuals, comprising a first database, a first server, and a workstation. The first database stores a plurality of digitized images, each digitized image comprising a biometric image of an individual seeking an identification document. The first server is in operable communication with the first database and is programmed to send, at a predetermined time, one or more digitized images from the first database to a biometric recognition system, the biometric recognition system in operable communication with a second database, the second database containing biometric templates associated with individuals whose images have been previously captured, and to receive from the biometric recognition system, for each digitized image sent, an indicator, based on the biometric searching of the second database, as to whether the second database contains any images of individuals who may at least partially resemble the digitized image that was sent. The a workstation is in operable communication with the first server and is configured to permit a user to review the indicator and to make a determination as to whether the individual is authorized to be issued an identification document or to keep an identification document in the individual's possession.

The digitized image can, for example, be at least one of a facial, fingerprint, thumbprint, and iris image. The identification document can, for example, be a driver's license.

The biometric recognition system can be programmed to create a biometric template based on the digitized image received from the first server and to use that biometric template to search the second database. The first server can be programmed to create a biometric template and provide that template to the biometric recognition system.

The indicator can comprise a user interface the user interface retrieving from the third database the images of at least a portion of the images of individuals that the biometric recognition system has determined may at least partially resemble the digitized image that was sent. In at least one embodiment, the user interface is operable to permit a user to do at least one of the following functions:

visually compare the digitized image that was sent directly to an image of an individual whose data was returned in the indicator by the facial recognition search system;

visually compare demographic information associated with the individual whose digitized image was sent directly to demographic information of an individual whose data was returned in the indicator by the facial recognition search system;

visually compare the other biometric information associated with the digitized image that was sent to other biometric information associated with an individual whose data was returned in the indicator by the facial recognition search system;

create a new biometric template of the digitized image that was sent and conduct a new search of the biometric recognition search system using the new biometric template;

perform a re-alignment of the digitized image and use the re-alignment data to conduct a new search of the biometric recognition search system;

capture a new image of the individual whose digitized image was sent;

adding a notification to a record associated with at least one of the digitized image that was sent and the data that was returned in the indicator by the biometric recognition search system, the notification providing an alert that there may be a problem with the record; and selecting at least one of the images of an individual whose data was returned in the indicator by the facial recognition search system and sending that image to the biometric recognition search system to run a search on that image.

In one embodiment, we provide a method for screening a plurality of applicants each seeking to be issued an identification document, comprising:

(a) storing a digitized image of each applicant in a first database;

(b) providing a predetermined portion of the images in the first database, at a predetermined time, to a biometric searching system, the biometric searching system comparing the digitized image of each applicant to a plurality of previously captured images of individuals stored in a third database and returning to a second database, for each applicant, an result containing a list of matches to each image, each match having a score;

(c) selecting from the second database those results having a score above a predetermined threshold and providing the results to a fourth database;

(d) providing the selected results to an investigator; and (e) displaying to the investigator, upon request, information about each selected result.

The method can also include the steps of receiving a notification from the investigator relating to at least one of the results, and adding a notification to a record associated with the corresponding result, the notification remaining in the record until removed by an authorized individual and being visible to other investigators until removed.

In another embodiment we provide a computer implemented method of creating a biometric template of an individual for facial recognition processing, comprising:

sending an image of the individual to a plurality of eye finding modules, each eye finding module configured to find the location of at least one eye of the individual in the image;

receiving locations of the at least one eye from each respective eye finding module in the plurality of eye finding modules; and applying at least one rule to the received locations to determine the eye location to be used for creation of the biometric template.

In one embodiment, the predetermined rule can comprise at least one or more of the following rules;

selecting as an eye location the average of the received eye locations;

selecting as an eye location a weighted average of the received eye locations;

selecting as an eye location the location that is closest to the eye location determined by a majority of the plurality of eye finding modules;

removing from the received eye locations any eye locations that are outside of a predetermined boundary;

selecting as an eye location an eye location that is the center of gravity of the received eye locations;

removing from the received eye locations any eye locations that do not fit known eye characteristics, and removing from the received eye locations any eye locations that are not within a predetermined distance or slope from the eye locations of the other eye of the individual In one embodiment, we provide a method of searching a database of biometric templates, each biometric template associated with a corresponding facial image of an individual, for an image of an individual who substantially resembles an individual in a probe image, comprising:

receiving a probe image of an individual at a client;

determining the eye locations of the individual;

applying a predetermined rule to determine if the eye locations are acceptable;

if the eye locations are acceptable, creating a probe biometric template using the eye locations; and searching a database of biometric templates using the probe biometric template.

In another embodiment we provide a system for investigating an image of an individual, comprising:

a first database, the first database storing at least one digitized image, the digitized image comprising a biometric image of an individual seeking an identification document;

a second database, the second database storing a plurality of digitized images of individuals whose images have been previously captured;

means for determining whether any of the images in the second database match any of the images in the first database to a predetermined degree and for providing such matches an investigator, the means for determining being in operable communication with the first and second databases; and means for allowing the investigator to compare information associated with the first digitized image with information associated with any of the matches, the means for allowing being in operable communication with at least a third database capable of providing the information associated with the first digitized image and information associated with any of the matches.

These and other embodiments of the invention are described below

BRIEF DESCRIPTION OF THE DRAWINGS

The foregoing features of this invention, as well as the invention itself, may be more fully understood from the following description and the drawings in which.

Figure 1:
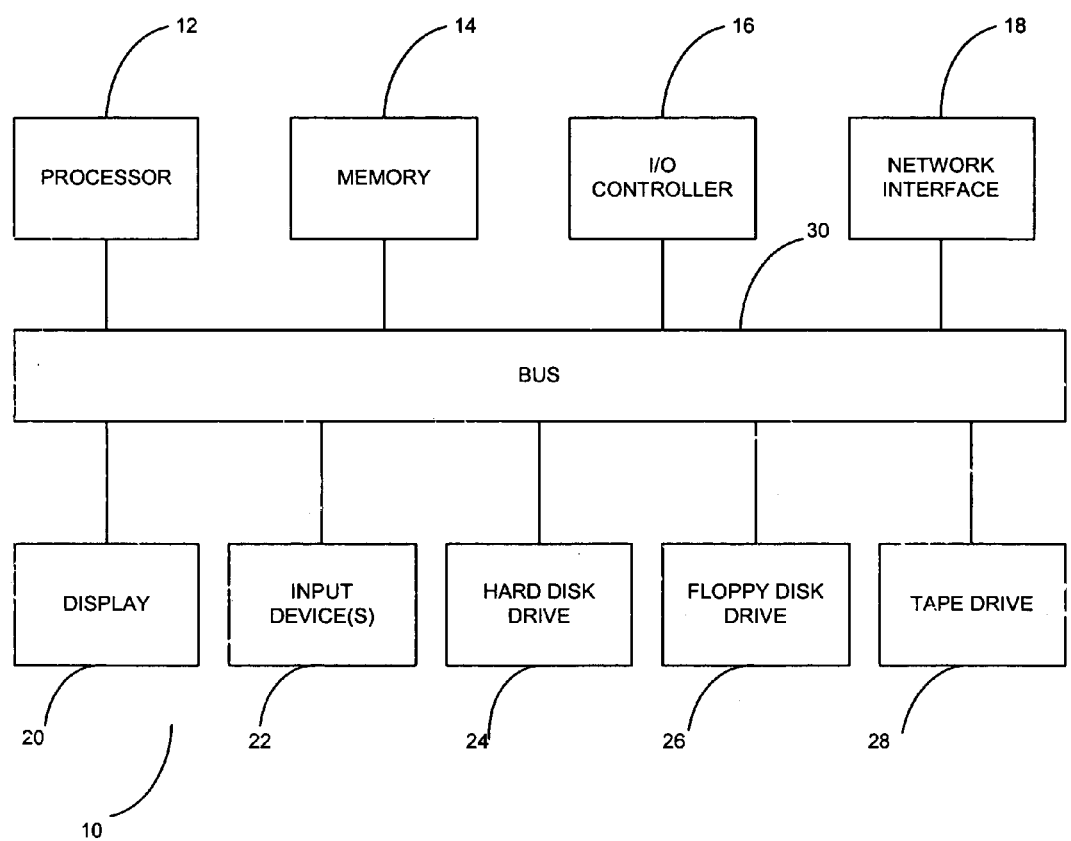
FIG. 1 is a block diagram of a computer system usable in the embodiments of the invention described herein.

The drawings are not necessarily to scale, emphasis instead is generally placed upon illustrating the principles of the invention. In addition, in the drawings, like reference numbers indicate like elements. Further, in the figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

DETAILED DESCRIPTION

Before describing various embodiments of the invention in detail, it is helpful to define some terms used herein and explain further some of the environments and applications in which at least some embodiments of the invention can be used.

Identification Documents

In the foregoing discussion, the use of the word "ID document" or "identification document" or "security document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

As those skilled in the art know, ID documents such as drivers licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, the contents of which are hereby incorporated by reference). The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G.A.O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16 1993 to J. W. Luening, et al.

Commercial systems for issuing ID documents are of two main types, namely so-called "central" issue (CI), and so-called "on-the-spot" or "over-the-counter" (OTC) issue. CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). Further details relating to various methods for printing and production of identification documents can be found in the following commonly assigned patent applications, all of which are hereby incorporated by reference:

Identification Card Printed With Jet Inks and Systems and Methods of Making Same (application Ser. No. 10/289, 962, Inventors Robert Jones, Dennis Mailloux, and Daoshen Bi, filed Nov. 6, 2002);

Laser Engraving Methods and Compositions, and Articles Having Laser Engraving Thereon (application Ser. No. 10/326,886, filed Dec. 20, 2002—Inventors Brian Labrec and Robert Jones);

Multiple Image Security Features for Identification Documents and Methods of Making Same (application Ser. No. 10/325,434, filed Dec. 18, 2002—Inventors Brian Labrec, Joseph Anderson, Robert Jones, and Danielle Batey); and Identification Card Printer-Assembler for Over the Counter Card Issuing (application Ser. No. 10/436,729, filed May 12, 2003—Inventors Dennis Mailloux, Robert Jones, and Daoshen Bi).

Biometrics

Biometrics relates generally to the science of measuring and analyzing biological characteristics, especially those of humans. One important application of biometrics is its use in security-related applications, such as identification of an individual or authentication of an individual's identity by using measurable, individualized, and often unique, human physiological characteristics. Examples of human physiological characteristics that can be used as biometric identifiers include (but are not limited to) face, fingerprint (including use for both fingerprint recognition systems and Automated Fingerprint Identification Systems (AFIS)), thumbprint, hand print, iris, retina, hand geometry, finger geometry, thermogram (heat signatures of a given physiological feature, e.g. the face, where the image is captured using a device such as an infrared camera and the heat signature is used to create a biometric template used for matching), hand vein (measuring the differences in subcutaneous features of the hand using infrared imaging), signature, voice, keystroke dynamic, odor, breath, and deoxyribonucleic acid (DNA). We anticipate that any one or more of these biometrics is usable with the embodiments of the invention described herein.

The reader is presumed to be familiar with how each of the biometrics listed above works and how biometric templates are created with each method. We note, however, that embodiments of the invention can utilize many different types of information to create biometric templates. For example, to create face and/or finger templates, information that can be used may include (but is not limited to), law enforcement images (e.g., mug shots, fingerprint exemplars, etc.), print images from any source (e.g., photographs, video stills, etc.), digitized or scanned images, images captured at a capture station, information provided by other databases, and/or sketches (e.g., police sketches).

DETAILED DESCRIPTION OF THE FIGURES

Systems and methods described herein in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. FIG. 1 is a block diagram of a computer system usable as the workstation 10 in the embodiments described herein Referring briefly to FIG. 1, the workstation 10 includes a central processor 12, associated memory 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the workstation 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the workstation 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the workstation 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the workstation 10 can include specially designed, dedicated, hard-wired electronic circuits that perform all functions described herein without the need for instructions from computer programs.

In at least one embodiment of the present invention, the workstation 10 is networked to other devices, such as in a client-server or peer to peer system. For example, referring to FIG. 1, the workstation 10 can be networked with an external data system 17. The workstation 10 can, for example, be a client system, a server system, or a peer system. In one embodiment, the invention is implemented at the server side and receives and responds to requests from a client, such as a reader application running on a user computer.

The client can be any entity, such as a the workstation 10, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC®, PENTIUM-based, or RISC-based, that includes an operating system such as IBM®, LINUX, OS/2® or any member of the MICROSOFT WINDOWS family (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the workstation 10, a computer platform, an adjunct to a computer or platform, or any component thereof, such as a program that can respond to requests from a client. Of course, a "client" can be broadly construed to mean one who requests or gets the file, and "server" can be broadly construed to be the entity that sends or forwards the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some aspects of the invention, in one embodiment, resides in an application running on the workstation 10. In at least one embodiment, the present invention is embodied in a computer-readable program medium usable with the general purpose computer system 10. In at least one embodiment, the present invention is embodied in a data structure stored on a computer or a computer-readable program medium. In addition, in one embodiment, an embodiment of the invention is embodied in a transmission medium, such as one or more carrier wave signals transmitted between the computer system 10 and another entity, such as another computer system, a server, a wireless network, etc. The invention also, in at least one embodiment, is embodied in an application programming interface (API) or a user interface. In addition, the invention, in at least one embodiment, can be embodied in a data structure.

Note that the system 10 of FIG. 1 is not limited for use with workstations. Some or all of the system 10 can, of course, be used for various types of processing taking place in the systems described herein, as will be appreciated by those skilled in the art. Further, in at least some embodiments, a plurality of systems 10 can be arranged as a parallel computing system.

As used herein, the Internet refers at least to the worldwide collection of networks and gateways that use the transmission control protocol/Internet protocol (TCP/IP) suite of protocols to communicate with one another. The World Wide Web (WWW) refers at least to the total set of inter-linked hypertext documents residing on hypertext transport protocol (HTTP) servers all around the world. As used herein, the WWW also refers at least to documents accessed on secure servers, such as HTTP servers (HTTPS), which provide for encryption and transmission through a secure port. WWW documents, which may be referred to herein as web pages, can, for example, be written in hypertext markup language (HTML). As used herein, the term "web site" refers at least to one or more related HTML documents and associated files, scripts, and databases that may be presented by an HTTP or HTTPS server on the WWW. The term "web browser" refers at least to software that lets a user view HTML documents and access files and software related to those documents.

It should be appreciated that any one or more of the elements illustrated in the following embodiments may be located remotely from any or all of the other elements, and that any of the elements of a given embodiment may, in fact, be part of another system altogether. For example, a database accessed by one or more of the elements of a given embodiment may be part of a database maintained by an organization entirely separate from the system of the invention.

In addition, it should be understood that, for the following embodiments, although they are described in connection with a facial recognition system, the invention is not so limited. Many aspects of the invention are usable with other biometric technologies, including but not limited to fingerprint recognition systems, iris recognition systems, hand geometry systems, signature recognition systems, etc. We have found that at least some embodiments of the invention are especially advantageous for biometric application that utilize information that can be captured in an image.

First Illustrative Embodiment

Figure 2:
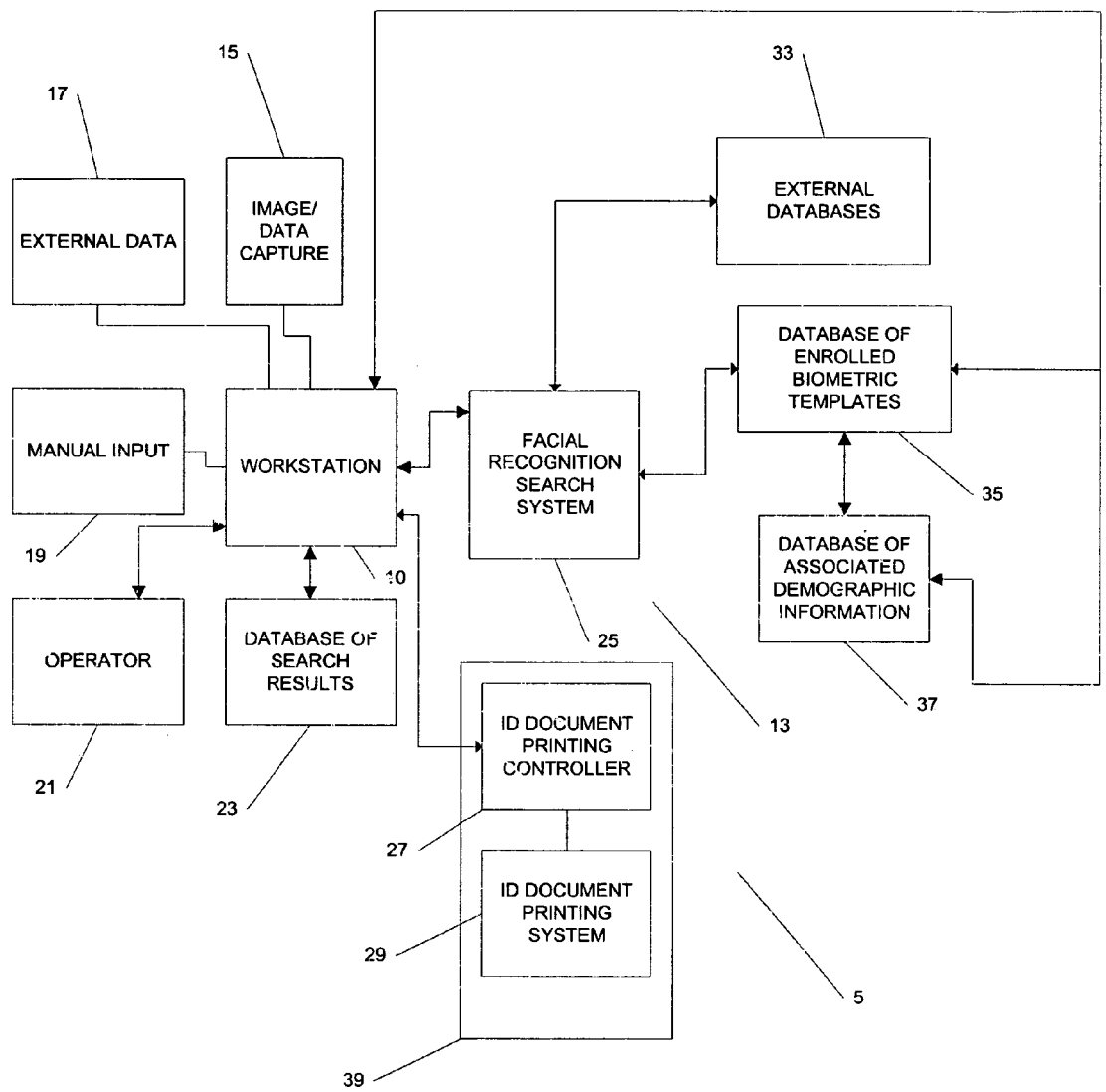
FIG. 2 is a block diagram of a system for biometric searching in accordance with a first embodiment of the invention.

FIG. 2 is an illustrative block diagram of a system implemented in accordance with a first embodiment of the invention. Referring to FIG. 2, the following elements are provided.

FIG. 2 is a block diagram of a first system 5 for biometric searching, in accordance with one embodiment of the invention. The system 5 includes a workstation 10 (such as the one described more fully in FIG. 1) which is capable of receiving inputs from a number of sources, including image and/or data capture systems 15, external data systems 17 (such as remote clients in communication with the workstation 10 and/or which conduct searches using the workstation 10, data acquisition devices such as scanners, palm top computers, etc.), manual inputs 19 (which can be provided locally or remotely via virtually any input device, such as a keyboard, mouse, scanner, etc.), and operator inputs 21 (e.g., voice commands, selections from a menu, etc.). In one embodiment, the workstation in this embodiment is programmed convert captured images and/or received data into templates usable by the facial recognition search system, 25 (described further below). However, those skilled in the art will appreciate that the function of converting captured data into biometric templates can, of course, be performed by a separate system (not shown). Biometric templates, after being created at (or otherwise inputted to) the workstation 10 can be added to the database of enrolled biometric templates 25.

The system 5 also includes a biometric search system which in this embodiment includes a facial recognition search system 25. Of course, it will be appreciated that instead of a face recognition search system 25 as the biometric search system, the system 5 of FIG. 2 could instead use a search system that utilized a different biometric, e.g., fingerprint, iris, palm print, hand geometry, etc. In addition, we expressly contemplate that hybrid biometrics systems (systems that use more than one biometric) are also usable as a biometric search system; one such system is described in our patent application entitled "Systems and Methods for Recognition of Individuals Using Multiple Biometric Searches", Ser. No. 10/686, 005, filed Oct. 14, 2003, which is incorporated herein by reference. We also expressly contemplate that certain graphics processing programs, such as CyberExtruder, can be adapted to work with this and other embodiments of the invention.

Referring again to FIG. 2, the facial recognition search system 25 includes a search engine capable of searching the database of previously enrolled biometric templates 35. In one embodiment, the facial recognition search system 25 is a facial recognition system employing a local features analysis (LFA) methodology, such as the FACE-IT facial recognition system available from Identix of Minnesota. Other facial recognition systems available from other vendors (e.g., Cognitec FaceVACS, Acsys, Imagis, Viisage, Eyematic, VisionSphere, DreamMirth, C-VIS, etc.) are, of course, usable with at least some embodiments of the invention, as those skilled in the art will appreciate.

The system 5 also includes a biometric template database 35 comprising previously enrolled biometric templates (e.g., templates adapted to work with the facial recognition search system 25) and a demographic database 37 comprising demographic information 37 associated with each respective biometric template in the biometric template database 25. For example, in one embodiment, the biometric template database 35 and demographic database 37 are associated with a plurality of records of individuals who have obtained an identification document (e.g., a driver's license) in a given jurisdiction. Either or both of the biometric template database 35 and demographic database 37 can be part of a database of official records (e.g., a database maintained by an issuer such as a department of state, department of motor vehicles, insurer, employer, etc.).

Figure 3:
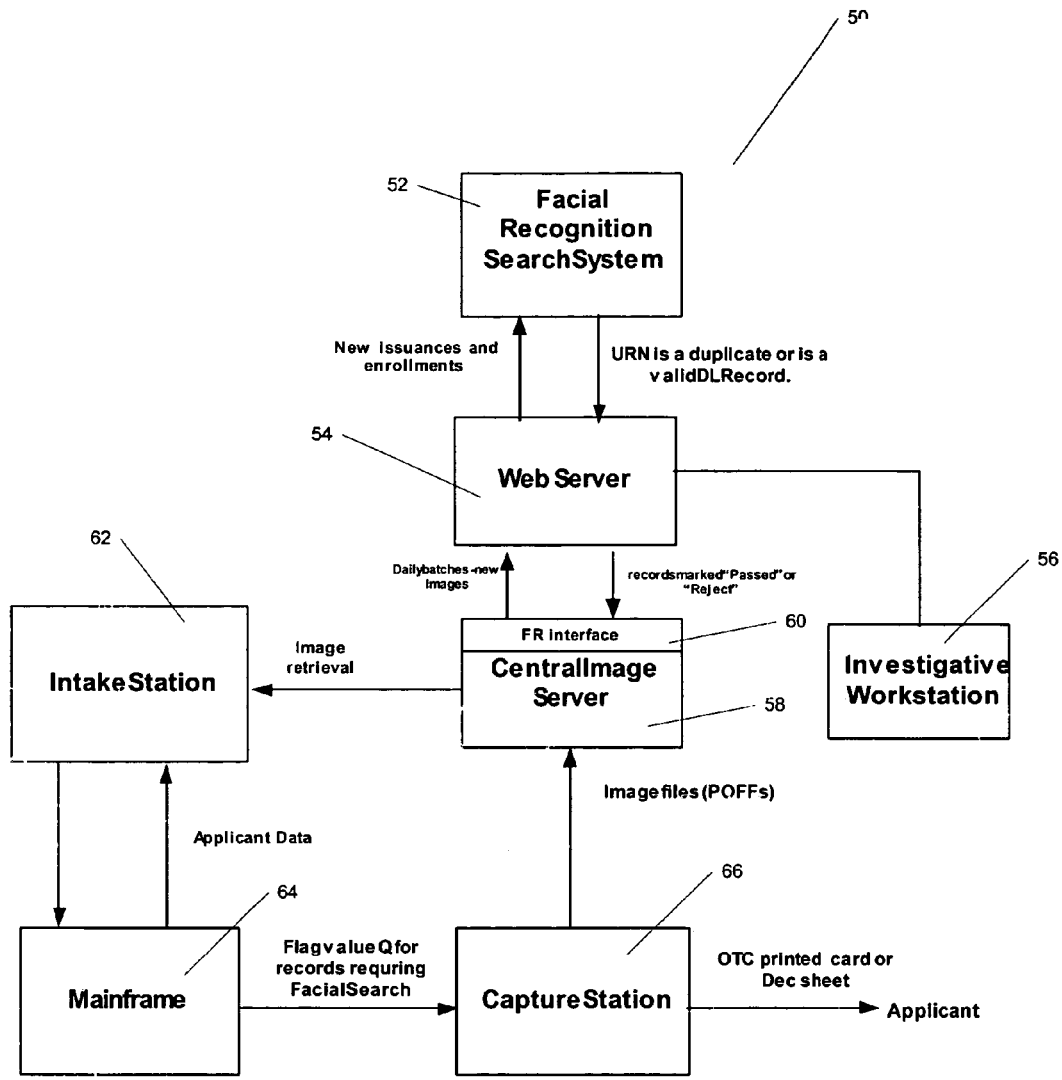
FIG. 3 is a block diagram of a system for biometric searching in accordance with a second embodiment of the invention.

Either or both of the biometric template database 25 and demographic database 37 also can be linked to (or part of) databases containing many different types of records, which can enable an user to "mine" the data and link to other information (this may be more advantageous in the web-server embodiment of FIG. 3). For example, an investigator could use selected aspects of an original probe to probe other databases, and/or use the matches as probes for more matches (as described in our patent application entitled "Systems and Methods for Recognition of Individuals Using Multiple Biometric Searches", Ser. No. 10/686,005, filed Oct. 14, 2003), which is hereby incorporated by reference. The system 5 can use biometrics, such as faces or fingerprints, for the follow-up search, or it can other data, such as names, addresses and date-of-births, for the follow-up search. Effectively, the system 5 turns matches into probes for more matches, and cross-references the results. In addition, the system 5 could search other databases, such as those linked to the individual's social security number or phone number, and cross-reference these results.

Our testing of embodiments of the invention using large (10 million or more images) databases of images has found that such recursive database searching and/or database mining has the potential for significant fraud detection. For example, we have found multiple people sharing one license number. We have also found that people tend to get several fake licenses in a few months. These are patterns that such further analysis can detect and track. In at least some embodiments of the invention, we link this type of data to itself (and even the employees of the issuing authority) to help determine and/or investigate collusion, such as that by criminals, operators and/or administrators of the issuing authority, information technology (IT) operators, consultants, etc.

Referring again to FIG. 2, in some embodiments, the system 5 further includes a search results database 23 for storing the results of searches conducted by the workstation 10. As those skilled in the art will appreciate, the search results database 23, biometric template database 35 and the demographic database 37 can be implemented using any type of memory device capable of storing data records or electrical signals representative of data and permitting the data records or electrical signals to be retrieved, including but not limited to semiconductor memory devices (e.g., RAM, ROM, EEPROM, EPROM, PROM, etc), flash memory, memory "sticks" (e.g., those manufactured by Sony), mass storage devices (e.g., optical disks, tapes, disks), floppy disk, a digital versatile disk (DVD), a compact disk (CD), RAID type memory systems, etc.

In at least some embodiments, the system 5 includes an image/data capture system 15, which can be any system capable of acquiring images and/or data that can be used (whether directly or after conversion to a template) for biometric system. The particular elements of the image/data capture system 15 will, of course be dependent on the particular biometrics used. For example, signature pads may be used to acquire signatures of individuals, camera systems may be used to acquire particular types of images (e.g., facial images, iris images), retinal scanners may be used to acquire retinal scans, fingerprint scanning and capture devices may be used to capture fingerprint images, IR cameras can acquire thermogram images, etc. Those skilled in the art will readily understand what particular pieces of equipment may be required to capture or otherwise acquire a given piece of data or a given image.

In an advantageous embodiment, the image/data capture system 15 can be implemented to automatically locate and capture biometric information in an image that it receives. For example, in one embodiment of the invention that implements a face recognition biometric, we utilize proprietary Find-A-Face™ software available from the assignee of the present invention (Digimarc Corporation of Burlington, Mass.). Find-A-Face™ software has the intelligence to automatically (without the need for any operator intervention):

(i) follow a multitude of instructions and extensive decision and judgment logic to reliably perform the difficult task of locating human faces (with their many variations) within captured digital data (a digital picture);

(ii) once the particular human face is found within the captured digital data, evaluate multiple aspects of the found human face in the image;

(iii) determine, based upon this face location and evaluation work, how the system should position the human face in the center of the digital image, adjust the gamma level of the image, and provide contrast, color correction and color calibration and other related adjustments and enhancements to the image; and (iv) repeatedly and reliably implement these and other functions for the relatively large volume of image capture s associated with producing a large volume of identification documents In another advantageous embodiment, we have found that biometric templates created based on the data captured using the image/data capture system 15 can be further improved by utilizing of various methods to improve finding particular biometric features, such as eyes, which can further be used to improve the performance of biometric searches that use facial recognition. For example, in one embodiment we use systems and methods described in commonly assigned provisional patent applications No. 60/480,257, entitled "Systems and Methods for Detecting Skin, Eye Region, and Pupils" and/or "Detecting Skin, Eye Region, and Pupils in the Presence of Eyeglasses" (Application No. 60/514,395, Inventor Kyung-tae Hwang), filed Oct. 23, 2003, both of which are hereby incorporated by reference. In addition, as described further in this application (in connection with FIG. 16), in at least some embodiments we implement a system that improves facial recognition by improving the eye coordinate locations used by the templates.

The systems and methods described in this patent application are, in one embodiment, implemented using a computer, such as the workstation. 10 of FIG. 1.

Referring again to FIG. 2, in at least some embodiments the workstation 10 can be in operable communication with an ID document production system 39, which can, for example, include a printer controller 27 that controls the printing of ID documents by an ID document printing system 29. The ID document production system 39 can, for example, be a CI or OTC type document production system (as described previously and also as described in commonly assigned U.S. patent application Ser. No. 10/325,434, entitled "Multiple Image Security Features for Identification Documents and Methods of Making Same", which is incorporated herein by reference). In at least some embodiments, the workstation 10 communicates with the ID document production system 39 to control whether or not a given ID document will be created (for issuance to an individual) based on the results of biometric searching.

Note that FIG. 2 is a version of the invention implemented without use of a web server, whereas FIG. 3 (described further herein) is generally similar, but includes a web server as part of the interface between the rest of the system and the biometric searching subsystem. Those skilled in the art will appreciate that systems can, of course, be implemented that operate in some modes using a web server, and in some modes not using a web server.

Second Illustrative Embodiment

FIG. 3 is a block diagram of a system 50 for biometric searching in accordance with a second embodiment of the invention. Note that in the following discussion, all references to particular brands and/or suppliers (e.g., Digimarc, Visionics) are provided by way of illustration and example only and are not limiting. Those skilled in the art can appreciate that other products from other suppliers having equivalent functionality and/or features can, of course, be substituted.

System Overview

In this embodiment, images in digital form are captured periodically (e.g., daily) by an issuing party, such as a DMV. The captured digital images are enrolled in a specialized Identification Fraud Prevention Program (IDFPP) facial recognition database which makes it possible to search the database and find matches using only pictures. Enrollment is a numerical process which reduces facial characteristics to a series of numbers called a template. The IDFPP manages the periodic (e.g., daily) batches of images which are enrolled and searched and also manages the presentation of results in a form convenient to the user.

The production of a Driver's License (DL) or Identification (ID) document requires many processes involving various people and systems. The following summary (presented in the context of the issuance of a driver's license, for illustrative purpose only) summarizes some of the steps of such a process. Basically the production of a DL/ID consists of a session in which the applicant is present, and ends when the applicant leaves (with or without a document). In one example, the session starts with an applicant being greeted at the Intake station 62. This greeting process accumulates information on the applicant, and the DMV mainframe 64 participates in the accumulation of this information. Subsequently, the DMV mainframe 64 issues a request to the image capture station 66. This request causes the image capture workstation 66 to collect the relevant data (images, demographic data, etc.) of the applicant and to produce the appropriate document on a special printer which prints the DL/ID documents. The printer can be present at the DMV (e.g., a so-called "over-the-counter" (OTC) system) or can be remotely located for later issuance to the applicant (e.g., a so-called "central issue" (CI) system, or in some combination of the two). The central image server ("CIS") 58 participates in the collection of image and demographic data, as needed. The CIS 58 also receives any new images which may be captured during a given session.

In one embodiment, the DMV mainframe 64 communicates only once with the image capture Station 66. This communication is one-way from the mainframe 64 to the capture station 66. The communication takes the form of a print request stream containing the request and certain relevant data required by the capture station 66 to produce the required document capture stations can comprise many different elements, but in at least one embodiment consists of a workstation (e.g., as in workstation 10 of FIG. 1), camera tower, signature capture device, and (if applicable) connections to a DL/ID printer as well and/or a paper printer (such as for printing so-called "temporary" ID documents). Images captured by the capture station 66 are "uploaded" to the CIS 58 over a computer network such as the DMV network. Although not illustrated in FIG. 3, a capture station can be located remotely and communicate images to the CIS 58 over the world wide web, via a wireless data link, etc.

In the embodiment of FIG. 3, two general methods are used to help detect fraud. The first is a physical method, and the second is an investigative method. Physical verification involves features on the ID document itself, such as overt and/or covert security features (including but not limited to ultraviolet ink, optically variable ink, microprinting, holograms, etc., as are well understood by those skilled in the art). These features help to provide verification that the document was produced by an authorized issuer and not produced in a fraudulent manner.

Investigative methods utilizes processes such software to assist in the biometric determination of fraud. Specifically, this method helps to detect whether the same individual is applying for several different identities. This method has two actions associated with it:

1. Selection of a list of "candidate images" (in the stored database of images) which might match the face of the applicant 2. Verification (by visual inspection) as to whether fraud is in fact being committed The first action (selection) can be purely based in software. Since each person's face remains the same (for example, in the case of driver's licenses, during those ages in which people are allowed to drive automobiles by themselves), a system which can compare the faces of all the people applying for a drivers license to all others who are applying (or have applied in the past) for a driver's license, would identify all faces that are the "same". Thus, if a single person keeps applying for driver's licenses under various assumed names, this method would be effective if it is applied consistently.

Many DMVs have a large number of "legacy" images of those who are issued driver's licenses. For example, a state like Colorado may have approximately 9 million facial images stored over several years of use. The process of manually checking these images against each new applicant would be humanly impossible. Therefore, the IDFPP implemented by FIG. 3 helps to provide a reliable and automated way to check the identity of each new applicant against images that are already stored in the state's legacy of driver license images (note that it is preferable that the legacy images be digitized to facilitate conversion to templates). However, although the system of FIG. 3 can help to select a list of potential candidates, it may not determine decisively that fraud is being attempted. For example, the system of FIG. 3 may bring up an image of a person who is the biological twin of the probe image (a legitimate person who exists and looks exactly like the applicant). Thus, another level of intervention, such as review by a human user, can help to finalize a suspicion of fraud. Thus, the system 50 of FIG. 3 permits a human user to perform such "verification" steps The following description illustrates the various software modules, databases and processes needed to implement the Facial Recognition System (FRS) of FIG. 3 as part of the Fraud Prevention Program (IDFPP) of this embodiment of the invention.

The system 50 of FIG. 3 includes a facial recognition search system 52 ("FRS 52"), a web server 54, an investigative workstation 56, a central image server 58 (including a facial recognition interface 60), an intake station 62, a mainframe 64, and a capture station 66. The investigative workstation 56, intake station 62, mainframe 64 each can be a workstation similar to the workstation 10 of FIG. 1. The capture station 66 can be similar to the image/data capture system 15 of FIG. 2.

Referring again to FIG. 3, the facial recognition (FR) interface 60 is an interface used to provide necessary information for communications between the CIS 58 and the facial recognition search system 52 ("FRS 52"). The details of operation of the FR interface 60 will, of course, depend on the particular facial recognition search engine used, and we anticipate that those skilled in the art will readily understand how to create and/or adapt an interface for communication between any two system elements. We also note that, depending on the system elements, an interface such as the FR interface 60 may or may not be necessary.

The web server 54 can be any type of web server. In one embodiment, the web server 54 is a Covalent Web Server that includes an SQL server, an Identix Enterprise Server, an MSMQ Server, and various Digimarc applications.

The facial recognition search system 52 ("FRS 52") is a system that stores a "mathematical equivalent" (often called a "Template") of each digital image that is in the CIS 58. As discussed further herein, the process of selecting a group (if one or more exists) of candidate images which "match" a given probe image, involves searching through all the template images stored by the FRS 52. This is also known as a one-to-many search.

The central image server 58 ("CIS 58") is a server that stores all the digital images of all individuals whose image has been captured and who have been issued an identification document over a predetermined time period. The CIS 58 can be a database of images that have been captured at a given location (e.g., a DMV), but is not limited to those kinds of images. For example, the CIS 58 can consist of one or more databases stored by differing entities (e.g., governments, law enforcement agencies, other states, etc.). In this manner, the system of the invention can be used for inter-jurisdictional searching.

In one embodiment, the CIS 58 is a relational database linked to a repository of image files, along with a software module that provides access to them called a Polaroid Central Image Management System (PCIMS) that manages the input and retrieval of the image data. Of course, any system capable of managing the input and retrieval of image data would be usable as an image management system, and the use here of a proprietary PCIMS system is not intended to be limiting. Thus, the CIS 58 stores images and provides for their later retrieval (via the web server 54, intake station 62, and the investigative workstation 56).

In one embodiment the CIS 58 comprises a Sun 450 Solaris system that includes subsystems handling demographics and locations of personal object files (called "poff" files). Poff files have a file format that is designed to encapsulate all the data needed to process an individual ID document, such as an ID card. All the data needed to print and handle the card will be included in the file. This permits this file to be shipped as an entity across a network where it can be printed, displayed or verified without need for additional information. The specific fields and their order in text area are not specified, there is a provision for a separate block of labels for the fields for display purposes. The format is suitable for encoding on 'smart cards' as well as transmission and printing of the records. More information about the POFF file format can be found in commonly assigned U.S. patent application Ser. No. 10/325,434, entitled "Multiple Image Security Features For Identification Documents and Methods of Making Same", filed on Dec. 18, 2002 and published as US 2003/0183695 A1 on Oct. 2, 2003. The contents of this application are hereby incorporated by reference. Of course, it is not necessary for the invention that the POFF file format be used. Those skilled in the art will appreciate that many different file formats can be utilized to manage data for printing onto an identification document.

In at least one embodiment, the CIS 58 performs one or more of the following functions:

accepts (from the capture station 66) and stores a predetermined portion (e.g., all) information for cards which require identification fraud prevention (IDFPP) processing responds to the FRS 52 when required to do so, by providing a predetermined portion (e.g., ALL) images captured during the business day so that these images can be enrolled in the FR database responds to the FRS 52 when required to do so, by providing a predetermined portion (e.g., all) PROBE images captured during a specified business day so that these probe images can be processed by the FRS 52 allows for changes in the status of IDFPP related information for stored images. For example, status designators can be assigned, such as "Pending Investigative Review", and "Void by Enforcement" (these designators are not, of course, limiting). The changes in status may be initiated from the FRS 52, or Investigative Workstation 56, depending on various functions exercised by the FRS 52 and Investigative workstation 56 operates such that any change to the IDFPP status of a record, which causes it to become a predetermined status (e.g., "Void by enforcement") causes a corresponding change to the document status, (e.g., where the status is marked as "void").

supports identification of approved/suspected ID documents during a nightly (or other periodic) processing phase (in at least one embodiment, records are uploaded in a batch process for further investigation, but that is not limiting—processing can occur as each image is captured and/or enrolled, or at virtually any other time)

produces a printed report of the daily expected number of identification documents which require IDFPP processing. If desired, this report can be sorted in any desired manner (e.g., by last name).

Two of the functions of the FRS 52 that pertain to the CIS 58 are enrollment and searching. Enrollment is the addition of facial images to the FRS 52 from the CIS 58 and searching is the matching of a particular image against this image repository on the FRS 52. In one embodiment, the FRS 52 has read and write access to the database of the CIS 58 and read access to its image files. The database of the CIS 58 is used both to initiate the processing of records and to store the results of that processing. The Poff files are used for the images (e.g., portraits) they contain, as it is these portraits that assist during the investigations described herein. The PCIMS of the CIS 58 are arranged so that the records in the database can be marked for enrollment or searching.

Addition of images, in one embodiment, occurs as part of an enrollment process. In one embodiment, images are periodically uploaded from the CIS 58 to the FRS 52. Advantageously, this can occur outside of normal operating hours of the issuing authority. These images are then converted into templates and stored (in a process called "enrollment") in the FRS 52. After these images are stored, the FRS 52 retrieves all the images which are marked as probe images. Then, each probe is used to perform a one-to-many search for a list of candidates which match that probe. For each probe which actually results in two or more matches (the probe is already in storage and will match itself), the corresponding data in the CIS 58 is marked as "Awaiting Verification". This concludes the selection operation. In at least one embodiment, all other images (other than the image of the probe itself) can be "candidates" that are searched. In at least one embodiment, the images being searched are classified in advance by some parameter (e.g., race, hair color, specific demographic data associated with the image, etc.) to improve the speed and/or accuracy of searching.

An investigator can later retrieve all probe images which have been marked as "Awaiting Verification". In at least one embodiment, the investigator is provided with a predetermined ordered method for comparing the candidates with the probe image. The investigator will visually (and otherwise) determine if a given probe actually matches the candidates selected by the selection operation. If the investigator concludes that one or more candidate images are indeed the same as the probe image, the investigator will "reject" the probe image and also select and reject one or all of the candidate images. This will cause each image (probe and selected candidates) to be marked as "Void by Enforcement" in the CIS database. In addition, all candidate images which were not rejected by the investigator have the "Awaiting Verification" marking removed from them.

If the investigator concludes that none of the candidate images match the probe image, the investigator will "accept" the candidate image. This will cause the "Awaiting Verification" to be removed from the probe and all its related candidates. This may conclude the investigation/fraud detection/prevention activity, or further action may occur. For example, if an identification document had been issued to a candidate "instantly" (in, for example, an over-the-counter system) and it is later determined that the applicant may be committing fraud, law enforcement officials may be notified. In another example, if the system is a central issue type of system (where the identification document is provided to the applicant at a later time), and the investigation of an applicant raises concerns (applicant is not "accepted"), issuance of the identification document from the central issuing authority may be delayed or prevented until further investigation occurs. Many other outcomes are, of course, possible.

In one embodiment, when the FRS 52 communicates with the CIS 58, it provides transaction data (e.g., data taken when an individual attempts to get an identification document—such as a driver's license—from an issuer—such as a DMV). The transaction data includes FRS 52 specific data. The PCIMS of the CIS 58 receives the data and stores data in the database and image files of the CIS 58. The transaction data includes an indicator signaling whether or not a search should be performed using data (e.g., a portrait) contained in the transaction data, and the PCIMS module of the CIS 58 sets a corresponding indicator in an FRS data table (in the CIS 58) based on the search indicator. Another indicator can also be set to trigger enrollment of the portrait in the FRS 52 database. The FRS 52 can then read these values and process the records accordingly.

Third Illustrative Embodiment

Figure 4:
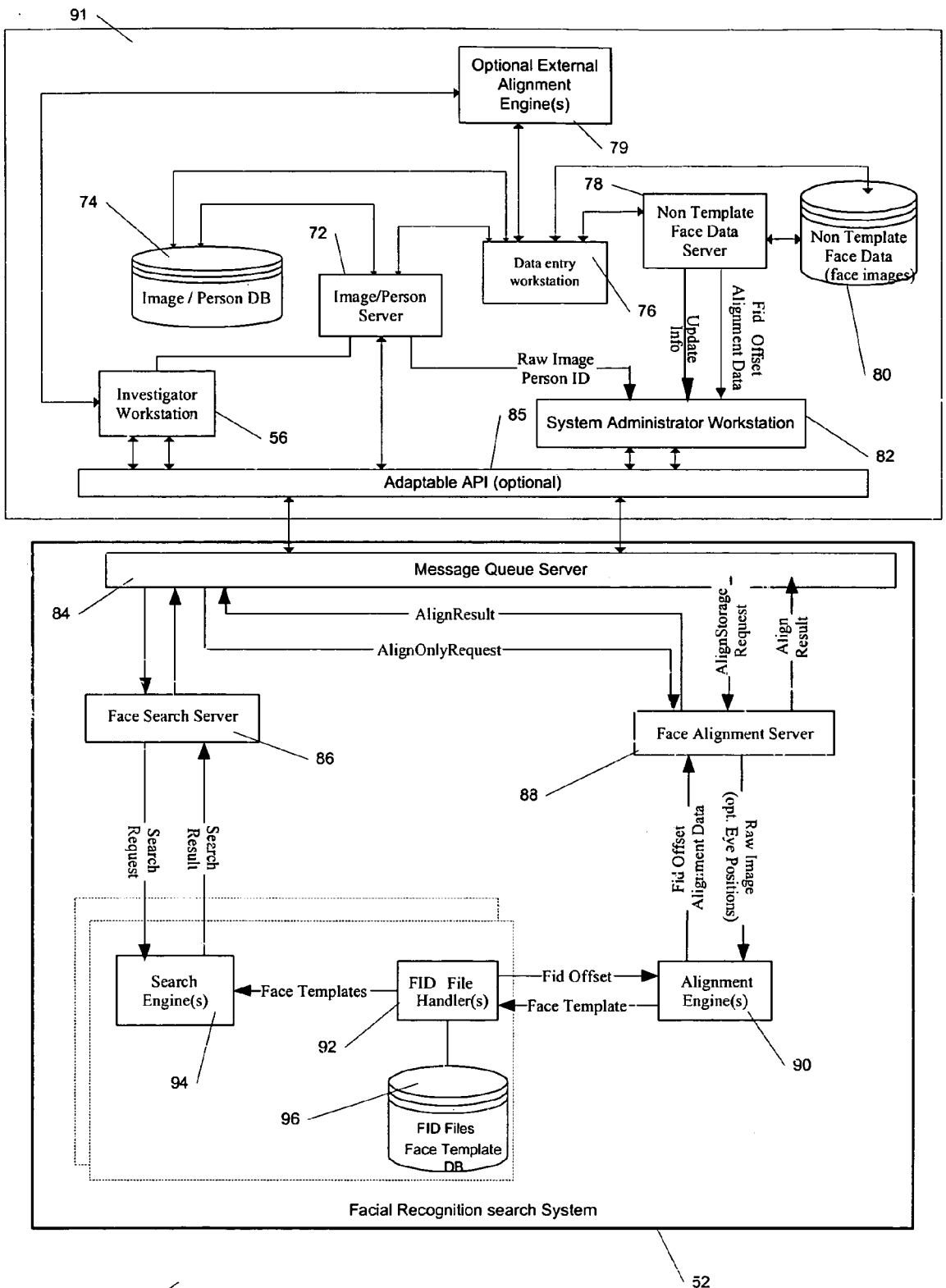
FIG. 4 is a block diagram of a system for biometric searching in accordance with a third embodiment of the invention.

FIG. 4 is a block diagram of a first system for biometric searching 70, in accordance with a third embodiment of the invention. Note that elements of the system of FIG. 4 that have common names and/or functions to the systems of FIGS. 2 and 3 (e.g., "investigator workstation") can, in at least one embodiment, be implemented using the same hardware and/o software described previously, and these elements, in at least some embodiments, operate similarly to their namesakes in FIGS. 2 and 3. Of course, the names provided here are not limiting.

Referring again to FIG. 4, the first system for biometric searching 70 includes a photo validation system (PVS) 91 (also referred to herein as an identification fraud prevention system (IDFPP) 91) and a facial recognition search subsystem 52. The photo validation system 91 includes an investigator workstation 56, image/person server 72, an image/person database (DB) 74, a data entry workstation 76, a non template face data server 78, a non template face data database 80 (also called a face image database 80), a system administrator workstation 82, an optional adaptable application programming interface (API) 84, and an optional external alignment engine(s) 79. The facial recognition search subsystem 52 includes a message queue server 84, a face search server 86, a face alignment server 88, one or more alignment engines 90, one or more face image data (FID) file handlers 92, one or more search engines 94, and a face template database 96 (also referred to the FID database 96). Each of these elements is described further below.

The first system for biometric searching 70 provides requisite utilities for system administration and maintenance, which are done via the system administrator workstation 82 (which can, for example, be a workstation similar to workstation 10 of FIG. 1). These utilities are tools, programs, and procedures that system administrators can use to maintain the database, software, and other system components. The utilities are not necessarily directly related to the match-search or the enrollment processes, and the typical operator/investigator need not necessarily be required to know anything about them to use the system effectively. Examples of operations that the System Administrator Workstation can perform include:

Initializing a face image database 80 and/or face template database 96: Process the existing set of face images at the time of initial system install (align all or a predetermined portion of existing face images in the face image database 80). Direct the alignment server 88 to create a face template for each existing face image.

Update face image database 80 and/or face template database 96: Periodically add newly acquired images and direct the search engine 94 to create a record for each new face image. This can typically occur on a daily basis. An illustrative system is capable of acquiring 8000 new images per day, but this is not limiting.

The image/subject database server 72 (also referred to as an Image/Person server 72) is a storage/retrieval system for face images and the related subject data. It is analogous to the CIS 58 (FIG. 3). It accesses a plurality of face images and the corresponding subject data for the face images. In one embodiment, the face images and corresponding subject data are stored in the Image/Person database (DB) 74. The number of face images can steadily increase as images are enrolled to the system, and the face recognition system can incorporate on a regular basis newly added image/subject records and can be designed to scale to a large number of images. For example, in one implementation, we have worked with databases of around 11 million images. We do not, however, limit our invention to image databases of this size, and we have been able to scale various embodiments of our invention to about 20-40 million images. We expressly contemplate that embodiments of our invention can be scaled and adapted to work with databases of images that are as large as desired.

The system of FIG. 4 also includes utilities for system administration and maintenance. These are tools, programs, and procedures that system administrators can use to maintain and update the database, software and other system components. In this embodiment, the system administration utilities are not necessarily directly related to the facial match search, and the typical operator/investigator is not necessarily required to know anything about these utilities to use the system effectively.

A user, such as an investigator/operator, controls the search process through the investigator workstation 56. In this embodiment, the investigator workstation 56 has a graphical user interface (GUI) with the ability to be customized to duplicate the "look and feel" of systems that already exist at customer sites with similar functionality. Advantageously, the investigator workstation is designed to be easy for an operator to use. Illustrative examples of the "look and feel", as well as the operation, of an exemplary operator workstation and an exemplary user interface are further described in connection with the screen shots of some embodiments of the invention that are provided herein. Note that although only a single investigator workstation 56 is illustrated in FIG. 4, systems implemented in accordance with the invention may contain one or more investigator workstations.

The data entry workstation 76 (which can, for example, be a workstation similar to the workstation 10 of FIG. 1) is used to add, update and remove non face recognition data to the image/subject (also called image/person) database 74. In this embodiment, the functionality of the data entry workstation 76 is highly dependent on the customers' needs. For example, in one embodiment, the capture of subject images can be integrated in the data entry workstation 76. In one embodiment, the printing of identification document also can be integrated into the data entry workstation 76 or coupled to the data entry workstation 76 (as in FIG. 2). In addition, we expressly contemplate that the capture station described in commonly assigned U.S. patent application Ser. No. 10/676, 362, entitled "All In One Capture station for Creating Identification Documents", filed Sep. 30, 2003, can be used with (or instead of) the data entry workstation 76, and the contents of this patent application are incorporated herein by reference. We also note that although only one data entry workstation is illustrated in FIG. 2, the system as implemented in accordance with the invention may contain one or more data entry workstations.

The face alignment server 88 receives alignment requests from the workstation 82 via the message queue server 84, and distributes the alignment requests to the alignment engines 90, and returns the alignment success to the requesting workstation 82. Alignment, in the context of facial recognition searching, refers to locating selected elements (e.g., eyes) in an image, so that a corresponding biometric template can be created. Also, the alignment server 88 can read specific alignment requests (see the "AlignOnlyRequest in FIG. 4) from a face alignment request queue in the message queue server 84. In at least one embodiment, the alignment service is scalable. For example, to be able to serve large numbers of alignments per day, the alignment server can distribute the alignment requests to one or many alignment engine(s) 90. The scaling of the alignment service is, in an illustrative embodiment, designed to correlate to the number of new facial images (e.g., 8000 images) that are acquired in a given time period (e.g., per day). To accommodate the need of investigators for on the spot alignment, in at least one embodiment, single alignment requests can be posted with a higher priority, so they get places at the top of the alignment queue.

Note, also, that in at least some embodiments, the PVS 91 optionally can include (or be in communication with) one or more external alignment engines 79, each of which is capable of aligning an image. As will be explained further in connection with FIG. 16, using an external alignment engine 79 can enable the PVS 91 to send images to the facial recognition search system 52 already aligned (e.g., with a set of eye coordinates). As explained further in connection with FIG. 8, in one embodiment, if the facial recognition search system 52 receives an image that is already aligned, it does not itself align the image, but instead uses the alignment information provided to it by the PVS 91 to conduct its searching. In a further embodiment (relating to FIG. 16), the PVS 91 can use one or more external alignment engines 79 (instead of or in addition to the alignment engines 90 of the facial recognition search system 52) to compute sets of eye coordinates, to apply one or more predetermined rules to determine which eye coordinates are likely to the most accurate.

The message queue server 84 handles the face align request queue and contains the list of all alignment requests that have not yet been completely serviced. When the alignment server 88 begins its alignment cycle, it reads the alignment request at the top of the face align request queue in the message queue server 84.

Figure 6A:
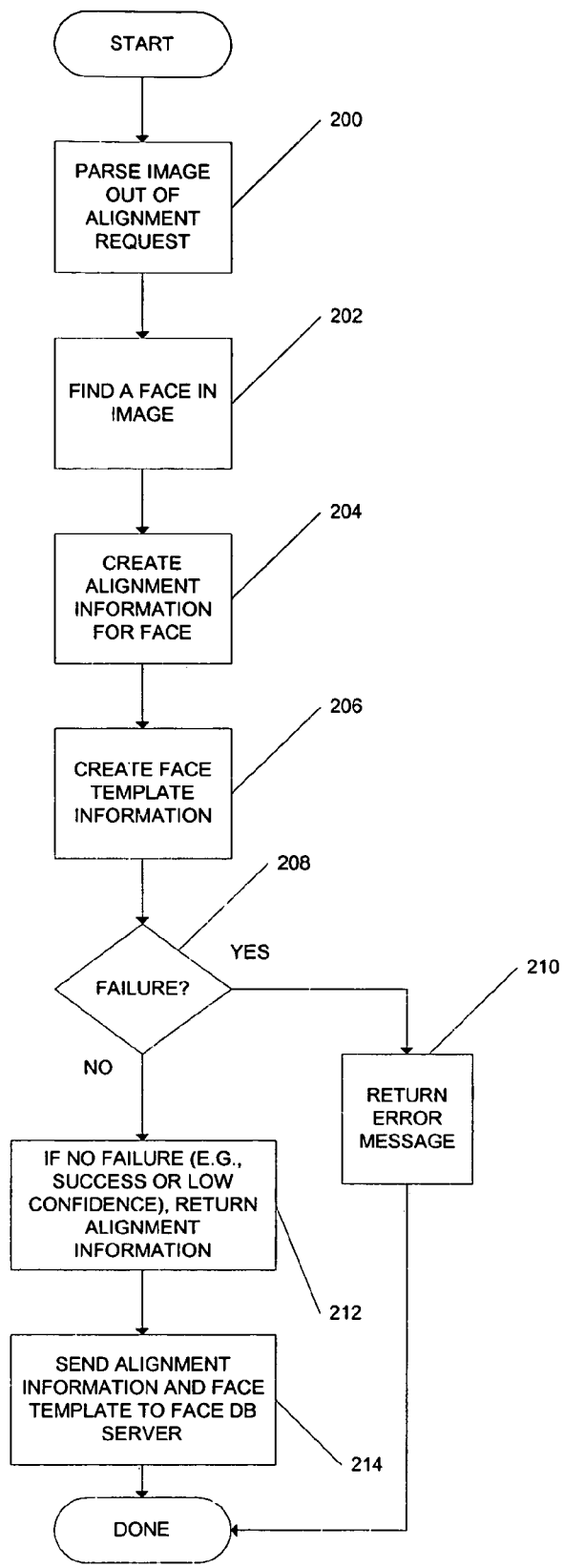
FIG. 6A is a flow chart of a first method for alignment of an image, in accordance one embodiment of the invention.
Figure 6B:
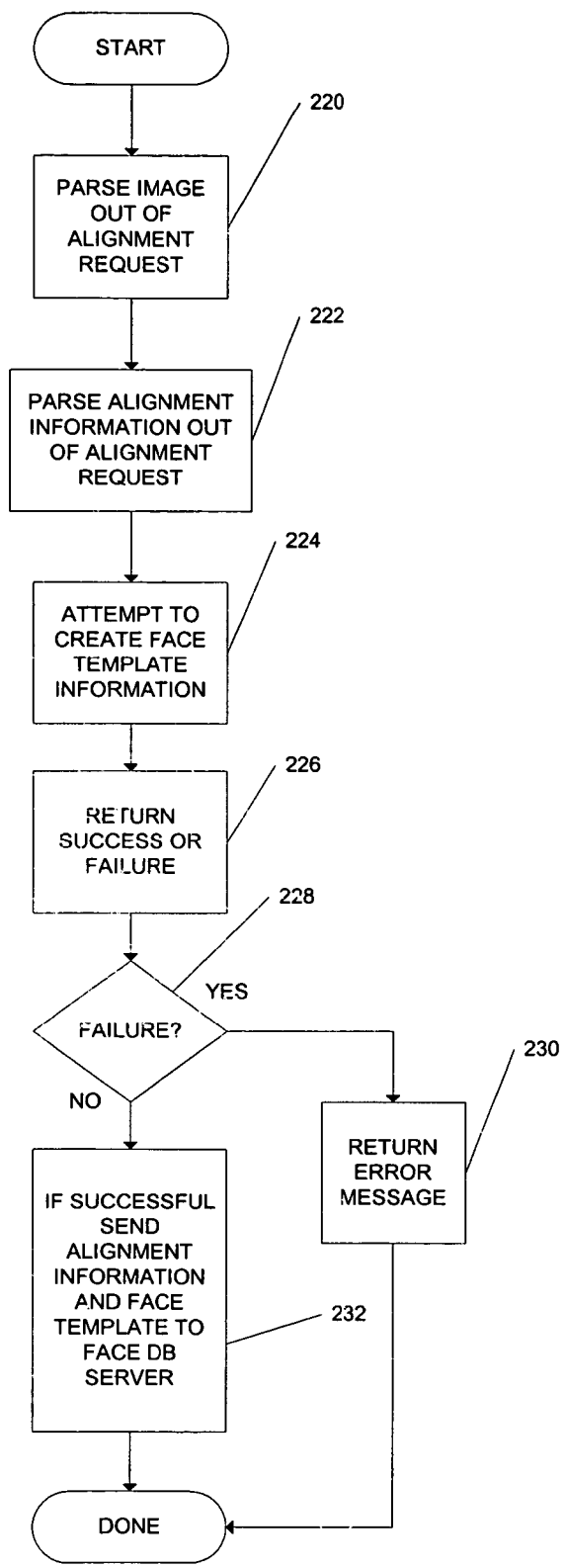
FIG. 6B is a flow chart of a second method for alignment of an image, in accordance one embodiment of the invention.

The alignment engine 90 receives an alignment request from the alignment server 88, creates the face template and other related data and stores it in the face database 96 (also called the FID Files 96). The alignment engine 90 can perform an automatic alignment procedure and return a success/ failure result, or take manual alignment information (see FIG. 6B) to create the face template. In one embodiment, the alignment engine 90 performs only one alignment at a time, and can then return the result to the alignment server 88. When there is a successful alignment, the alignment engine 90 optionally can send the face template and the other alignment information to the face database server 92 (e.g., FID file Handler 92) for storage in the face database (FID Files 96). Two forms of alignment request (automatic and manual) can be sent to the alignment engine 90. FIG. 6A is a flowchart of a method used for an automatic alignment request, and FIG. 6B is a flowchart of a method used for a manual alignment request. Each of these methods is described further below.

The message queue server 84 maintains a request queue for the Face Search and contains the list of all search requests that have not yet been completely serviced. When the face search server 86 begins its search cycle, it can read the search request at the top of the search queue.

Figure 5:
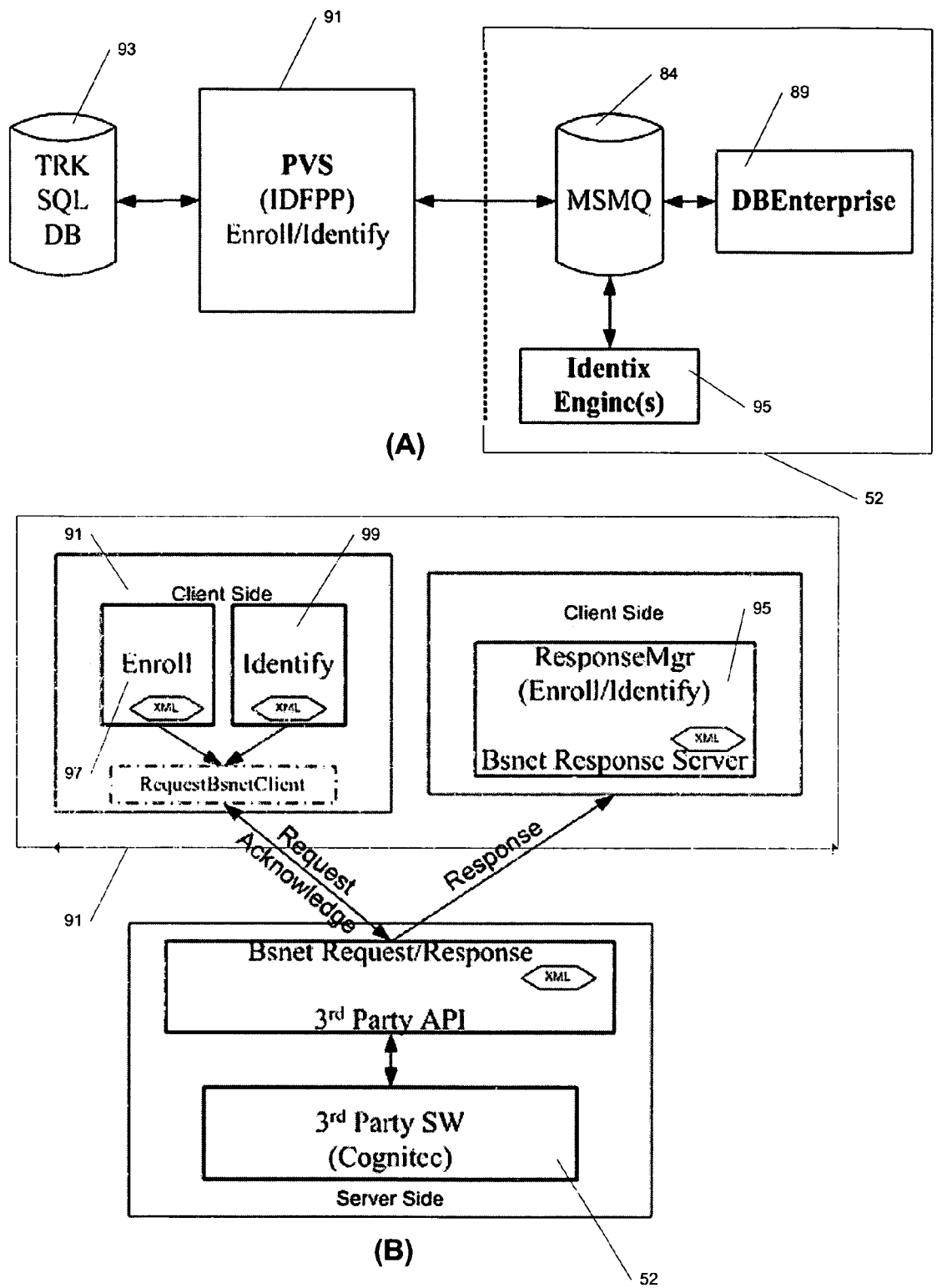
FIG. 5A is a diagram illustrating a first process for communication between a photo verification system and a facial recognition search system, in accordance with one embodiment of the invention.
FIG. 5B is a diagram illustrating a second process for communication between a photo verification system and a facial recognition search system, in accordance with one embodiment of the invention.

As noted above, use of the adaptable API 85 is optional and is not required for all embodiments of the invention. In at least one embodiment, the photo validation system 91 communicates directly to a specific facial recognition search system (the Identix FACEit system) via the message queue server 84, using Microsoft Message Queue (MSMQ) protocol. This is illustrated in FIG. 4A. Referring to FIG. 5A, the facial recognition system 52 provided by Identix includes a subsystem of Identix Engines 95 (including, for example, the alignment engines 90 and search engines 94 of FIG. 4, along with associated file handlers, etc.), the message queue server 84, and a layer called DBEnterprise 89. DBEnterprise 89 is a layer added on top of the Visionics application to manage queue messages and finalize the search results.

In this embodiment (which includes only the message queue server 84), enroll and identify modules in the photo validation system 91 constantly monitor the information in an SQL tracking database 93. The SQL tracking database 93 is a repository that tracks what information is eventually going to uploaded to the image repositories (e.g., the CIS 58 (FIG. 3) and/or the image/person database 74, face images database 80). When new enroll or identify request becomes available, the SQL tracking database 93 formats an MSMQ message and places it on the request queue of the message queue server 84. DBEnterprise 89 extracts each request message and in turn formats another message and places it on a queue for one or more of the engines in Identix Engine(s) 95 (or, optionally, in every engine's queue) for identify requests. The Identix Engine(s) 95 receiving the message then process the request and place the results in the specified response queue on the message queue server 84. Appropriate modules in the photo validation system 91 can extract the responses from these queues and then process the results.

In one embodiment, the photo validation search system 91 includes an adaptable API 85. The adaptable API 85 is an optional feature that can enable the photo validation system 91 to communicate with one or more facial recognition search systems 52, each of which may have different interfaces. With the adaptable API 85, the photo validation system 91 can communicate with facial recognition search systems 52 from different vendors, so that the photo validation system 91 need not be specifically designed and configured to work with a system from just a single vendor. The photo validation system 91 communicates with the facial recognition search system 52 (which can, for example, be a third party system from a company such as Identix or Cognitec), to perform at least two operations for the first system for biometric searching 70:

Enroll

Analyzes a facial image and create a template describing the image characteristics like eye coordinates, facial characteristics, etc.

Identify

Searches the database of previously enrolled images and create a template ID list of possible matches based on the number of matched images and the confidence level of the matched image.

The adaptable API 85, in one embodiment, is configured to work in accordance with a Berkeley Sockets Network (BS-NET). (The reader is presumed to be familiar with Berkeley Sockets Networks, and this technology is not explained here). The adaptable API 85 works with the PVS 91 to enroll and identify images using BSNET to interface to an external facial recognition system 52. FIG. 5B is a diagram showing the process flow that occurs between the PVS 91 (client) and facial recognition system 52 (server), in accordance with one embodiment of the invention.

The PVS 91 has a process running on it that periodically monitors predetermined tables in the tracking database 93 for new enrollment and/or identify requests. When a new request becomes available, the information is collected and a call to an extensible markup language (XML) encoder will create a string of tag/data/endtag elements. In at least one embodiment, BioAPI compliant XML format is used to be compliant with standards such as the BioAPI standards. This string is then passed to the server application along with the data size and the actual data in text format.

On the server side, the receiving module sends an acknowledgement to the fact that a request is received. A unique request id links each request to a response. A RequestMgr on the server side decodes the XML data buffer and places each token into proper structure format used by the $3^{rd}$ party application. The server then spawns a thread and passes the request structure to it. The spawned thread makes a $3^{rd}$ party API call to process the request. At this point, the thread waits for the response. When a response becomes available, the process collects the data, makes a XML call to format the data and creates a response message. The response message is then send to a module called ResponseMgr (which is responsible for processing all requests generated by the server application). The response manager examines the response and based on the unique id of the original request, processes the results by populating the tracking database records and setting this step's completion flag.

The process flow for this embodiment is shown in FIG. 5B. In at least one embodiment, enroll and identify processes use polling. In at least one embodiment, enroll and identify process can be triggered by virtually any mechanism, such as a database status change, or some other mechanism like launchPad, a $3^{rd}$ party application.

Enroll Sending Process

In this embodiment, the enroll process is generally (but not always) triggered by the changes in database records stored in a location such as a CIS 58 (FIG. 3). When a new license is issued, a record is added to the CIS database and predetermined tables in the database (in one embodiment, these tables include facial recognition or other biometric information, POFF information, and demographic information) are populated with information related to the new person. In addition, a status flag is set to ready, 'R'. In one embodiment (batch mode), these new records are accumulated until the predetermined time when images are batch processed (e.g., an end of the day process.)

At the predetermined time, on the tracking database 93, a new daily schedule record is created in a predetermined table (e.g., a table called the frDailySchedule table). This is a new batch job. In this embodiment, each batch job can process up to 5000 enroll and/or search requests. This batch job triggers a backend process (which we call frsmain) to check the CIS database for records with the frstatus flag set to ready 'R' (in other words, to check for records that are ready to be searched against a set of previously enrolled images, whether enrolled to this system or some other system).

If such records exist (i.e., records ready to be searched), then, the backend process reads each record, up to predetermined maximum set in the batch record (currently 5000), accesses the records poff file indicated by poff_location, extracts the person's portrait image, sets the frstatus flag to 'R' and populates a queue that we call the frENROLLMENTQ of the tracking database. These new records in the enrollment table have status flag, 'VisionicsStatus', set to 'N' while the frsmain transferring all batch records. When all batch records are transferred, then, frsmain sets the 'VisionicsStatus' flag to 'R' for ready. In addition, each record gets a new unique 'PersonID' which is used by the $3^{rd}$ party application as the template id.

The enroll process polls the frENROLLMENTQ for ready records to be enrolled, or can be triggered by the stored procedure which sets the completion flags for the new records to ready 'R'.

In one embodiment, the enroll process includes the following steps
  i) read each ready record from the enrollment table,
  ii) set the 'VisionicsStatus' flag to started 'S',
  iii) get the image URL path from the database record,
  iv) fill in the request structure,
  vi) call XML encoder to encode the request structure,
  vi) call bsnet send request with the above information, and
  vii) process the acknowledgment.

The unique request id, which can the same as the current person id, is a relevant data element in enrolling the image and receiving the results.

Enroll Receiving Process

This is a function call inside the ResponseMgr. The response manager will accept the arguments passed to it by the RequestMgr. The response message indicates align, enroll and/or a search request. If enroll, then, it calls 'pvsProcessEnrollResponse' module. This module reads the response, locates the record having the same unique id, and updates the record information, such as eye coordinates, alignment confidence level, and date time information. It also sets the 'VisionicsStatus' flag to done 'D', and moveToCIS to ready 'R'. This last flag allows the backend to update CIS with the new enrollment data.

Identify Sending Process

There are multiple ways that a record is ready for identification, such as
  End of an enroll process for a batch job,
  User initiated identify request, via GUI or programming interface
  Through drill down (see our patent application entitled "Systems and Methods for Recognition of Individuals Using Multiple Biometric Searches", which is referenced and incorporated by reference elsewhere herein), and/or
  Through operator using database table frPROBEQ status flags The identify request, similar to the enrollment request, examines the alignment information for the image being searched. If no alignment information available, it will make a call to the alignment module. The record will remain unchanged until the alignment information is available.

When all information, including the image, the alignment information, maximum number of matched records, and maximum confidence level is known, a search request is formatted and XML encoded and sent to the server.

Identify Receive Process

This is a function call inside the ResponseMgr. The identify response includes a list of matched template IDs and each ID's confidence level. The identify response process makes a database call to get the information for the record being searched. This includes whether this is a single search or a batch search and number of records requested with maximum threshold value.

The single search is when an investigator initiates a search from a list of existing search candidates, or the investigator uses unique CIS record id to access the image, or search is done using an image file, or a drill down search. The batch search is result of a daily batch enroll and search process.

The receive process updates the searched record with the number of matches returned, inserts a new record into the frCANDIDATES table with the records id (template id) and the confidence level, and sets the candidate flag to ready 'R'. The candidate records will be updated by the backend.

The backend process reads each ready candidate record and using the record id extracts CIS information about the person, including location of the poff, demographics information, portrait image, finger print images, signature image, and updates the tracking database. When all candidates of a searched record are populated, the searched record becomes ready for viewing.

Ping Process

This module is used to ping the server to make sure the server is up and listening for calls. Each module in this component can to make this call to make sure the server is up and running. If not, a message is logged and the process terminates.

Operation of System of FIG. 4

Referring again to FIGS. 4 and 5, the alignment server 88 begins an alignment by reading the alignment request from the Face Alignment Request queue in the message queue server 84. Batch alignment requests are handled by putting a portion of alignment requests on the alignment request queue. If the face image is part of the alignment request, it can be parsed out of the request (step 200 of FIG. 6A). For example, software (such as the previously described Find-A-Face, the previously described "pupil detection" patent applications, etc.) can be used to find a face and/or the eyes in the image (step 202). Specific software adapted to locate eyes in an image can be part of a facial recognition search engine 94. For example many facial recognition search engine vendors include eye finding as part of their offerings. We have found that, in at least one embodiment of the invention, the accuracy of facial searching can be improved by using the eye finding of a first vendor (e.g., Cognitec) together with the facial recognition searching of a second vendor (e.g., Identix). In another embodiment, we have found it advantageous to use an inventive method for selecting the best eye location; this method is described more fully in connection with FIG. 16, herein.

Referring again to FIG. 4, the face image and the related alignment settings are then sent to the next available alignment engine 90. The Face Alignment Server 88 waits for the alignment engine(s) 90 to return a result. The alignment engine 90 can return a result such as a success, failed or low confidence result together with the computed alignment information (eye positions). In at least one embodiment, to prevent results from being lost due to network failures, workstation crashes, etc., the results are not discarded until the requesting workstation acknowledges receiving the result.

Referring again to FIG. 6A, based on the alignment information created for the face (step 204), a face template is created (step 206). If there is a failure in creating a face template (step 208) (for example, if the eyes were not located in the image), then an error message is returned (step 210). If there is no failure (e.g., if the returned result is success or low confidence), then the alignment information and face template are returned to the face data server 78 via the message queue server 84 (step 214). In one embodiment, we have found that an alignment engine 88 can performs an average of 30 alignments per minute. Scaling can, improve performance; for example, in one embodiment, to accommodate to higher performance needs, several alignment engines 90 are arranged serve one alignment server 88.

Referring to FIG. 6B, for the manual alignment request, the image is parsed out of the alignment request (step 220), and alignment information (e.g., manually entered eye locations) are also parsed out of the alignment request. The manually entered eye locations can be selected manually by an operator viewing an image (e.g., by sliding lines or crosshairs on a screen and noting the respective x and y coordinates of the location of each eye.) The manually entered eye locations also can be selected via a combination of manual and automated functionality. For example, eye finding software can be used to find eye locations in an image and display tentative locations to a user (e.g., in the form of cross hairs, marks resembling the letter "X" at eye locations, circles or other shapes, etc.). The operator can then adjust the displayed eye coordinates as needed. The details of such a process are known and used in many different environments and are not necessary to explain her (for the reader to try an example of such a process, see the "try it on" feature at www.eyeglasses.com which locates a user's eyes in an uploaded image, for the purpose of showing to the user how the user would look in a given pair of glasses).

Based on the manually provided alignment information, the alignment server 88 attempts to create a face template (step 224). If there is a failure in creating a face template (step 228) (for example, if the eyes locations provided did not result in a valid template), then an error message is returned (step 230). If there is no failure (e.g., if the returned result is success or low confidence), then the alignment information and face template are returned to the face data server 78 via the message queue server 84 (step 232).

Referring again to FIG. 4, the face search server 86 receives search requests from the investigator workstation 56, distributes the search to the search engines 94, collects and compiles the resulting match set, and returns the match set to the requesting investigator workstation 56. In one embodiment, the face database 96 is partitioned so that a given search engine 94 searches only its respective partition.

The search engine 94 receives search requests from the search server 86, executes the search on its partition of the face database 96 and returns the resulting match set to the search server 86. In one embodiment we have found that the search cycle can execute at a minimum rate of about twenty million faces per minute, per search engine 86, but this rate is not, of course, limiting. To increase the speed of searching, in at least some embodiments the system 70 can use multiple search engines 86. For example, a configuration with 5 search engines can scale up to one half million faces per minute. We have found that in another embodiment of our invention, each search engine can search about 1.5 million faces.

The FID (face image descriptor) File Handler 92 maintains the database of face templates 96, one for each face image intended as a candidate for matching. Note that in at least one embodiment of the invention, there can be more than one FID file handler 92. For example, in one embodiment of the invention, we have a FID file handler for each template used by a so-called "two pass" biometric system (which uses a so-called coarse biometric template followed by a so-called fine biometric template, e.g., a coarse template of about 84 bytes to do a "first pass" search of a database of other coarse templates, followed by a search of a portion of the "first pass" results using the "fine" template). The face template is a preprocessed representation of the face that a search engine can use in matching search. In at least one embodiment of the invention, the face template is a template usable with a so-called local feature analysis (LFA) type of facial recognition algorithm, such as is used in the IDENTIX FACE IT product. Operation of at least part of this algorithm is detailed in U.S. Pat. No. 6,111,517, which is incorporated by reference in its entirety. The FID Handler 92 does not necessarily store the raw images (as discussed further below). The alignment engine 90 can generate the face templates. The initial face data set can be constructed at any time; in one embodiment, the initial face data set is constructed at the time of system installation. After the initial face data set is constructed, the administration workstation 82 can supply new images for which face data can be added to the FID Files. These new images can be provided periodically (e.g., daily or weekly), in response to a request, or upon the occurrence of a condition. This process is similar to the "enrollment" process of FIG. 3.

To provide scalability and high performance, the face templates can be distributed over multiple computers. The FID File handler 92 is responsible for balancing the data load on multiple data servers. The FID File handler 92 provides a programming interface, so that the other components can retrieve the information they need to perform their tasks. The alignment engine(s) 90 can send face data records to the FID File handler 92 to be added to the face database 96. The FID File handler 92 is transparent to the alignment engine(s) 90 as to on which database partition the data can be stored. In this embodiment, data is added only through the alignment engine(s) 90.

The FID Files 96 (also referred to as the face database 96) are the repositories for face templates. To achieve scalability they may be distributed over multiple computers. In this embodiment, each of search engines has its own set of FID Files 96 to minimize the I/O bottleneck when searching.

The non template face data server 78 (also referred to herein as the misc. face data server 78) maintains the database of face template related data. In one embodiment, face template related data includes data other than the face template itself, such as name, address, biometric information (e.g., fingerprints), and alignment information. Each face template in the FID Files 96 has a respective entry in the misc. face database. In one embodiment, the misc. face data server 78 does not store the raw images. The alignment engine 90 generates the misc. face data. In this embodiment, the initial face data set is constructed at the time of system installation; it can be appreciated, however, that the initial face data set can be created at other times (e.g., before or after system installation). After the initial face data set is constructed, the administration workstation periodically supplies new images for which misc. face data can be added to the database. New images for which misc. face data can be added can also be supplied.

The misc. face database 80 (also referred to as the "Non Template Face Data 80") is a database of face template related data. This data includes alignment and reference information. In addition, it contains the lookup tables to describe the references between entries in the image/subject database and the FID Files 96.

Operators/investigators can control the search process through use of the investigator workstation 56. In this embodiment, the investigator workstation is a personal computer (PC), but it will be appreciated that any device capable of running a browser (e.g., PDA, web-enabled phone, pocket PC, etc.) and displaying images is usable as a workstation, such as the technologies described for the workstation 10 of FIG. 1. In this embodiment, search transactions, made up of several simple, discrete steps, repeat continuously either automatically in batch mode, or asynchronously upon operator initiation. Each transaction generates a complete result set for each new probe image to search against.

Figure 7:
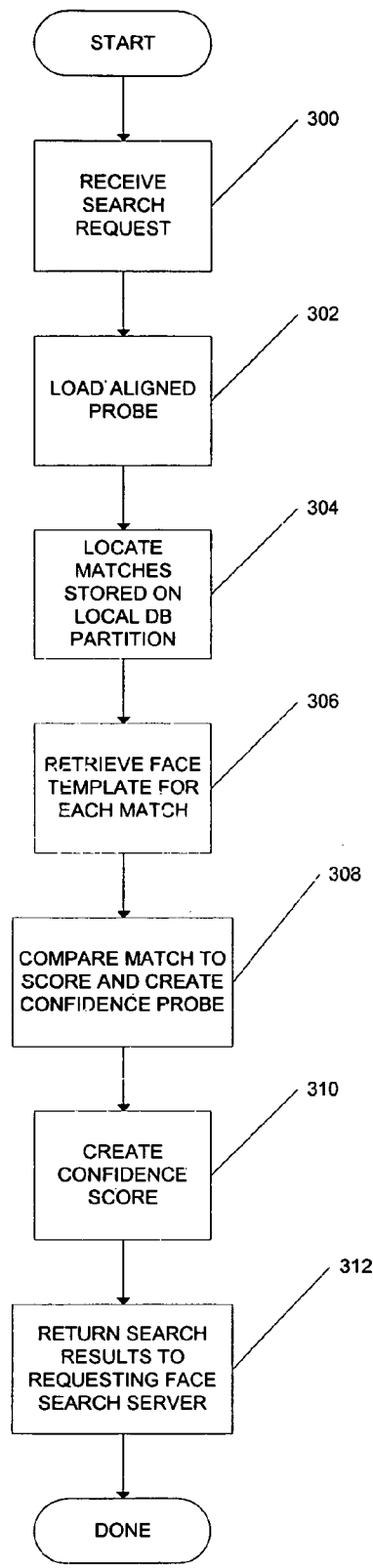
FIG. 7 is a flow chart of a method for conducting biometric searches at a biometric search engine, in accordance with one embodiment of the invention.

FIG. 7 is a flow chart of a method for conducting biometric searches at the search engine 94 of the system 70 of FIG. 4. The search engine 94 receives a search request (step 300) and the search engine loads the aligned probe image (step 302). The search engine 94 searches for matching templates that are stored on the database partition that is physically on the same machine as the search engine 94 (step 304). For each entry in the search list, the face template is retrieved from the face database (step 306), and it is matched against the probe face. A confidence score is created and stored for each of those matches (step 308). The finished array of search results is sent to the requesting face search server 86 (step 312). A match result record consists of the face template identifier, the subject identifier and the match score.

Figure 8:
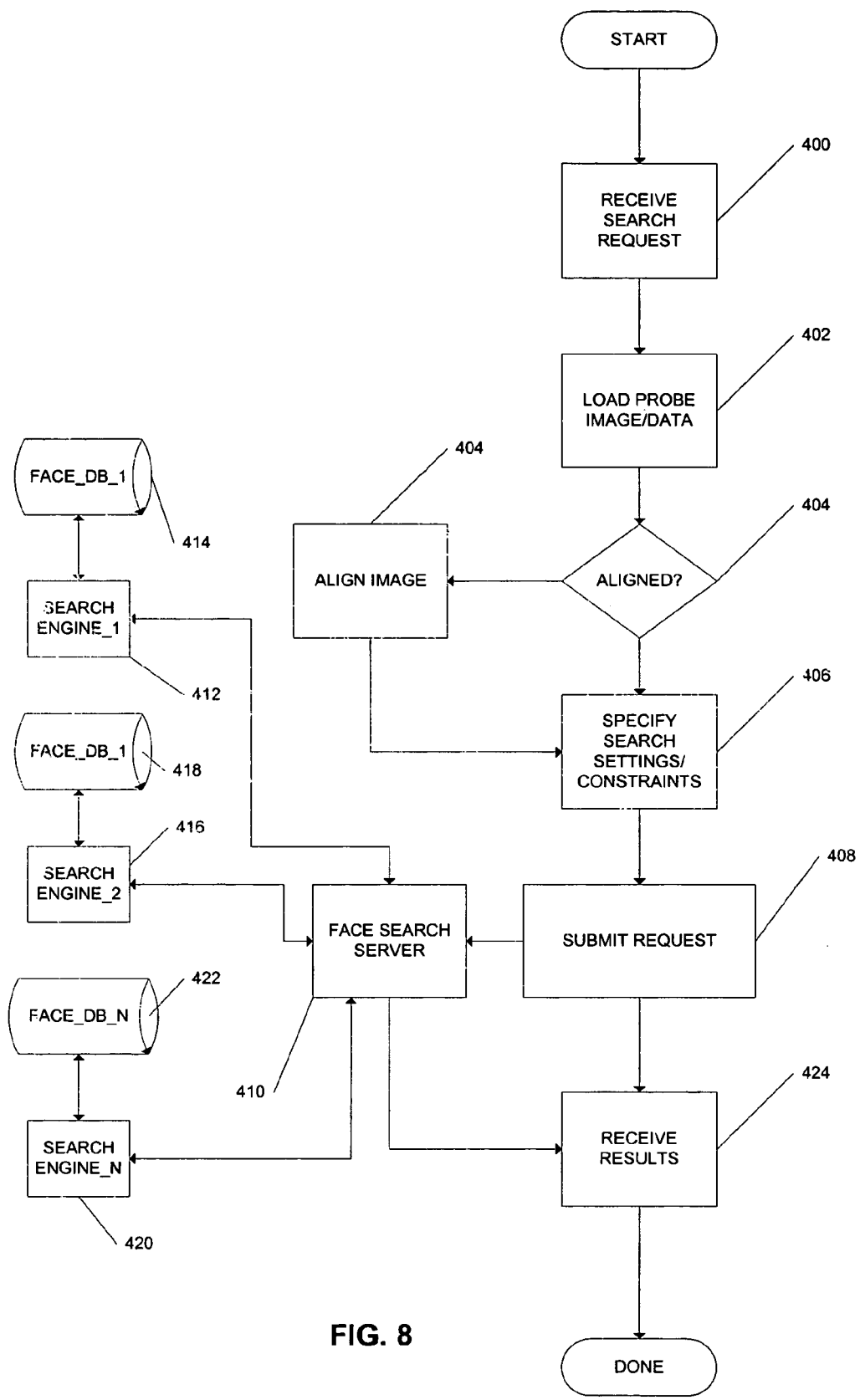
FIG. 8 is a flow chart of a method for conducting biometric searches at a user workstation, in accordance with one embodiment of the invention.

FIG. 8 is a flow chart of a method for conducting biometric searches at a user workstation, in accordance with one embodiment of the invention. The operator of the workstation 56 receives a search request (step 400). The search request can be delivered by any known means, including by paper document, by transportable media such as floppy disk, by computer network, or by other methods. The request can be a signal received by either the workstation itself or the operator. The operator can receive the request through one means (e.g., telephone call, oral request, message on a different workstation) and act on the request using the workstation.

Figure 10:
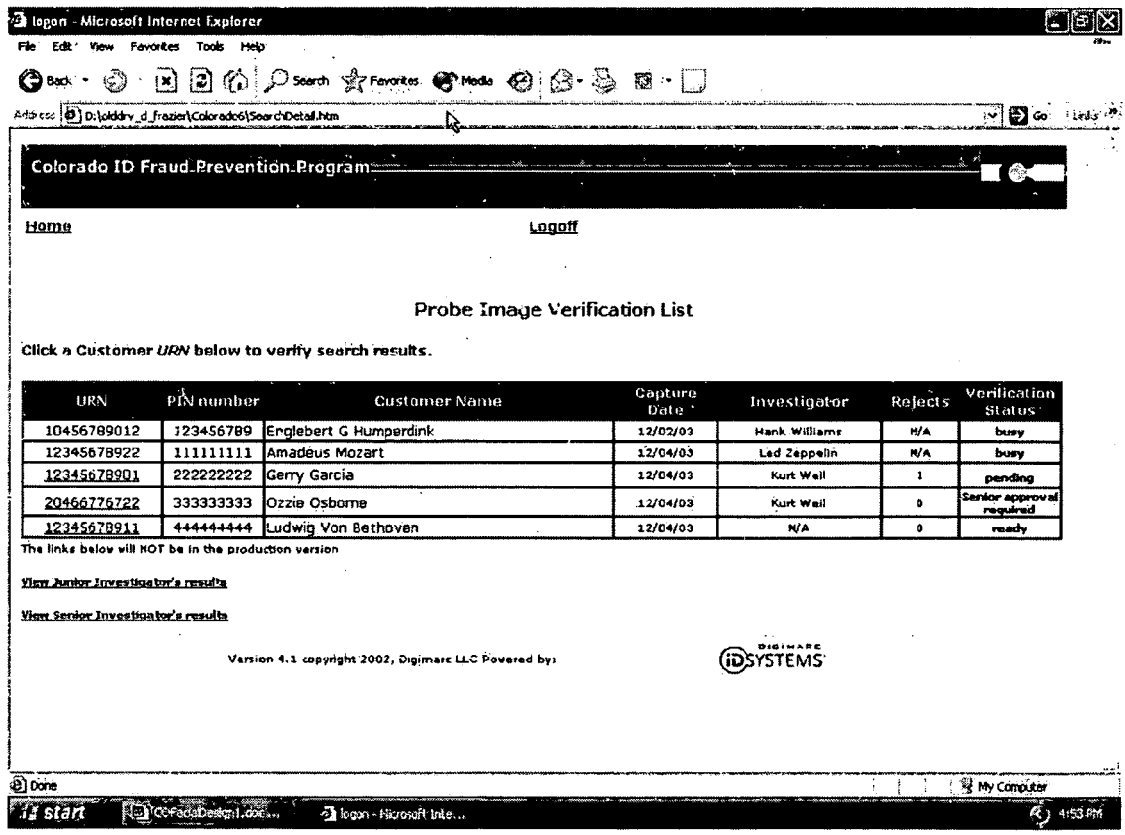
FIG. 10 is an illustrative example of a screen shot of a probe image verification list, in accordance with one embodiment of the invention.

In one embodiment, the search request comes by listing one or more candidates to be investigated on a probe image verification list. FIG. 10 is an illustrative example of a screen shot of a probe image verification list, in accordance with one embodiment of the invention. An investigator selects one or more records on the list to verify.

The request includes a probe image file, or a means to obtain it, e.g. information about the probe image file, a reference to an entry in the image/subject database, or any other information necessary to locate and/or obtain the probe image file. The probe image is a digitally stored image of a human face, against which the matching search can be conducted.

Figure 9:
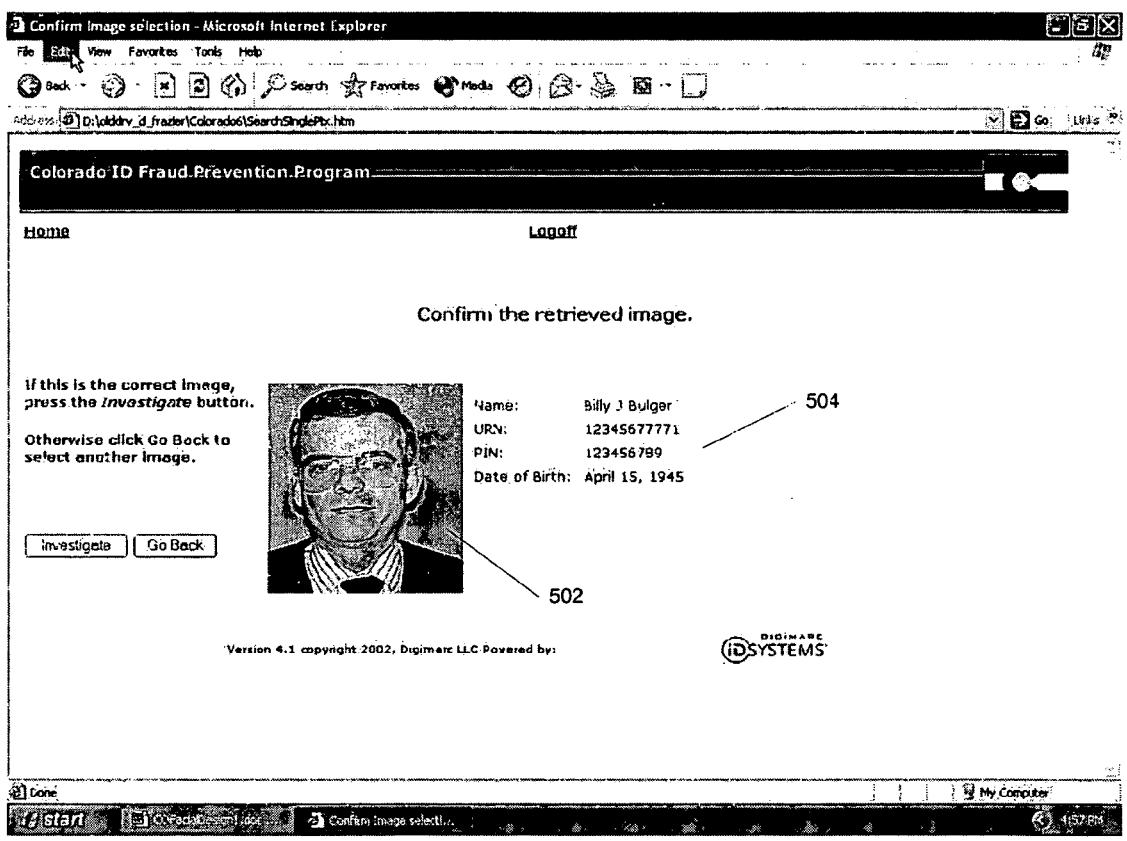
FIG. 9 is an illustrative example of a screen shot of a user interface showing an image that can be used as a probe image, in accordance with one embodiment of the invention.

The workstation 56 loads the probe image and text data associated with the request (step 402). If the face picture contained in the request is not available in a digitally stored form, in at least one embodiment, the means to create a digital image (e.g. scanner, etc.) can be used. For example, a scanner can be made available at the investigator workstation. The digital face image is loaded into the workstation software, and a Search Request Message is created. FIG. 9 is an illustrative example of a screen shot of a user interface showing an image that can be used as a probe image, in accordance with one embodiment of the invention.

Probe images that are not stored in the image database do not necessarily contain any alignment information. For not previously aligned probe images (step 404), an alignment request is made to the alignment server 88 (step 404), which returns alignment information. This request can be executed at a high priority, so that the workstation operator can verify the result. If the automatic alignment fails, the workstation 56 can also provides a tool (not shown in FIG. 8 but described elsewhere herein, such as in FIG. 6B) for the operator to manually align the probe image The workstation operator specifies the face search settings, and other constraints for the search (step 406), then submits the request (which may include other information, such as search settings) to the Face Search Server 86 via the Message Queue Server 84 (step 408). For example, the workstation operator selects the query set on which the face match can be performed. She/he also selects a minimum threshold and/or a maximum number of returned matches. Other advanced settings can be specified by the administrator on a per face database basis.

The Face Search Server 86 reads the Search Request from the message queue, distributes the request to the search engine(s) 412, and returns the match set to the workstation (steps 424).

Upon submitting the search request to the message queue server, the operator sets a priority for the request. The message queue server maintains a search request queue for the Face Search Server. This queue contains the list of search requests submitted by the workstation(s) that await service by the face search server. The workstation operator reviews the match set and conducts further processing as desired. The workstation handles in an appropriate manner any failed search requests.

The face search server 86 begins a search by reading the search request from the search queue and parsing out the probe image (see, e.g., the method of FIG. 6A). Other information, such as alignment information, also may be parsed out. The face search server 86 also parses out the alignment information, and the query set to be searched on. The following steps are performed, in accordance with one embodiment of the invention:

Handling a Face Search Request

The face search server 86 builds the list of face templates that can be searched from the selection chosen by the investigator The search template list and the probe record with the alignment information are sent/distributed to the search engine(s) 94

The face search server 86 waits for the search engine(s) 94 to return a resulting match set then builds a combined match set If the search request is hierarchical (has several stages with different recognition settings) the face search server 86 selects a subset of the match set, and re-send/distribute it to the search engine(s) 94

Finally, the combined match set is send to the requesting workstation 56.

To prevent results from being lost due to network failures, workstation crashes, etc. the message queue server 84 stores a Search Result (named, in this illustrative embodiment, "SearchResult") until it is discarded by the workstation.

Figure 11A:
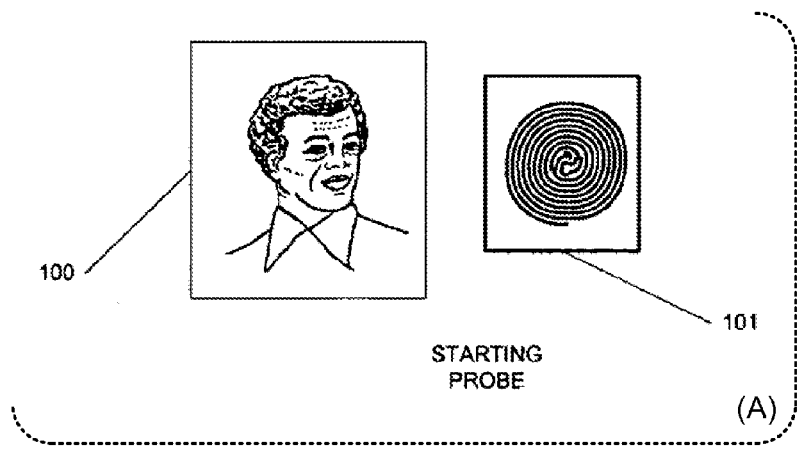
FIGS. 11A-11B are illustrative examples of probe images and returned results, respectively, for the system of any one of FIGS. 2-4.
Figure 11B:
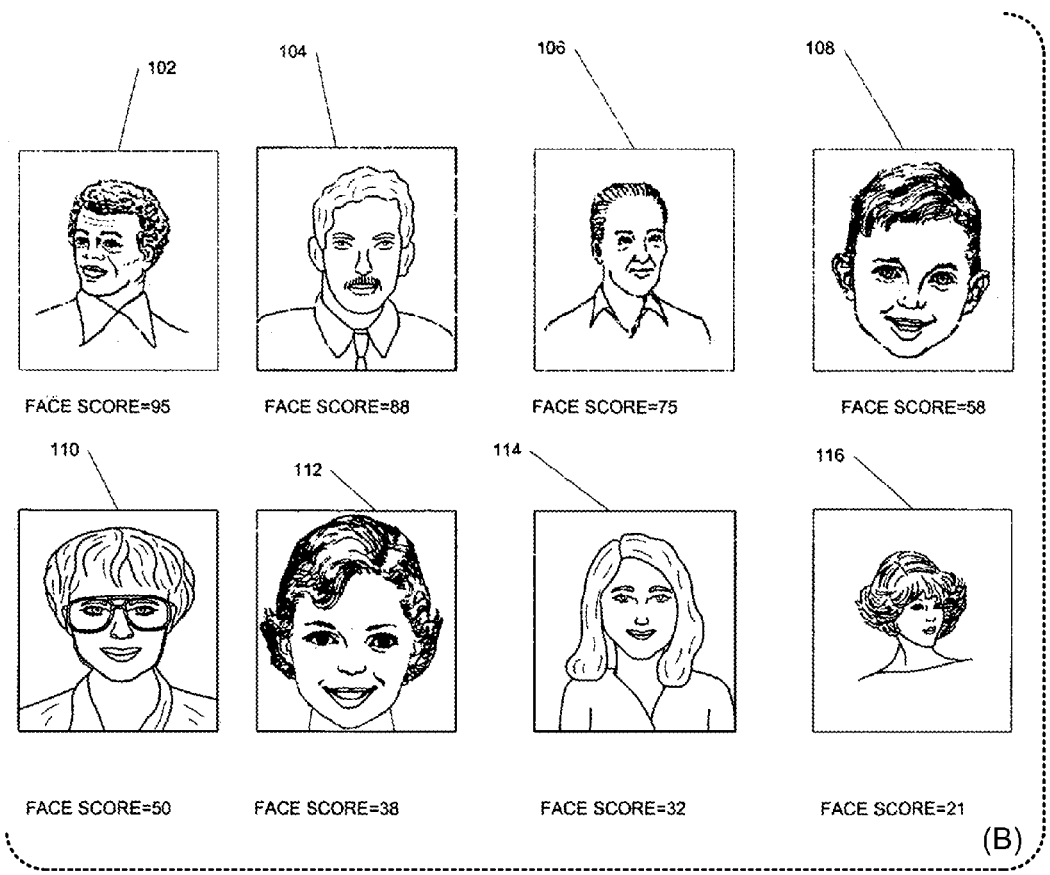
Figure 12:
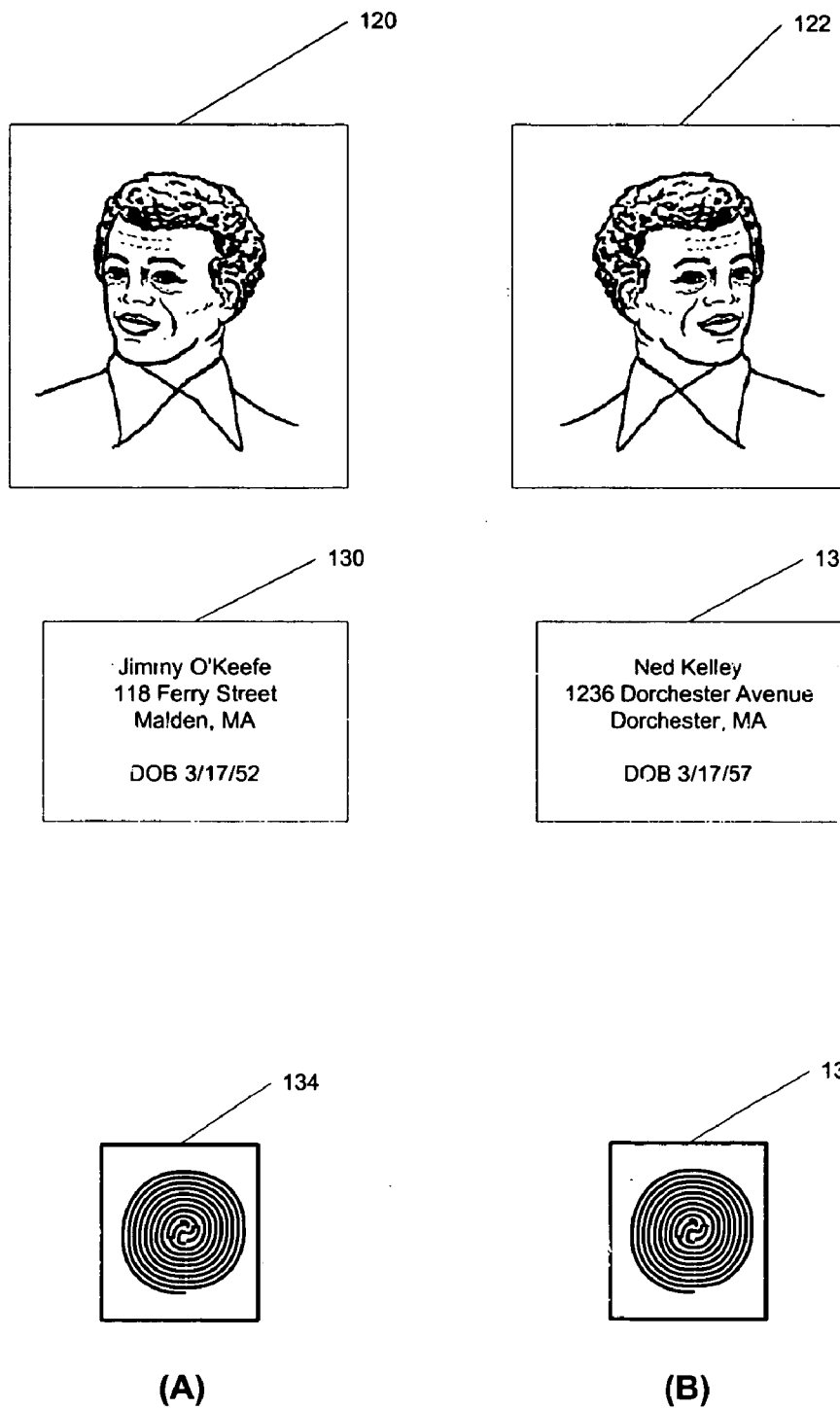
FIG. 12A-12B are illustrative examples of a side by side comparison of a probe image and a retrieved image, respectively, including demographic and biometric data, for the system of any one of FIGS. 2-4.
Figure 14:
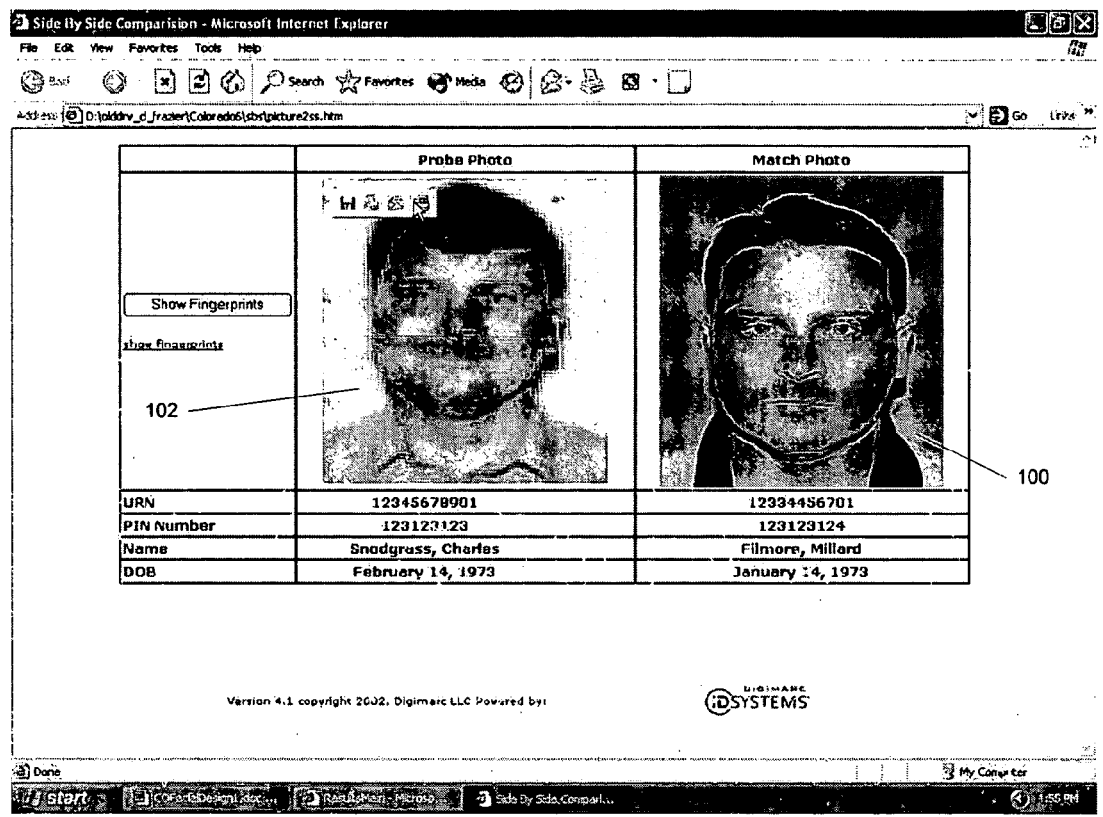
FIG. 14 is an illustrative example of a screen shot of a side by side comparison showing portraits and limited demographic information, in accordance with one embodiment of the invention.
Figure 15:
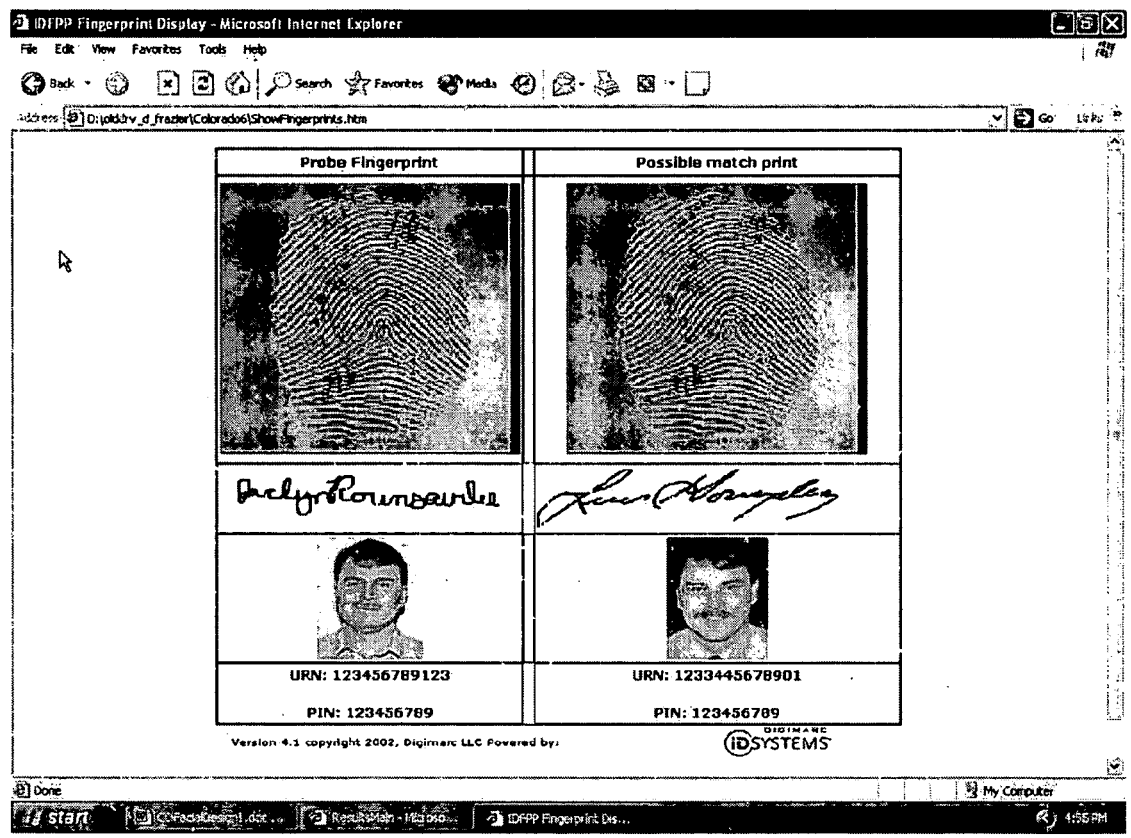
FIG. 15 is an illustrative example of a screen shot of a side by side comparison screen showing fingerprints and signatures, in accordance with one embodiment of the invention.

A match set can contain a sorted array of identifiers for the face data and the subject data. Records in the match set can have a relative match score ("face score" that indicates the determined level of similarity between the image probe and the database images. FIGS. 11A and 11B are illustrative examples of probe images 100, 101 and returned results 102 through 116, respectively, for the system of any one of FIGS. 2-4, and FIG. 13 is an illustrative example of a screen shot of a candidate list screen presented to a user, in accordance with one embodiment of the invention. As these figures illustrate, an investigator can readily compare a probe image with one or more candidate matches, both visually and based on relative match score Note that, to minimize overall use of system resources, and to separate image data from face data, the result set returned to workstations 56 by the Face Search Server 86 does not necessarily have to contain image data. Rather, in this embodiment, the match set can contain pointers, or other unique identifiers, to image data. The workstation 56 can use the pointers to retrieve the raw image data from the image database server. For example, in one embodiment, the match set does not necessarily contain face images. Rather, the match set contains identifiers for face images and subject data stored on the image/subject server. To display or otherwise process any images identified in the match set, the workstation first retrieves them from the image server After receiving the match result set from the face search server, the workstation operator may process images selected from the match set in any of the following ways:
- Display images for comparison to the probe image (see FIGS. 12 and 14)
- Print display images
- Display or print reports
- Obtain fingerprints of subjects identified by selected images (see FIGS. 12 and 15)
- Select an image from the match set and submit it as the probe image for a new search (processes for doing this are also described more fully in our "Systems and Methods for Recognition of Individuals Using Multiple Biometric Searches", Ser. No. 10/686,005, filed Oct. 14, 2003

Those skilled in the art can appreciated that other ways of processing images are, of course, possible.

After locating matches, the investigator can flag a record as void, potentially fraudulent, etc. This designation can be associated with the image until removed, and the flag (or other notes to the image) can remain visible even if the record is retrieved again in a different search.

Fourth Illustrative Embodiment

Database Partitioning

In one embodiment, we have found that some database portioning techniques can improve the speed and/or accuracy of searching. These techniques can be advantageous for applications where there are a very large number of legacy images that are never deleted or replaced (e.g., as in many DMVs). For applications such as these, the database can be broken up in active an inactive (or "almost" inactive) parts. In some embodiments, after an image is enrolled (and a template is created), all the information about the image (such as so-called Binary Large Object (BLOB) "Image BLOB") is essentially inactive. One no longer needs access to the image for searching purposes, only for displaying search results. Another way to think about activity is to say: in at least some situations, the actual images are needed only for enrollment and display and nothing else. After enrollment, images can technically be deleted from at least a portion of the database since they are not needed for searching, either (the searching is done using templates). In one embodiment, the images will only be displayed if they rank high enough on a given search. Thus, the architecture of the search engine 94, file handler 92, search server 86, and/or face database 96 can be modified to separate the basic functions that require speed (enrollment, identification and verification) and those that don't (e.g., the user interface).

We have found several ways to accomplish this portioning. In the first embodiment, the image BLOBS are kept in the face database 96, but they put are in a separate, indexed table on separate physical disk unit, in contiguous disk blocks. A foreign key in the new BLOB table ties it to the existing tables. Note that the particular server being used may dictate whether such control over space allocation is possible (e.g., SQL Server may not allow this level of control over space allocation, but Oracle does). In addition, in at least one embodiment, we distribute the blob image database on the nodes. After successful enrollment (enrollment is described further herein), images can be "archived" on a database stored on each node. One advantage is that each database can be limited (at least today) to about 1 million records. Once the database is "full" no more images will be added to it. This may make backup and recovery an easier job, although care may need to be taken because all the enrollment activity is now directed to one or two "active" nodes.

In a second embodiment, image BLOBS are removed from the database. This can be accomplished using, for example, Oracle's BFILE data type, which may give efficiencies by reducing the database size, but keeps the benefits of using a recognized SQL data type.

In a third embodiment, we leave images in the file system and store only a path to them. We have found this to be a workable approach. We have also evolved to a file structure based on the date that is very helpful when examining lots of records. It also avoids problems that develop with UNIX when the number of files in a directory grows beyond 40,000. One example of a structure that we have used is:
\volume name\YYYY\MM\DD\<filenames> or
\volume name\YYYY\DDD\<filenames>
Some advantages of this embodiment include:
It easy to convert a path from Unix to Windows format
The number of records on any given day doesn't stress the operating system
It is easy to logically group files for backup media In a fourth embodiment, we cache the face image records (FIRs). In this manner, a node could store all the FIRs allocated to it in a large file on the node itself. Loading it into memory will be far faster than reading rows from a database. This may affect the operation of dynamic partitioning, which can be rectified at least partially by adding another column to the images table to indicate that a node is full and the partition is no longer available for updates.

Fifth Illustrative Embodiment

The fifth illustrative embodiment of the invention applies some of the previously described systems, methods, user interfaces, and screen shots to provide an ID fraud prevention system optimized for use with DMVs, together with methods and processes for interacting with the ID fraud prevention system, including a user-friendly user interface, for searching a database of images for a match to a probe image. The features of this embodiment may be especially useful for large databases of images.

Overview of the Verification Process

In this embodiment, verification is the process of discovering DMV customers who have used false documents to obtain more than one license. The ID Fraud Prevention system of this embodiment assists the DMV investigator searching for multiple identities on documents issued by an issuing authority, such as a DMV. In the normal course of the issuance process, a DMV customer presents documentation to establish his or her identity. In most cases, the DMV has no certain way to determine if the customer's identity is false.

Finding Fraudulent Customer Records

The Fraud Prevention Program is used to quickly and automatically find those customers who already have one or more "valid" driver's licenses. Images uploaded daily from branch offices are sent to the DMVs Fraud Prevention system. The customer's portrait is enrolled (encoded for searching) and permanently stored in the special database used for performing searches and comparisons.

After all images are enrolled, licenses tagged by the DMV as "new issuances" are automatically compared to the entire library of photos on file to see if a match or a close match exists. In one embodiment, the library of photos on file can be over 10 million images. The library of photos advantageously is kept current every day except for a very small percentage of images that fail for one reason or another.

After the database is searched for matching images, one of two results may occur.

1. No match may be found: If no image in the Fraud Prevention database resembles the new photo, it is checked off in the Central Image Database as "passed by the system". This means that the likelihood of match to any one picture is so low that it is not worth reporting it, or having n investigator look at it. This is the result one would normally expect when a customer who is new to the DMV is getting a license for the first time 2. Possible matches are found: This outcome requires an investigator to look at the customer's photo and the possible matches found in the IDFPP database. It is up to the investigator to determine if photos are in fact a match and if so, what to do with the information. It is important to remember that the Fraud Prevention software is providing the user with its best assessment and not positive proof.

Terminology

The following words have a special meaning in the context of fraud prevention in this embodiment of the invention:

| | |
|---|---|
| Browser | Microsoft Internet Explorer version 6.0 or higher |
| Candidate | A customer record returned by the IDFPP search process. A candidate is rated with a confidence level |
| Candidate List | A list of candidate images found by the IDFPP software to be similar to the probe image. All the candidates are organized so they can be viewed together with the probe image. |
| Confidence Level | This is number from 0 to 100 assigned to each image in the candidate list. A value of 100 means that the candidate should match the probe image. A value of zero mean it totally unlike the probe image. |
| Duplicate | A candidate image that is obviously the same as the probe image is loosely referred to as a duplicate. A duplicate image may be in the database as a result of operator error, computer error or fraud. |
| Fraud | This term applies to duplicate records (licenses) present in the DMV database that are the result of a deliberate attempt to conceal or alter the customer's identity. A duplicate is determined after all other possible sources have been eliminated such as operator or computer error. Fraud is not determined by the IDFPP system. A DMV investigator needs to make this determination, and in most cases will need supporting information from other sources. |
| Identical | Images are said to be identical if an image was inserted into the Central Image Server twice. This is usually the result of operator or computer error. If found by the IDFPP software, an image identical to the probe will be assigned a confidence level of 99 or 100. This is not a case of fraud. |
| List Size | This term refers to the size of the candidate list which appears on the verification screen. Typically, the list size is set to 15 or 25 images. |
| Match | This term is used loosely to mean a duplicate record was found. |
| Probe | This is the image used when searching for possible matches. Typically, it is the picture of a DMV customer who is getting a license for the very first time. |
| Progressive Search | If an investigator finds one or more interesting candidate images, he may use the candidate URNs to initiate a single search. A search with a candidate image may yield more matches to the original probe image. |
| Single search | A single search selects an image from the Central Image Server and uses it as probe to search IDFPP for possible matches. |
| Threshold | As each candidate record is obtained from the IDFPP search database, the confidence level is compared to a system-wide value. If the candidate is above the threshold, it remains on the candidate list. If it is below the threshold, it is not added to the list. |
| Timeout | When an investigator stops moving the mouse or clicking on buttons, a count down timer started. The timer is initialized to the timeout value. When it gets to zero, the user is logged off. The timeout value is typically set to 5 minutes, but the system administrator may change this value. |
| Verification | This is the process of examining probe and candidate images to verify the absence of fraud. Probe images are verified automatically by the system if all the candidate images are below the confidence level threshold. Probe images that have candidate records above the threshold can be verified by an investigator. |

Batch Processing of Enrolled Images

In this embodiment, newly captured images from (from one or more image capture locations, such as branch DMV offices) are periodically uploaded to the Central Image Server (CIS). For example, in a DMV application, newly capture images are uploaded to a DMV CIS after the close of business each day.

Also, the library of enrolled images is searched with images tagged as new issuances. The results of this search are available in the morning for an investigator to review. In at least one embodiment, the search begins only after the batch of newly captured images is enrolled. This procedure increases the chance that a DMV customer will be caught if he is shopping for multiple licenses on a single day. Verification lists can be generated that one or more images were found in the fraud detection system that were similar to the probe images. If no matches were found, a verification list is not generated.

System Requirements:

The IDFPP (ID Fraud Prevention Program) database and verification software of this embodiment can be accessed with any browser capable of browsing the Internet. In one embodiment, the IDFPP is accessible using Microsoft's Internet Explorer 6.0 (or later). The browser can, for example, be resident on a personal computer running the WINDOWS operating system and this version of Internet Explorer.

However, those skilled in the art will appreciate that virtually any-other web-enabled devices (e.g., personal digital assistants (PDA's), laptops, mobile phones, tablet computers, etc.) capable of communicating with a display screen (whether built in or not) and/or an input device, are capable of being used in accordance with the invention. Thus, for example, remote users (e.g., law enforcement personnel) may be able to remotely access the network of the invention and determine "on the fly" whether a given identification document, such as a license, may have been fraudulently obtained. For example, the remote user could use a portable scanning device capable of capturing a digitized image to scan a drivers license image, then conduct a search of the IDFPP system to further investigate possible fraud relating to the image and/or the holder of the drivers license.

The device running the browser should be capable of connecting to or communicating with the DMV network (depending, of course, on the network setup). To logon to the DMV network and/or IDFPP system, a given user may need certain access privileges. If required, an IDFPP database administrator can set up a user's username and password to use with IDFPP. Note that the username and password need not be the same as those used for DMV network access. In one embodiment, the administrator of the IDFPP database system can setup the IDFPP database permissions which with varying access levels, such as "Junior" or "Senior" permissions.

Once these items are set up, a user is ready to logon and start verifying images. This process begins, in one embodiment, by entering a predetermined URL in the browser's address field. The URL brings the user to the IDFPP logon screen.

Figure 13:
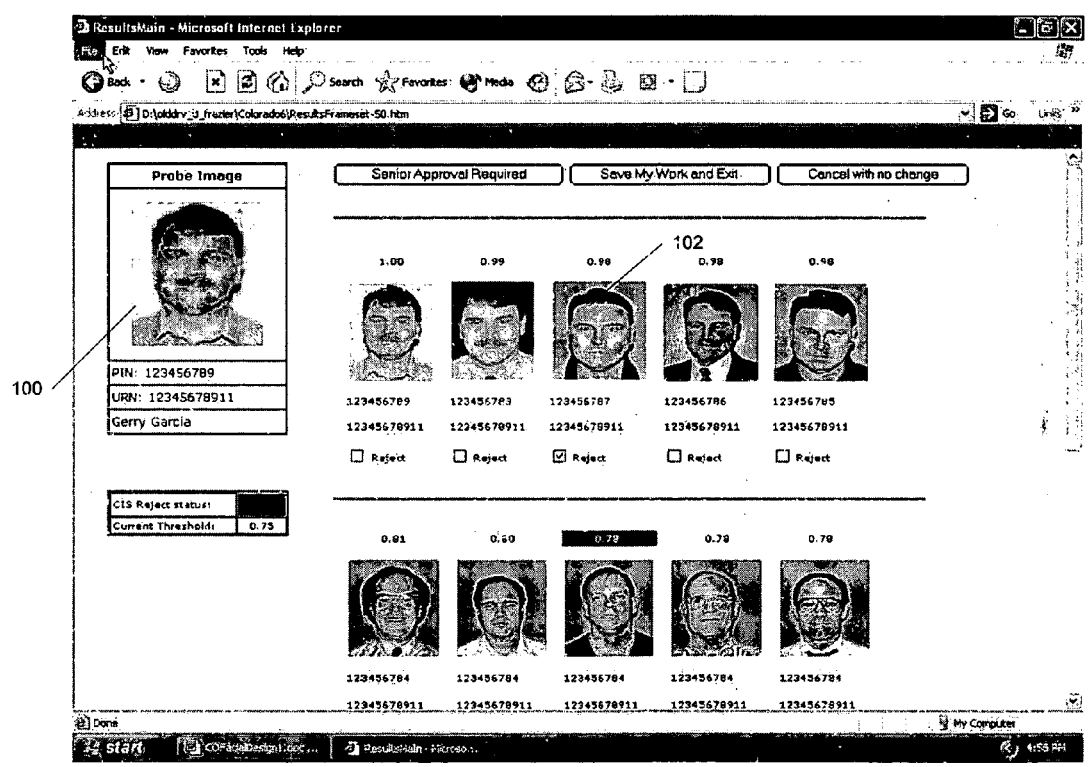
FIG. 13 is an illustrative example of a screen shot of a candidate list screen presented to a user, in accordance with one embodiment of the invention.

After logging on, a user can spend a significant portion of time viewing either the verification list (e.g., FIG. 10) or the gallery of candidates presented on the verification screen (e.g., FIGS. 11 and 13). Advantageously, the user interface of this embodiment is designed so that progress through the screens moves in a "straight line" with very little branching to keep things simple. In this embodiment, because it is important to finish work on each screen, even if a user cancels, the screens do not include a browser "Back" button. In cases where it is necessary to make this choice, an explicit back button is provided. If a user finds a candidate image of interest and wants to perform a new search using the candidate as a probe (e.g., the progressive searching described previously), the user can use a so-called "cut and paste" feature (e.g., such as the cut and paste features available in WINDOWS and the MAC OS) to copy the URN associated with the image into a single search input field.

Sixth Illustrative Embodiment

In our sixth illustrative embodiment of the invention, we have found that we can improve the accuracy and/or usability of facial recognition search engines, such as those used in the embodiment described herein, by improving the accuracy of the eye locating (alignment step), to improve the accuracy of the template based on the eye locations.

Many known face recognition systems, for example, occasionally fail to correctly find the subject's eye location. In addition, inexactness can result because algorithms create a "probe" template from a digitized portrait and then search the entire database of templates for "near matches" instead of exact matches. This process results in a list of candidate matches which are ranked in order of likelihood. For certain images the face recognition software recognizes that is has not properly located the eyes and does not generate a face recognition template (e.g., the alignment failures described previously herein). For other particular images, incorrect eye location is not detected and an invalid template is produced. It would be desirable to detect and possibly correct invalid templates as images provided either by a capture station or a legacy database are enrolled into a template database.

We have found that commercially available facial recognition software does not meet the requirements of some types of customers, such as DMV customers. Vendors have created software that is directed at surveillance applications, but from a DMV perspective this software can have serious limitations. For example, vendor software that we have evaluated has some or all of these features:

Optimized for databases of less than 1 million records or less

Designed to have a human evaluate each image capture d and assist the program when it is enrolling the image in a search database Designed to take advantage of multiple image capture s of the same individual Designed to compare new images to a short "watch list" and present an operator with immediate feedback.

All of these features, except possibly the "watch list", can be a limitation in DMV applications for at least the following reasons:

DMV image databases range in size from a few million to 80 million records and grow every day since DMVs typically do not delete any customer images, even those of deceased license holders Duplicate images are created at the license renewal cycle and it is rare to see more than 2 images of the same person in today's databases Enrollment of existing "legacy" database preferably occurs automatically and cannot require operator intervention.

At least some conventional face recognition algorithms include an initial processing step to locate the eyes of a subject in an image of the subject's face. After the eyes are located a template engine provides a template by processing the face image. For example, at least some facial recognition software available from vendors perform portrait enrollment in roughly two steps:

First, after some conventional image enhancement, a Cartesian coordinate system is established on the portrait by locating the centers of each eye. The line formed by the centers is one axis and the midpoint between the eyes is locates the second, perpendicular axis.

After the coordinate system is established, the manufacturers' proprietary algorithms extract other facial features that are useful when matching one face with another. The features are encoded into a short binary template and added to a database of templates. In practice, the template database is keyed to information, such as a name and address so it is possible to identify an individual if the portrait matches one in the database.

Each step in the above process entails levels of imprecision. We have noted that step 2—the matching of templates depends heavily on the "quality" of the template created during step 1. If the digitized portrait used to create the template is subjectively a high quality portrait and the probe image used later in a search is also high quality, then the first image is nearly always found. The manufacturers give some guidance on this point and at least some recommend that:

The optical axis of the camera lens should be perpendicular to the plane of the face to within 15 degrees;

The portrait should be taken at a scale so that at least 100 pixels are between the centers of the eyes;

The subject should have his eyes open and should not be looking up or down;

The "probe" images used in a search should be taken under the same lighting conditions (color temperature, contrast, substantially without shadows) as the those in the template database.

If these conditions are not met, the algorithms are likely to fail at step 1 and not create a template. For example, in most cases, no template is created if the subject's eyes are closed. This is reported by the vendor's software in about 1% of the images we tested.

However, when a "good" portrait is captured, the algorithms still may fail to locate the position of the eyes correctly. Our studies have shown that the algorithms fail this way in about 7% to 20% of the images. When this type of failure occurs, the vendor's algorithms create a template but do not report an error. Incorrect templates are created which will almost never match another photo of the same individual. Failure to find eyes properly can result from many different factors, including whether or not an individual is wearing glasses or jewelry, hair style, whether subject is wearing a hat, how shiny the subject's skin is, etc.

This unreported failure (creation of an incorrect template) effectively "deletes" the image from the template database by making it a non-participant. For databases containing more than 10,000 images, it is impractical to correct these failures by viewing every image in the database and manually correcting the eye coordinates. This is an unacceptably high error rate for many of such customers.

In a first example of one of our tests, we obtained a sample of 300 images from a state's DMV database and enrolled them with software from two different facial recognition vendors (Imagis and Identix). The eye coordinates produced by each algorithm were verified manually and incorrect locations were noted. We ran searches on a small number of portraits that were incorrectly enrolled and verified that we could not match other images of the same individual (a second, slightly different portrait). After manually correcting the coordinates, we ran searches again and verified that matching software succeeded. Based on this testing, we discovered that different subsets of portraits were contained in the set of resulting "failures" and that by combining this information we can reduce the total number of failures (that is, increase the accuracy).

In this embodiment, we provide methods for potentially detecting and/or correcting incorrect eye location. In one aspect of this embodiment, we correct eye location by means of additional eye location algorithms when used in conjunction with legacy database images and a combination of additional eye location algorithms, manual eye location under operator control, or image recapture when the face images are generated by an identification capture station. Advantageously, at least some embodiments of this aspect of the invention may provide increased face recognition accuracy by building a more accurate template database from legacy images and captured images, which will provide more accurate templates.

Figure 16:
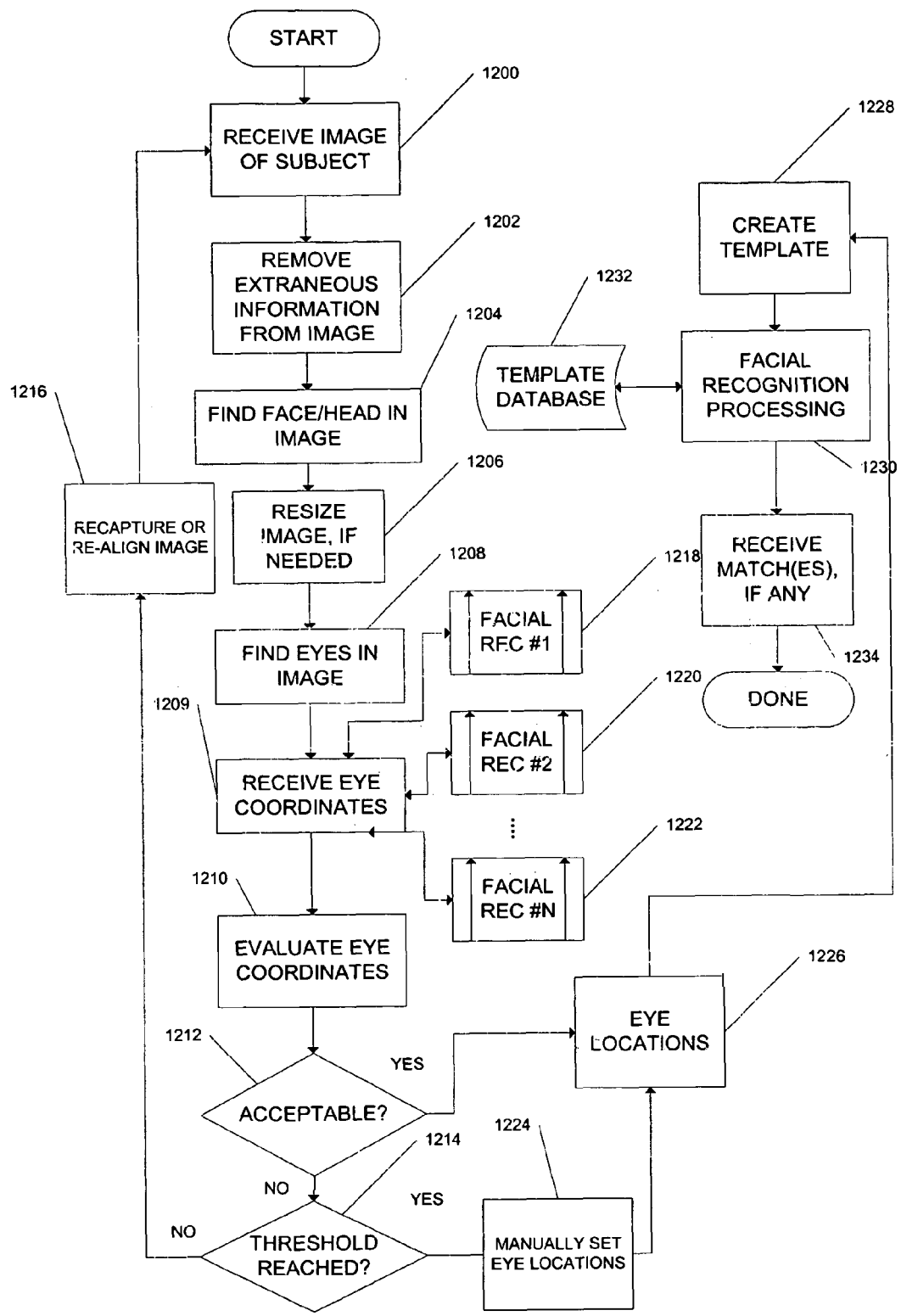
FIG. 16 is a flow chart of a process a biometric search that includes evaluation of eye locations, in accordance with one embodiment of the invention.

FIG. 16 is a flow chart of a method for improving the accuracy of facial recognition searching, in accordance with one embodiment of the invention. An image of the subject is received (step 1200). The image can be captured at a capture station or, in at least one embodiment, can be an already-enrolled legacy image. If required for eye finding by a particular algorithm, pre-processing steps can occur to prepare the image for finding eyes, such as removing extraneous information (e.g., background) from the image (step 1202), finding a head, face, and/or skin in the image (step 1204), and resizing, centering, and/or the image if needed (step 1206). Then, the eyes of the subject are found in the image (step 1208).

This step can use multiple eye location modules/engines in parallel (e.g., facial recognition engines 1 through N, which each may have an eye finding functionality) (steps 1218, 1220, 1222) to process the image, return eye coordinates (step 1209). Generally, each eye locating module returns (X,Y) eye location coordinates. Optionally, the eye locating module can also return an indication of success or failure of the eye location process. In at least some embodiments of the invention, the step of finding eyes in the image (step 1208) can be accomplished using on or more of the following:

Process the image with primary face recognition module which returns a failure indicator and eye location coordinates Process image with a "blob" feature detector module configured to find eyes in a scaled centered image Process image with a secondary face recognition module to obtain eye location coordinates Process image with a third party proprietary face recognition algorithm which locates a eyes in an identification image The evaluation of the eye coordinates (step 1210) can be automated, manual, or a combination of automation and manual. Automated evaluation can involve one or more rules (described further below) which are applied to the coordinates. Evaluation (automated or manual) also can include one or more of the following types of analysis of the returned eye coordinates.

Consistency checks: determine that both eyes are not in the same place, determine that horizontal and/or vertical eye locations are realistic.

Statistical comparisons: compare eye location coordinates provided by each eye finding module, check tolerances between modules, compute average coordinate values, variance etc., which can help to eliminate anomalous coordinates, smooth errors, etc.

General analysis: Check for other predetermined potential template problems based on eye location coordinates Evaluation provides a success or fail indication as well as eye location coordinates to be used by the template engine. If it is determined that there is a problem with the primary face recognition module's eye location coordinates and the problem can be corrected, updated eye location coordinates (based on the correction) are provided from one of the other modules.

Evaluation also can involve application of a predetermined rule to evaluate and determine the "final" eye coordinates (step 1210). We have found that various rules can be used on one or more of the returned sets of coordinates, assuming that at least some of them are "acceptable" (step 1214). A determination of whether results are "acceptable" can involve many different factors. For example, if a one or more of the eye locating modules did not find eye coordinates at all, and it is still possible to get a new image of the subject, the image of the subject may be automatically or manually recaptured (step 1216) and the image is re-evaluated to locate new eye coordinates. If the eye coordinates returned by the eye locating modules are so different that no pair of coordinates for an eye is within some predetermined distance (e.g., 1 inch) at least one other set of coordinates, the results may be deemed to be unacceptable. In another example, if an eye locating module returns one eye coordinate that appears to be in a significantly different vertical position on the face than the other (e.g., left eye being 4 inches higher than right eye), results may be deemed to be unacceptable. Similarly, it may be deemed unacceptable if the left and right eye are in the same spot, or are more than several inches apart. Those skilled in the art will, of course, appreciate that many other patterns of returned results can be deemed to be not "acceptable".

For example, in one embodiment we provide a "majority rules" type of implementation, where the coordinates are selected that are closest to (or an average of) those selected by a majority of the eye locating modules. For example, assume that for a subject image, 5 different eye locating modules returned the following X and Y coordinates for a right eye (only one eye is used here, for simplicity, but it will be appreciated that the returned coordinates for the left eye can be similarly evaluated, and, indeed, coordinates for both eyes can be evaluated at the same time). Table 1 shows the results:

TABLE 1

| Eye_Locating_Module | X Coordinate | Y Coordinate |
|---|---|---|
| Vendor A | 55 | 110 |
| Vendor B | 35 | 90 |

TABLE 1-continued

| Eye_Locating_Module | X Coordinate | Y Coordinate |
|---|---|---|
| Vendor C | 52 | 100 |
| Vendor D | 58 | 115 |
| Vendor # | 21 | 21 |

As table 1 shows, the results from Vendors A, C, and D are closest to each other and in the "majority". In one embodiment, the eye coordinates can be assumed to be the average of these majority results, which would result in an assumption that the X coordinate has a value of 55 and the Y coordinate has a value of 108. These "averaged" locations can be used as the eye location.

The above is just one illustrative example of a rule that can be used to select the "best" eye coordinates from the returned eye coordinates. Other rules that we have tested and which may be usable include any one or more of the following:

Determining a broad area of interest for the location of both eyes and rejecting points outside of the area.

Applying a weighted voting mechanism to the results from each of the results generated by the different eye locating modules (blob detection), and picking the one with the highest weighted number of "votes". Historical accuracy data can be used to assist in computing weights (for example a given eye locating module may be especially accurate for individuals with darker skin but less accurate for individuals with lighter skin and that information can be noted by the operator prior to finding the eyes, so that results from that eye finding module are weighted more heavily than those from other modules).

Replacing the eye coordinate with the center of gravity of all the candidate locations Excluding points that are too far away from the frame midline after the captured image is scaled and framed.

Excluding point outside of boundaries for each possible eye location

Rejecting points if the location is not contained in a blob with the correct "eye" characteristics.

Rejecting pairs of points if the slope of the connecting line is too high (or too low) (e.g., the results show one eye has a markedly different vertical location than the other)

Referring again to FIG. 16, if the automatic eye location (using the eye locating modules) fails after processing a predetermined number of images (step 1214), then the capture station operator is prompted (if the image is being enrolled) to manually set eye locations (step 1224 and 1226). The remaining steps (creation of template, etc.) are similar to those described in connection with other figures herein, and are not repeated here.

Testing

We used a set of 300 DMV images (the same DMV images which we used in the "first example" described above) as input to an industrial vision system manufactured by Acuity Corp. This algorithm uses a technique know as "blob detection" that decomposes an image into areas that meet certain programmed conditions. Geometric features of interest for each blob are then measured and stored in a database. The features we used to sort the blobs were:

eccentricity—measuring roundness
total area (in pixels)
length and orientation of the major axis
length and orientation of the minor axis
(X, Y) coordinates of the centroid We removed all the blobs that had a Y coordinate that could not be paired with another blob (to within a narrow tolerance band). We also removed blobs that were outside an area of interest (a band of pixels just below the top of the head).

Blobs that had at least one companion at about the same height were checked to see if the X coordinates spanned the midline of the picture frame. All blobs that did not have a companion in the other half of the frame were eliminated.

Finally the remaining blobs were checked according to size and eccentricity. Those that were roughly the same size and similar orientation, were paired.

Examining the results manually, we found that this approach could be used to provide a set of candidate eye coordinates in most cases.

Modifications to the Method of FIG. 16.

Additional steps can be added to the method of FIG. 16, if desired. For example, in one embodiment, if there are known duplicates of a subject (e.g., previous image capture s known to be of the same individual) already in the database, the newly generated template can be compared to the previous ones to determine if they match. If they do not, the operator can be given feedback to adjust the eye coordinates of the newly captured image.

In one embodiment, even if the coordinates returned by the eye locating modules are deemed acceptable, the operator can override them and manually enter the eye coordinates. The operator also can manually override the threshold of step 1214 to retake further images of the subject (which can be advantageous if the subject accidentally moves or blinks during image capture).

The method of FIG. 16 can be adapted to enroll images from a legacy database of images (e.g., where there is not the ability to re-capture images of the subject as needed). In one embodiment, multiple images can be processed if the legacy database includes multiple images for each person in the database. Manual eye location for legacy images is, of course, possible; however the number of images which require may manual correction can make this process impracticable.

In at least one embodiment of legacy enrollment, if it is determined by the evaluator that the eye location is unacceptable and manual correction is not enabled, then no template is generated, and an indication of eye location failure is placed in the database.

Additional Features of these and Other Embodiments of the Invention

The embodiments of the invention disclosed herein, including the records of the investigations and searches, can be used in many ways, especially in ways that benefit law enforcement and/or other government entities. For example, data associated with multiple attempts at fraud by a given individual can be sorted by the geographic location (e.g., DMV location) at which the individual sought the identification document (e.g., the location where an individual presented fraudulent credentials and/or had his/her image capture d). The list of locations may help law enforcement officials to determine patterns of attempted fraud, DMV locations where the most (and least) fraud occur, and possible geographic regions where an individual suspected of fraud may reside.

In addition, the lists of fraudulent images may be useful as "watch lists" to be provided to other governmental and/or law enforcement agencies. Such "watch lists" could be compared to other lists, such as FBI "most wanted" lists, international terrorist watch lists, Immigration and Naturalization Service (INS) watch lists, etc., to attempt to track down the locations of individuals of interest. The batch processing features of at least some embodiments of the invention can also be utilized to assist other agencies and can be adapted to work with databases used by other systems. For example, in addition to comparing a given captured image to the database of images stored by the issuing agency (e.g., DMV), the given capture image also could be compared with one or more watch lists of images that are maintained by other agencies. The same features of the invention (detailed previously in the first, second, and third embodiments) can be used to search these other databases. Indeed, it should be appreciated and understood that the invention is applicable not just to issuers of identification documents (such as DMVs), but to virtually any agency or organization where it is important to locate any and all individuals who may match a given image.

Furthermore, although the invention has heretofore been described using captured images, the invention can readily be implemented using so-called "live" images (e.g., live feeds from surveillance cameras).

In addition, although the systems and methods described herein have been described in connection with facial recognition techniques and fraud prevention, the embodiments of the invention have application with virtually any other biometric technologies that lends itself to automated searching (e.g., retinal scanning, fingerprint recognition, hand geometry, signature analysis, voiceprint analysis, and the like), including applications other than fraud prevention. For example, the systems and user interfaces of the present invention could be used with a fingerprint recognition system and associated search engine, where an investigator is searching a fingerprint database for a match to a latent fingerprint image retrieved from a crime scene.

Embodiments of the invention may be particularly usable in reducing fraud in systems used for creating and manufacturing identification cards, such as driver's licenses manufacturing systems. Such systems are described, for example, in U.S. Pat. Nos. 4,995,081, 4,879,747, 5,380,695, 5,579,694, 4,330,350, 4,773,677, 5,923,380, 4,992,353, 480,551, 4,701, 040, 4,572,634, 4,516,845, 4,428,997, 5,075,769, 5,157,424, and 4,653,775. The contents of these patents are hereby incorporated by reference.

Such card systems may include a variety of built in security features, as well, to help reduce identity fraud. In an illustrative embodiment of the invention, the biometric authentication process described above can be used during the production of a photo-identification document that includes a digital watermark. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's co-pending U.S. patent application Ser. No. 09/503,881 and U.S. patent application Ser. No. 6,122,403. Techniques for embedding digital watermarks in identification documents are even further detailed, e.g., in Digimarc's co-pending U.S. patent application Ser. No. 10/094,593, filed Mar. 6, 2002, and Ser. No. 10/170,223, filed Jun. 10, 2002, co-pending U.S. Provisional Patent Application No. 60/358,321, filed Feb. 19, 2002, and U.S. Pat. No. 5,841,886.

CONCLUDING REMARKS

In describing the embodiments of the invention illustrated in the figures, specific terminology (e.g., language, phrases, product brands names, etc.) is used for the sake of clarity. These names are provided by way of example only and are not limiting. The invention is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, modules, tables, software modules, objects, data structures, servers, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention. In the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art can recognize that the number of a particular system element or method steps can, in some instances, be selected to accommodate the particular user needs.

It also should be noted that the previous illustrations of screen shots, together with the accompanying descriptions, are provided by way of example only and are not limiting. Those skilled in the art can recognize that many different designs of interfaces, screen shots, navigation patterns, and the like, are within the spirit and scope of the invention.

Having described and illustrated the principles of the technology with reference to specific implementations, it will be recognized that the technology can be implemented in many other, different, forms, and in many different environments. The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that the methods described above as well as the methods for implementing and embedding digital watermarks, can be carried out on a general-purpose computer. These methods can, of course, be implemented using software, hardware, or a combination of hardware and software. Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, manually adjusting a shadow, etc. Computer executable software embodying the steps, or a subset of the steps, can be stored on a computer readable media, such as a diskette, removable media, DVD, CD, hard drive, electronic memory circuit, etc.).

Moreover, those of ordinary skill in the art will appreciate that the embodiments of the invention described herein can be modified to accommodate and/or comply with changes and improvements in the applicable technology and standards referred to herein. Variations, modifications, and other implementations of what is described herein can occur to those of ordinary skill in the art without departing from the spirit and the scope of the invention as claimed.

The particular combinations of elements and features in the above-detailed embodiments are exemplary only; the interchanging and substitution of these teachings with other teachings in this and the referenced patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

Having described the preferred embodiments of the invention, it will now become apparent to one of ordinary skill in the art that other embodiments incorporating their concepts may be used. These embodiments should not be limited to the disclosed embodiments, but rather should be limited only by the spirit and scope of the appended claims.

The invention claimed is:

1. A computer-implemented system for issuing identification documents to one of a plurality of individuals, comprising:
   a workstation, the workstation having a processor, a memory, an input device and a display;
   a first database, the first database operatively connected to the workstation and storing a plurality of digitized images, each digitized image comprising a biometric image of an individual seeking an identification document
   a server in operable communication with the workstation and with the first database, the server programmed to:
      send, at a predetermined time, one or more digitized images of the individual from the first database to a biometric recognition system, the biometric recognition system in operable communication with a second database, the second database including biometric templates associated with a plurality of individuals whose images have been previously captured;
   the biometric recognition system comparing, the digitized image of the individual to the plurality of individuals whose images have been previously captured;
   the server being further programmed to:
      (a) receive from the biometric recognition system, for each digitized image of the individual sent, an indicator, based on the biometric searching of the second database, as to whether the second database contains any images of individuals who may at least partially match the digitized image of the individual that was sent; and
      (b) receive from the biometric recognition system a list of images of the individuals who may at least partially match the digitized image of the individual that was sent together with a score of each individual, the score indicating a score above a predetermined threshold relating to the degree of matching to the individual searching an identification document;
   the workstation being configured to permit a user to review the indicator and the scores of individuals from the biometric recognition system and to make a determination as to whether the individual is authorized to be issued an identification document or to keep an identification document already in the individual's possession.

2. The system of claim 1 wherein the digitized image is at least one of a facial, fingerprint, thumbprint, and iris image.

3. The system of claim 1 wherein the identification document is a driver's license.

4. The system of claim 1, wherein the biometric recognition system is programmed to create a biometric template based on the digitized image received from the first server and to use that biometric template to search the second database.

5. The system of claim 1, wherein the server is programmed to create a biometric template and provide that template to the biometric recognition system.

6. The system of claim 1, wherein the indicator comprises a list of further data associated with the individual whose image at least partially matches the digitized image that was sent.

7. The system of claim 6 further comprising a third database in operable communication with the workstation, the third database storing at least one of images and non-image data associated with each biometric template in the second database, wherein the workstation is configured to be able to retrieve information from the third database upon request and display it to a user.

8. The system of claim 7, wherein the indicator is displayed on a user interface of the display, the user interface retrieving from the third database the images of at least a portion of the images of individuals that the biometric recognition system has determined may at least partially resemble the digitized image that was sent.

9. The system of claim 8, wherein each image accessible to the workstation system is associated with at least one of additional biometric data and demographic information and wherein the user interface is operable to permit a user to do at least one of the following functions:

visually compare the digitized image that was sent directly to an image of an individual whose data was returned in the indicator by the biometric recognition system;

visually compare demographic information associated with the individual whose digitized image was sent directly to demographic information of an individual whose data was returned in the indicator by the biometric recognition system;

visually compare the other biometric information associated with the digitized image that was sent to other biometric information associated with an individual whose data was returned in the indicator by the biometric recognition system;

create a new biometric template of the digitized image that was sent and conduct a new search of the biometric recognition system using the new biometric template;

perform a re-alignment of the digitized image and use the re-alignment data to conduct a new search of the biometric recognition system;

capture a new image of the individual whose digitized image was sent;

adding a notification to a record associated with at least one of the digitized image that was sent and the data that was returned in the indicator by the biometric recognition system, the notification providing an alert that there may be a problem with the record; and selecting at least one of the images of an individual whose data was returned in the indicator by the biometric recognition system and sending that image to the biometric recognition search system to run a search on that image.

10. The system of claim 1, further comprising a capture station configured to acquire at least one digitized image of an individual seeking an identification document and to provide the digitized image to the first server.

* * * * *

UNITED STATES PATENT AND TRADEMARK OFFICE
CERTIFICATE OF CORRECTION

| | | |
|---|---|---|
| PATENT NO. | : 7,804,982 B2 | Page 1 of 1 |
| APPLICATION NO. | : 10/723240 | |
| DATED | : September 28, 2010 | |
| INVENTOR(S) | : James V. Howard et al. | |

It is certified that error appears in the above-identified patent and that said Letters Patent is hereby corrected as shown below:

On the Title Page, Item [57]

In the Abstract:

At page 1, line 18, please delete the word "a"

In the Claims:

In Claim 1, line 10, please insert a --;-- after the word "document"
In Claim 1, line 20, please delete the "," after the word "comparing"

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,804,982 B2 | Page 1 of 1 |
| APPLICATION NO. | : 10/723240 | |
| DATED | : September 28, 2010 | |
| INVENTOR(S) | : James V. Howard et al. | |

It is certified that error appears in the above-identified patent and that said Letters Patent is hereby corrected as shown below:

On the Title Page, Item [57]

In the Abstract:

At page 1, line 18, please delete the word "a"

In the Claims:

Column 45, lines 66-67 (Claim 1, lines 9-10) please insert a --;-- after the word "document"
Column 46, line 10 (Claim 1, line 20) please delete the "," after the word "comparing"

This certificate supersedes the Certificate of Correction issued November 23, 2010.

Signed and Sealed this

Fourteenth Day of December, 2010

David J. Kappos
*Director of the United States Patent and Trademark Office*